United States Patent
Tada et al.

(10) Patent No.: US 12,151,538 B2
(45) Date of Patent: Nov. 26, 2024

(54) VEHICLE AIR CONDITIONER

(71) Applicant: DENSO CORPORATION, Kariya (JP)

(72) Inventors: Kazuhiro Tada, Kariya (JP); Yuuichi Kami, Kariya (JP); Zhaoliang Xu, Kariya (JP); Atsushi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 17/894,581

(22) Filed: Aug. 24, 2022

(65) Prior Publication Data
US 2022/0402336 A1 Dec. 22, 2022

Related U.S. Application Data

(63) Continuation of application No. PCT/JP2021/000642, filed on Jan. 12, 2021.

(30) Foreign Application Priority Data

Feb. 27, 2020 (JP) .................................. 2020-031118

(51) Int. Cl.
*B60H 1/32* (2006.01)
*B60H 1/00* (2006.01)

(52) U.S. Cl.
CPC ....... *B60H 1/3205* (2013.01); *B60H 1/00392* (2013.01)

(58) Field of Classification Search
CPC .............. B60H 1/3205; B60H 1/00392; B60H 1/009261; B60H 1/32284; B60H 2001/00961; F25B 47/00
See application file for complete search history.

(56) References Cited

U.S. PATENT DOCUMENTS

| | | | |
|---|---|---|---|
| 2020/0047583 A1 | 2/2020 | Ishizeki et al. | |
| 2020/0158392 A1* | 5/2020 | Tomiyama | F24F 11/42 |
| 2022/0402331 A1* | 12/2022 | Tada | F25B 47/02 |

FOREIGN PATENT DOCUMENTS

| | | |
|---|---|---|
| JP | 6134290 B2 | 5/2017 |
| JP | 2018184108 A | 11/2018 |
| JP | 2018184110 A | 11/2018 |

OTHER PUBLICATIONS

U.S. Appl. No. 17/894,426, filed Aug. 24, 2022, Tada et al.

* cited by examiner

*Primary Examiner* — Marc E Norman
(74) *Attorney, Agent, or Firm* — Harness, Dickey & Pierce, P.L.C.

(57) ABSTRACT

A vehicle air conditioner includes a compressor, a heating unit, an outside air heat exchanger, a wind speed regulation unit, and a controller. The controller includes a melting control unit, a dry control unit, and a dry completion determination unit. In a dry defrosting mode, the melting control unit performs melting-defrosting to melt frost adhering to the outside air heat exchanger. The dry control unit performs a dry defrosting in which at least one of the amount of heat in a predetermined range or a wind speed regulated in a predetermined range by the wind speed regulation unit is supplied to residual water adhering to the outside air heat exchanger, due to melting of frost in the melting-defrosting, to dry the residual water. The dry completion determination unit determines whether drying of the residual water in the outside air heat exchanger is completed, in the dry defrosting.

19 Claims, 30 Drawing Sheets

HEATING MODE

FIRST CONDENSATION-HEAT DEFROSTING MODE

SECOND CONDENSATION-HEAT DEFROSTING MODE

HOT GAS DEFROSTING MODE

STORAGE HEAT DEFROSTING MODE

FIG. 11

EXPERIMENTAL FORMULA FOR DIFFUSION COEFFICIENT D $$D = 0.241 \times 10^{-4} \times ((T_{amb} + 273.15)/288)^{1.75}$$

EXPERIMENTAL FORMULA FOR REYNOLDS NUMBER Re $$Re = \rho \times Vc \times L / \mu$$

EXPERIMENTAL FORMULA FOR SCHMITT NUMBER Sc $$Sc = \mu / \rho / D$$

EXPERIMENTAL FORMULA FOR SHERWOOD NUMBER Sh $$Sh = X_1 \times Re^{X_2} \times Sc^{(1/3)}$$

EXPERIMENTAL FORMULA FOR EVAPORATION RATE Va PER UNIT AREA $$Va = Sh \times D \times (C_1 - C_2)/L$$

$T_{amb}$: OUTSIDE AIR TEMPERATURE (° C)
$\rho$: DENSITY (kg/m$^2$)
Vc: WIND SPEED (m/s)
L: EVAPORATION SURFACE LENGTH (m)
$\mu$: VISCOSITY COEFFICIENT (kg/m/s(Pa·s))
$X_1$, $X_2$: COEFFICIENT SELECTED BY AIR FLOW
$C_1$: SATURATED WATER VAPOR AMOUNT ON WATER SURFACE (g/m$^2$)
$C_2$: VAPOR AMOUNT OF OUTSIDE AIR (g/m$^2$)

HEATING MODE

FIRST CONDENSATION-HEAT DEFROSTING MODE

SECOND CONDENSATION-HEAT DEFROSTING MODE

STORAGE HEAT DEFROSTING MODE

BATTERY-WASTE-HEAT USE DEFROSTING MODE

HEATER USE DEFROSTING MODE

VEHICLE AIR CONDITIONER

CROSS REFERENCE TO RELATED APPLICATION

The present application is a continuation application of International Patent Application No. PCT/JP2021/000642 filed on Jan. 12, 2021, which designated the U.S. and claims the benefit of priority from Japanese Patent Application No. 2020-031118 filed on Feb. 27, 2020. The entire disclosures of all of the above applications are incorporated herein by reference.

TECHNICAL FIELD

The present disclosure relates to a vehicle air conditioner including an outside air heat exchanger.

BACKGROUND

Conventionally, there is a vehicle air conditioner that absorbs heat from outside air in an outside air heat exchanger during a heating operation. The vehicle air conditioner is configured to defrost an outside heat exchanger frosted due to heat absorbed from low-temperature outside air during the heating operation.

SUMMARY

An air conditioner for a vehicle according to an aspect of the present disclosure includes a compressor, a heating unit, an outside air heat exchanger, a blower and a controller. The compressor is configured to compress and discharge a refrigerant. The heating heat exchanger is configured to cool a high-pressure refrigerant discharged from the compressor during a heating operation for heating a space to be air conditioned, and to heat ventilation air supplied to the space to be air conditioned using the high-pressure refrigerant as a heat source. The outside air heat exchanger is configured to absorb heat from outside air during the heating operation. The blower is configured to regulate a wind speed of air supplied to the outside air heat exchanger. The controller includes at least one processor configured to perform, as a defrosting operation of defrosting the outside air heat exchanger, a dry defrosting mode for evaporating and removing frost adhering to the outside air heat exchanger in a state where the outside air is lower than a predetermined temperature.

The controller is configured (i) to perform a melting-defrosting to melt the frost adhering to the outside air heat exchanger in the dry defrosting mode, (ii) to perform a dry defrosting in which at least one of an amount of heat in a predetermined range or a wind speed regulated in a predetermined range by the blower is supplied to residual water adhering to the outside air heat exchanger to dry the residual water, after the melting-defrosting, and (iii) to determine whether drying of the residual water in the outside air heat exchanger is completed by the dry defrosting. The controller may end the defrosting operation in the dry defrosting mode in response to a determination in which the drying of the residual water is completed.

BRIEF DESCRIPTION OF DRAWINGS

The above and other objects, features and advantages of the present disclosure will be more clearly understood from the following detailed description with reference to the accompanying drawings. In the accompanying drawings.

FIG. 11 is an explanatory diagram of experimental formulas for estimating an evaporation rate in dry defrosting;

DESCRIPTION OF EMBODIMENTS

Figure 1:
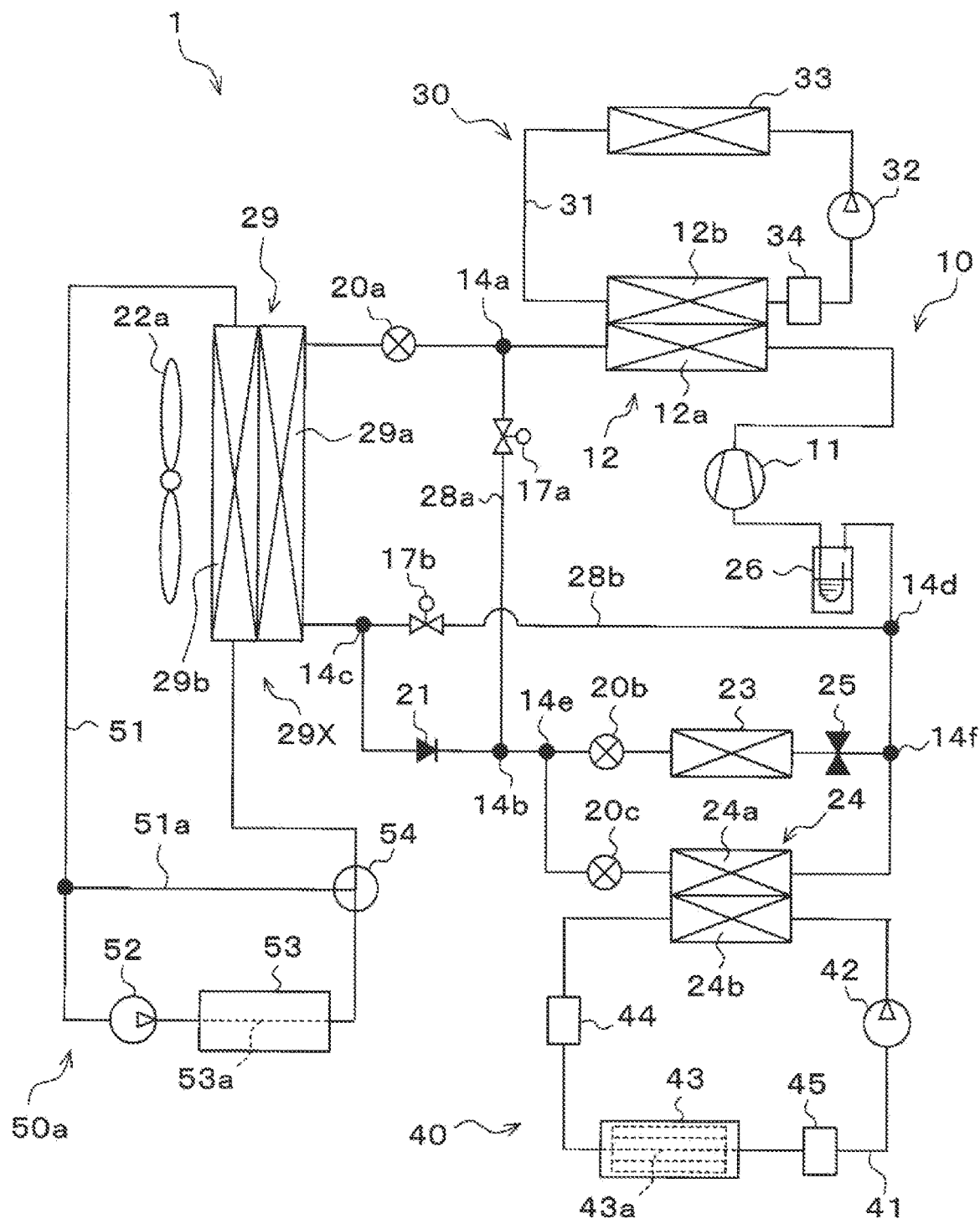
FIG. 1 is an overall configuration diagram of a vehicle air conditioner according to a first embodiment.

In a vehicle air conditioner, when an outside heat exchanger is defrosted, the temperature at a refrigerant outlet port is set to around 0° C., so that the outside heat exchanger is defrosted. Therefore, the frost formed on the outside heat exchanger can be melted, but it is conceivable that water generated by melting remains on the surface of the outside heat exchanger.

If the melted water remains on the surface of the outside heat exchanger in an environment in which the outside air temperature is low, it is assumed that the water is refrozen on the surface of the outside heat exchanger after the defrosting operation ends, and the heat exchange performance of the outside heat exchanger is degraded. Therefore, it is necessary to remove residual water caused by defrosting from the outside heat exchanger.

Furthermore, if the residual water in the outside heat exchanger is not removed sufficiently, it is assumed that the residual water is refrozen, and thus it is important to reliably remove the residual water from the outside heat exchanger.

The end of the defrosting operation may be determined by making a determination using the temperature difference between the temperature at the refrigerant outlet port and the outside air temperature. However, since the measurement of the temperature at the refrigerant outlet port or the like includes variations, the presence or absence of the residual water on the surface of the outside heat exchanger cannot be accurately determined, and thus the residual water may be refrozen.

In view of the above, an object of the present disclosure is to provide a vehicle air conditioner capable of accurately completing the evaporation and removal of water derived from frost adhering to an outside air heat exchanger at the time of defrosting the outside air heat exchanger.

An air conditioner for a vehicle according to an exemplar of the present disclosure includes a compressor, a heating unit, an outside air heat exchanger, a wind speed regulation unit and a controller.

The compressor is configured to compress and discharge a refrigerant. The heating unit includes a heating heat exchanger configured to condense a high-pressure refrigerant discharged from the compressor during a heating operation for heating a space to be air conditioned and to heat ventilation air supplied to the space to be air conditioned using the high-pressure refrigerant as a heat source.

The outside air heat exchanger is configured to absorb heat from outside air during the heating operation. The wind speed regulation unit is configured to regulate a wind speed of air supplied to the outside air heat exchanger. The controller is configured to perform, as a defrosting operation of defrosting the outside air heat exchanger, a dry defrosting mode for evaporating and removing frost adhering to the outside air heat exchanger in a state where the outside air is at a low temperature.

The controller includes a melting control unit, a dry control unit and a dry completion determination unit. The controller ends the defrosting operation in the dry defrosting mode when the dry completion determination unit determines that the drying of the residual water is completed.

The melting control unit is configured to perform a melting-defrosting to melt the frost adhering to the outside air heat exchanger in the dry defrosting mode. The dry control unit is configured to perform a dry defrosting in which at least one of an amount of heat in a predetermined range or a wind speed regulated in a predetermined range by the wind speed regulation unit is supplied to residual water adhering to the outside air heat exchanger, due to melting of frost in the melting-defrosting, to dry the residual water. The dry completion determination unit is configured to determine whether drying of the residual water in the outside air heat exchanger is completed by the dry defrosting.

According to this, the frost adhering to the outside air heat exchange unit can be melted by the melting-defrosting in the dry defrosting mode, and the residual water in the outside air heat exchanger generated by melting can be dried by the dry defrosting. In a case where the dry completion determination unit determines that drying of the residual water is completed, the controller ends the defrosting operation in the dry defrosting mode of the vehicle air conditioner. Therefore, the vehicle air conditioner can evaporate and remove the residual water in the outside air heat exchanger at the end of the defrosting operation in the dry defrosting mode, and can prevent refreezing of the residual water.

A plurality of embodiments for carrying out the present disclosure will be described below with reference to the drawings. In each embodiment, parts corresponding to matters described in the preceding embodiment are denoted by the same reference numerals, and redundant description may be omitted. In a case where only a part of the configuration is described in each embodiment, other embodiments described above can be used for other parts of the configuration. It is possible not only to combine parts that can be explicitly combined in the embodiments, but also to partially combine the embodiments even if not explicitly specified if there is no trouble with the combination.

First Embodiment

A first embodiment of a vehicle air conditioner 1 according to the present disclosure will be described with reference to the drawings. The vehicle air conditioner 1 is mounted on an electric vehicle that is a vehicle that obtains traveling driving force from an electric motor. The vehicle air conditioner 1 of the present embodiment is an air conditioner with an in-vehicle device cooling function that performs air conditioning in a vehicle cabin, which is a space to be air conditioned, and cools a battery 75 that is an in-vehicle device in the electric vehicle.

The battery 75 is a secondary battery that stores electric power supplied to an in-vehicle device such as an electric motor. The battery 75 of the present embodiment is a lithium ion battery. The battery 75 is a so-called assembled battery formed by stacking and arranging a plurality of battery cells and electrically connecting these battery cells in series or in parallel.

The input and output of this type of battery is likely to be limited at a low temperature, and the output thereof is likely to decrease at a high temperature. Therefore, the temperature of the battery needs to be maintained within an appropriate temperature range (in the present embodiment, equal to or higher than 5° C. and equal to or lower than 55° C.) in which the charge and discharge capacity of the battery can be sufficiently utilized.

In addition, in this type of battery, as the temperature of the battery is higher, the deterioration of cells constituting the battery easily proceeds. In other words, by maintaining the temperature of the battery at a certain low temperature, it is possible to suppress the progress of deterioration of the battery.

Therefore, in the vehicle air conditioner 1, the battery 75 can be cooled by cold generated by a refrigeration cycle device 10. As a result, the cooling target different from ventilation air in the refrigeration cycle device 10 of the present embodiment is the battery 75.

As illustrated in FIG. 1, the vehicle air conditioner 1 includes the refrigeration cycle device 10, a high-temperature-side heat medium circuit 30, a low-temperature-side heat medium circuit 40, a device-side heat medium circuit 50a, an inside air conditioning unit 60, and the like.

In order to perform air conditioning in the vehicle cabin, the refrigeration cycle device 10 functions to cool ventilation air supplied to the vehicle cabin and heat a high-temperature-side heat medium circulating in the high-temperature-side heat medium circuit 30. Furthermore, in order to cool the battery 75, the refrigeration cycle device 10 functions to cool a low-temperature-side heat medium circulating in the low-temperature-side heat medium circuit 40.

The refrigeration cycle device 10 is configured to be able to switch refrigerant circuits in various operation modes in order to perform air conditioning in the vehicle cabin. The refrigeration cycle device 10 is configured to be able to switch, for example, a refrigerant circuit in a cooling mode, a refrigerant circuit in a dehumidifying and heating mode, a refrigerant circuit in a heating mode, and the like. Furthermore, the refrigeration cycle device 10 can switch between an operation mode in which the battery 75 is cooled and an operation mode in which the battery 75 is not cooled in the individual air conditioning operation modes.

The refrigeration cycle device 10 uses an HFO refrigerant (specifically, R1234yf) as a refrigerant, and configures a vapor compression subcritical refrigeration cycle in which the pressure of a discharge refrigerant discharged from a compressor 11 does not exceed the critical pressure of the refrigerant. Refrigerant oil for lubricating the compressor 11 is mixed with the refrigerant. A part of the refrigerant oil circulates in the cycle together with the refrigerant.

As illustrated in FIG. 1, the compressor 11, a water-refrigerant heat exchanger 12, a heating expansion valve 20a, a cooling expansion valve 20b, a cooling expansion valve 20c, a combined heat exchanger 29, an inside evaporator 23, a chiller 24, and the like are connected in the refrigeration cycle device 10.

The compressor 11 sucks, compresses, and discharges the refrigerant in the refrigeration cycle device 10. The compressor 11 is disposed on the front side of the vehicle cabin, and is also disposed in a drive unit chamber that houses an electric motor and the like. The compressor 11 is an electric compressor in which a fixed capacity type compression mechanism with a fixed discharge capacity is rotationally driven by an electric motor. The rotation speed (that is, the refrigerant discharge capability) of the compressor 11 is controlled by a control signal output from a controller 70 (i.e., control device) to be described later.

The inlet port side of a refrigerant passage 12a in the water-refrigerant heat exchanger 12 is connected to the discharge port of the compressor 11. The water-refrigerant heat exchanger 12 includes the refrigerant passage 12a through which the high-pressure refrigerant discharged from the compressor 11 flows, and a heat medium passage 12b through which the high-temperature-side heat medium circulating in the high-temperature-side heat medium circuit 30 flows.

The water-refrigerant heat exchanger 12 is a heating heat exchanger that exchanges heat between the high-pressure refrigerant flowing through the refrigerant passage 12a and the high-temperature-side heat medium flowing through the heat medium passage 12b to heat the high-temperature-side heat medium. The water-refrigerant heat exchanger 12 corresponds to an example of a heating heat exchanger.

The inlet port side of a first connection portion 14a with a three-way joint structure having three inlet and outlet ports communicating with each other is connected to the outlet port of the refrigerant passage 12a in the water-refrigerant heat exchanger 12. As the three-way joint structure, a three-way joint structure formed by joining a plurality of pipes, a three-way joint structure formed by providing a plurality of refrigerant passages in a metal block or a resin block, or the like can be used.

As described later, the refrigeration cycle device 10 further includes a second connection portion 14b to a sixth connection portion 14f. The basic configurations of the second connection portion 14b to the sixth connection portion 14f are similar to that of the first connection portion 14a.

The inlet port side of the heating expansion valve 20a is connected to one outlet port of the first connection portion 14a. One inlet port side of the second connection portion 14b is connected to the other outlet port of the first connection portion 14a through a refrigerant bypass passage 28a. A dehumidifying on-off valve 17a is disposed in the refrigerant bypass passage 28a.

The dehumidifying on-off valve 17a is an electromagnetic valve that opens and closes the refrigerant bypass passage 28a connecting the other outlet port side of the first connection portion 14a and the one inlet port side of the second connection portion 14b. The refrigeration cycle device 10 further includes a heating on-off valve 17b as described later.

The basic configuration of the heating on-off valve 17b is similar to that of the dehumidifying on-off valve 17a.

The dehumidifying on-off valve 17a and the heating on-off valve 17b can switch the refrigerant circuit in each operation mode by opening and closing the refrigerant passage. Therefore, the dehumidifying on-off valve 17a and the heating on-off valve 17b are refrigerant circuit switching units that switch the refrigerant circuit in the cycle. The operations of the dehumidifying on-off valve 17a and the heating on-off valve 17b are controlled by a control voltage output from the controller 70.

The heating expansion valve 20a is a heating decompression unit that decompresses the high-pressure refrigerant flowing out of the refrigerant passage 12a of the water-refrigerant heat exchanger 12 and regulates the flow rate (the mass flow rate) of the refrigerant flowing to the downstream side in an operation mode of at least heating the vehicle cabin. The heating expansion valve 20a is an electric variable throttle mechanism including a valve body configured to be able to change a throttle opening and an electric actuator that changes the opening of the valve body.

The refrigeration cycle device 10 further includes the cooling expansion valve 20b and the cooling expansion valve 20c as described later. The basic configurations of the cooling expansion valve 20b and the cooling expansion valve 20c are similar to that of the heating expansion valve 20a.

The heating expansion valve 20a, the cooling expansion valve 20b, and the cooling expansion valve 20c have a full-open function and a full-close function. In the full-open function, these valves function as simple refrigerant passages without exhibiting a flow-rate regulating action and a refrigerant decompression action by fully opening the valve opening. The full-close function is a function of closing the refrigerant passage by fully closing the valve opening. The full-open function and the full-close function enable the heating expansion valve 20a, the cooling expansion valve 20b, and the cooling expansion valve 20c to switch the refrigerant circuit in each operation mode.

Therefore, the heating expansion valve 20a, the cooling expansion valve 20b, and the cooling expansion valve 20c of the present embodiment also have a function as a refrigerant circuit switching unit. The operations of the heating expansion valve 20a, the cooling expansion valve 20b, and the cooling expansion valve 20c are controlled by a control signal (a control pulse) output from the controller 70.

The refrigerant inlet port side of the combined heat exchanger 29 is connected to the outlet port of the heating expansion valve 20a. The combined heat exchanger 29 is a heat exchanger in which an outside air-refrigerant heat exchange unit 29a that exchanges heat between the refrigerant of the refrigeration cycle device 10 and outside air and an outside air-heat medium heat exchange unit 29b that exchanges heat between the heat medium circulating in the device-side heat medium circuit 50a and the outside air are integrally formed. Therefore, the combined heat exchanger 29 corresponds to an example of an outside air heat exchanger, and constitutes an outside air heat exchange unit.

The combined heat exchanger 29 is disposed on the front side of the drive unit chamber. The outside air-heat medium heat exchange unit 29b is disposed on the vehicle front side of the outside air-refrigerant heat exchange unit 29a. In other words, the outside air-heat medium heat exchange unit 29b is disposed on the upstream side of the outside air-refrigerant heat exchange unit 29a in an outside air flow.

In the combined heat exchanger 29, an outside air fan 22a is disposed to supply outside air to the outside air-refrigerant heat exchange unit 29a and the outside air-heat medium heat exchange unit 29b. The outside air fan 22a is an electric blower whose rotation speed (that is, ventilation capability) is controlled by a control voltage output from the controller 70.

That is, since the outside air fan 22a can regulate the wind speed (the air volume) of the outside air with respect to the combined heat exchanger 29, the outside air fan corresponds to an example of a wind speed regulation unit. As a result, the combined heat exchanger 29 can exchange heat with outside air supplied by the outside air fan 22a and with outside air supplied as the electric vehicle travels.

The outside air-refrigerant heat exchange unit 29a and the outside air-heat medium heat exchange unit 29b of the combined heat exchanger 29 have a so-called tank-and-tube heat exchanger structure. The tank-and-tube heat exchanger that exchanges heat between a refrigerant or a heat medium and air (that is, outside air) includes a plurality of tubes through which the refrigerant or the heat medium flows, a tank for distributing or collecting the refrigerant or the heat medium flowing through the tubes, and the like. The refrigerant or the heat medium flowing through the tubes stacked and arranged at intervals in a certain direction exchanges heat with the air flowing through the air passage formed between the adjacent tubes.

Figure 2:
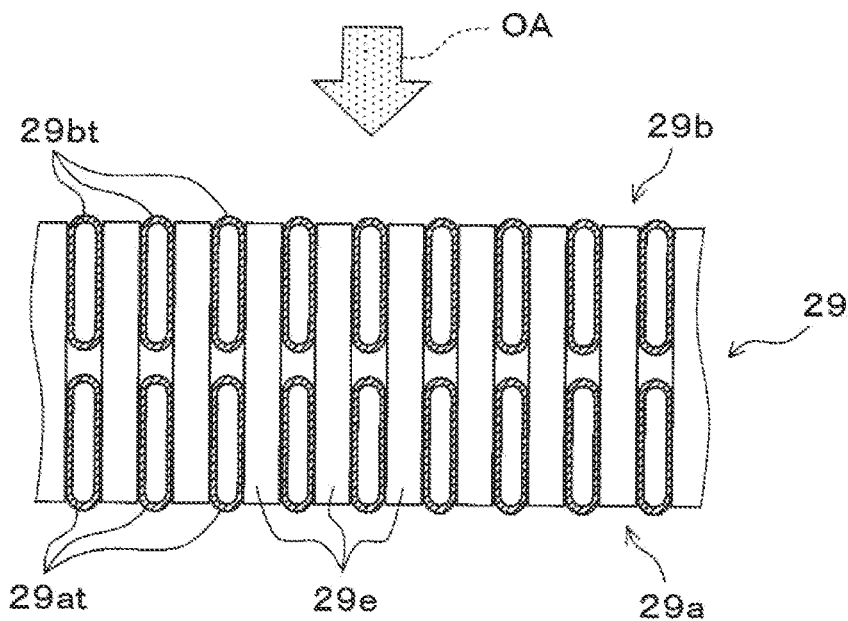
FIG. 2 is a schematic diagram illustrating a configuration of a combined heat exchanger according to the first embodiment.

As illustrated in FIG. 2, a heat exchange fin 29e is disposed in an air passage formed between tubes 29at in the outside air-refrigerant heat exchange unit 29a and in an air passage formed between tubes 29bt in the outside air-heat medium heat exchange unit 29b. The heat exchange fin 29e is made of one thin plate-shaped metal member. The heat exchange fin 29e is a member that promotes heat exchange between the refrigerant and the outside air in the outside air-refrigerant heat exchange unit 29a and also promotes heat exchange between the heat medium and the outside air in the outside air-heat medium heat exchange unit 29b.

In the combined heat exchanger 29, a plurality of the heat exchange fins 29e are brazed to both the tubes 29at of the outside air-refrigerant heat exchange unit 29a and the tubes 29bt of the outside air-heat medium heat exchange unit 29b. That is, the outside air-refrigerant heat exchange unit 29a and the outside air-heat medium heat exchange unit 29b are connected by the heat exchange fins 29e.

As a result, in the combined heat exchanger 29, heat can be transferred between the refrigerant on the side of the outside air-refrigerant heat exchange unit 29a and the heat medium on the side of the outside air-heat medium heat exchange unit 29b via the heat exchange fins 29e.

As illustrated in FIG. 1, the inlet port side of the third connection portion 14c is connected to the refrigerant outlet port side of the combined heat exchanger 29. One inlet port side of the fourth connection portion 14d is connected to one outlet port of the third connection portion 14c through a heating passage 28b. The heating on-off valve 17b that opens and closes the refrigerant passage is disposed in the heating passage 28b.

The other inlet port side of the second connection portion 14b is connected to the other outlet port side of the third connection portion 14c. A check valve 21 is disposed in the refrigerant passage connecting the other outlet port side of the third connection portion 14c and the other inlet port side of the second connection portion 14b. The check valve 21 allows the refrigerant to flow from the side of the third connection portion 14c to the side of the second connection portion 14b, and prohibits the refrigerant from flowing from the side of the second connection portion 14b to the side of the third connection portion 14c.

The inlet port side of the fifth connection portion 14e is connected to the outlet port side of the second connection portion 14b. The inlet port side of the cooling expansion valve 20b is connected to one outlet port of the fifth connection portion 14e. The inlet port side of the cooling expansion valve 20c is connected to the other outlet port of the fifth connection portion 14e.

The cooling expansion valve 20b is a cooling decompression unit that decompresses the refrigerant flowing out of the combined heat exchanger 29 and regulates the flow rate of the refrigerant flowing to the downstream side in an operation mode of at least cooling the vehicle cabin.

The refrigerant inlet port side of the inside evaporator 23 is connected to the outlet port of the cooling expansion valve 20b. The inside evaporator 23 is disposed in a casing 61 of the inside air conditioning unit 60. The inside evaporator 23 is a cooling heat exchanger that exchanges heat between the low-pressure refrigerant decompressed by the cooling expansion valve 20b and ventilation air supplied from a blower 62 to evaporate the low-pressure refrigerant, and cools the ventilation air by causing the low-pressure refrigerant to exhibit a heat absorbing action. That is, the inside evaporator 23 corresponds to an example of an air conditioning evaporator.

The cooling expansion valve 20c is a cooling decompression unit that decompresses the refrigerant flowing out of the combined heat exchanger 29 and regulates the flow rate of the refrigerant flowing to the downstream side in an operation mode of at least cooling the battery 75. The cooling expansion valve 20c is disposed on the refrigerant outlet port side of the water-refrigerant heat exchanger 12, and thus corresponds to an example of a heat absorption decompression unit.

The inlet port side of a refrigerant passage 24a in the chiller 24 is connected to the outlet port of the cooling expansion valve 20c. The chiller 24 includes the refrigerant passage 24a through which the low-pressure refrigerant decompressed by the cooling expansion valve 20c flows, and a heat medium passage 24b through which the low-temperature-side heat medium circulating in the low-temperature-side heat medium circuit 40 flows.

The chiller 24 is an evaporator that exchanges heat between the low-pressure refrigerant flowing through the refrigerant passage 24a and the low-temperature-side heat medium flowing through the heat medium passage 24b to evaporate the low-pressure refrigerant and exhibit the heat absorbing action. The other inlet port side of the sixth connection portion 14f is connected to the outlet port of the refrigerant passage 24a in the chiller 24.

The inlet port side of an evaporation pressure regulating valve 25 is connected to the refrigerant outlet port of the inside evaporator 23. The evaporation pressure regulating valve 25 maintains the refrigerant evaporation pressure in the inside evaporator 23 at a predetermined reference pressure or higher in order to suppress the frosting of the inside evaporator 23. The evaporation pressure regulating valve 25 includes a mechanical variable throttle mechanism that increases the valve opening as the pressure of the refrigerant on the outlet side of the inside evaporator 23 increases.

The evaporation pressure regulating valve 25 thus maintains the refrigerant evaporation temperature in the inside evaporator 23 at a frosting suppression temperature (in the present embodiment, 1° C.) or higher, at which the frosting of the inside evaporator 23 can be suppressed. One inlet port side of the sixth connection portion 14f is connected to the outlet port of the evaporation pressure regulating valve 25.

The other inlet port side of the fourth connection portion 14d is connected to the outlet port of the sixth connection portion 14f.

The inlet port side of an accumulator 26 is connected to the outlet port of the fourth connection portion 14d. The accumulator 26 is a gas-liquid separator that separates the refrigerant flowing into the accumulator into gas and liquid and stores an excess liquid-phase refrigerant in the cycle, and corresponds to an example of a liquid storage unit. The suction port side of the compressor 11 is connected to the gas-phase refrigerant outlet port of the accumulator 26.

As is apparent from the above description, the fifth connection portion 14e of the present embodiment functions as a branch portion where the flow of the refrigerant flowing out of the combined heat exchanger 29 is branched. The sixth connection portion 14f is a merging portion where the flow of the refrigerant flowing out of the inside evaporator 23 and the flow of the refrigerant flowing out of the chiller 24 are merged to flow to the suction side of the compressor 11.

The inside evaporator 23 and the chiller 24 are connected in parallel to each other with respect to a refrigerant flow. The refrigerant bypass passage 28a guides the refrigerant flowing out of the refrigerant passage of the water-refrigerant heat exchanger 12 to the upstream side of the branch portion. The heating passage 28b guides the refrigerant flowing out of the combined heat exchanger 29 to the suction port side of the compressor 11.

Next, the high-temperature-side heat medium circuit 30 of the first embodiment will be described. The high-temperature-side heat medium circuit 30 is a heat medium circulation circuit that circulates a high-temperature-side heat medium. As the high-temperature-side heat medium, a solution containing ethylene glycol, dimethylpolysiloxane, nanofluid, or the like, an antifreeze solution, or the like can be used. The high-temperature-side heat medium circuit 30 is configured by connecting the heat medium passage 12b of the water-refrigerant heat exchanger 12, a high-temperature-side pump 32, a heater core 33, a water heater 34, and the like using a high-temperature-side heat medium flow path 31.

The water heater 34 is disposed on the outlet port side of the heat medium passage 12b in the water-refrigerant heat exchanger 12. The water heater 34 is a heating device that heats the high-temperature-side heat medium flowing out of the heat medium passage 12b of the water-refrigerant heat exchanger 12, and corresponds to an example of a heat source. As the water heater 34, a PTC heater having a PTC element (that is, a positive characteristic thermistor) can be used. The calorific value of the water heater 34 is arbitrarily controlled by a control voltage output from the controller 70.

The suction port side of the high-temperature-side pump 32 is connected to the outlet port side of the heat medium passage in the water heater 34. The high-temperature-side pump 32 is a water pump for transferring the high-temperature-side heat medium having passed through the water heater 34 to the heat medium inlet port side of the heater core 33. The high-temperature-side pump 32 is an electric pump whose rotation speed (that is, pumping capability) is controlled by a control voltage output from the controller 70.

Figure 3:
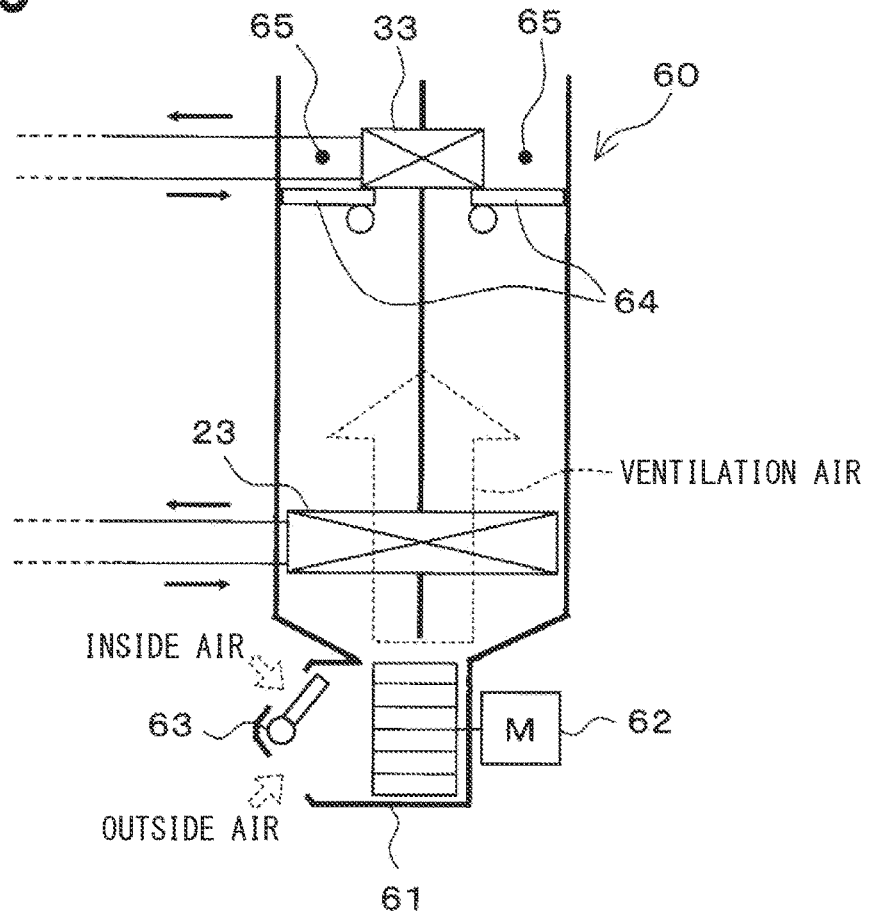
FIG. 3 is a schematic configuration diagram of an inside air conditioning unit according to the first embodiment.

The heater core 33 is a heat exchanger that exchanges heat between the high-temperature-side heat medium heated by the water-refrigerant heat exchanger 12 or the like and ventilation air passing through the inside evaporator 23 to heat the ventilation air. As illustrated in FIG. 3, the heater core 33 is disposed in the casing 61 of the inside air conditioning unit 60. The inlet port side of the heat medium passage 12b of the water-refrigerant heat exchanger 12 is connected to the heat-medium outlet port of heater core 33.

Therefore, in the high-temperature-side heat medium circuit 30, the high-temperature-side pump 32 regulates the flow rate of the high-temperature-side heat medium flowing into the heater core 33, so that the amount of heat radiated from the high-temperature-side heat medium in the heater core 33 to the ventilation air (that is, the amount of the ventilation air heated in the heater core 33) can be regulated.

That is, in the present embodiment, the water-refrigerant heat exchanger 12 and the individual components of the high-temperature-side heat medium circuit 30 constitute a heating unit that heats the ventilation air by using the refrigerant discharged from the compressor 11 as a heat source.

Next, the low-temperature-side heat medium circuit 40 of the first embodiment will be described. The low-temperature-side heat medium circuit 40 is a heat medium circulation circuit that circulates a low-temperature-side heat medium. As the low-temperature-side heat medium, a fluid similar to the high-temperature-side heat medium can be used.

The low-temperature-side heat medium circuit 40 is configured by connecting the heat medium passage 24b of the chiller 24, a low-temperature-side pump 42, a battery heat exchange unit 43, an electric heater 44, a low-temperature-side reserve tank 45, and the like using a low-temperature-side heat medium flow path 41.

The low-temperature-side heat medium circuit 40 causes the battery heat exchange unit 43 to exchange heat between the low-temperature-side heat medium whose temperature has been regulated by the refrigeration cycle device 10 or the like and the battery 75, thereby regulating the temperature of the battery 75. It can be said that the low-temperature-side heat medium circuit 40 is a heat medium circuit that regulates the temperature of the battery 75 and effectively utilizes the waste heat from the battery 75 in various applications.

As illustrated in FIG. 1, the electric heater 44 is disposed on the outlet port side of the heat medium passage 24b in the chiller 24. The electric heater 44 is a heating device that heats the low-temperature-side heat medium flowing out of the heat medium passage 24b of the chiller 24, and corresponds to an example of the heat source. As the electric heater 44, a PTC heater can be used. The calorific value of the electric heater 44 is arbitrarily controlled by a control voltage output from the controller 70.

The inlet port side of the battery heat exchange unit 43 is connected to the outlet port side of the heat medium passage 24b in the electric heater 44. The battery heat exchange unit 43 is a heat exchange unit that exchanges heat between the low-temperature-side heat medium flowing through a heat medium passage 43a and the battery cell to regulate the temperature of the battery 75.

The heat medium passage 43a in the battery heat exchange unit 43 has a passage configuration in which a plurality of passages are connected in parallel inside a dedicated case. As a result, the heat medium passage 43a is formed so as to uniformly absorb the waste heat of the battery 75 from the entire area of the battery 75. In other words, the refrigerant passage is formed so as to uniformly absorb heat of all the battery cells and uniformly cool all the battery cells.

Such a battery heat exchange unit 43 may be formed by disposing the heat medium passage 43a between stacked battery cells. Alternatively, the battery heat exchange unit 43 may be formed integrally with the battery 75. For example, the heat medium passage 43a may be provided in the dedicated case that houses the stacked battery cells so as to be formed integrally with the battery 75.

The low-temperature-side reserve tank 45 is disposed at the outlet port of the heat medium passage 43a in the battery heat exchange unit 43. The low-temperature-side reserve tank 45 is a storage unit that stores a low-temperature-side heat medium excess in the low-temperature-side heat medium circuit 40.

The suction port side of the low-temperature-side pump 42 is connected to the heat-medium outlet port side of the low-temperature-side reserve tank 45. The low-temperature-side pump 42 is a water pump that pumps the low-temperature-side heat medium to the inlet port side of the heat medium passage 24b in the chiller 24. The basic configuration of the low-temperature-side pump 42 is similar to that of the high-temperature-side pump 32.

Therefore, in the low-temperature-side heat medium circuit 40, the low-temperature-side pump 42 can regulate the amount of heat absorbed by the low-temperature-side heat medium in the battery heat exchange unit 43 from the battery 75 by regulating the flow rate of the low-temperature-side heat medium flowing into the battery heat exchange unit 43. Alternatively, the amount of heat absorbed in the battery heat exchange unit 43 can also be regulated by regulating the temperature difference between the battery 75 and the low-temperature-side heat medium by the electric heater 44.

That is, according to the present embodiment, the chiller 24 and the individual components of the low-temperature-side heat medium circuit 40 constitute a cooling unit that cools the battery 75 by evaporating the refrigerant flowing out of the cooling expansion valve 20c.

Next, the device-side heat medium circuit 50a of the first embodiment will be described. The device-side heat medium circuit 50a is a heat medium circuit that regulates the temperature of a heat generating device 53 mounted on the electric vehicle and uses the heat generated in the heat generating device 53. As the heat medium of the device-side heat medium circuit 50a, the heat medium similar to that of the high-temperature-side heat medium circuit 30, the low-temperature-side heat medium circuit 40, and the like, which have been described above, can be used.

The device-side heat medium circuit 50a is configured by annularly connecting the outside air-heat medium heat exchange unit 29b of the combined heat exchanger 29, a device-side pump 52, the heat generating device 53, and a device-side three-way valve 54 using a device-side heat medium flow path 51. The device-side heat medium circuit 50a constitutes an outside air heat exchange unit 29X together with the combined heat exchanger 29.

The suction port side of the device-side pump 52 is connected to the heat-medium outlet port side of the outside air-heat medium heat exchange unit 29b in the combined heat exchanger 29 through the device-side heat medium flow path 51. The device-side pump 52 pumps the heat medium in the device-side heat medium flow path 51 to the inlet port side of a heat medium passage 53a in the heat generating device 53. The basic configuration of the device-side pump 52 is similar to that of the high-temperature-side pump 32 or the like.

The heat medium passage 53a of the heat generating device 53 is disposed on the discharge port side of the device-side pump 52. The heat generating device 53 includes a device that generates heat in accordance with an operation for traveling or the like among in-vehicle devices mounted on the electric vehicle. The heat generating device 53 corresponds to an example of an auxiliary heat source.

In other words, the heat generating device 53 generates heat due to an operation for a purpose different from heat generation, and it is difficult to control its calorific value. Therefore, the heat generating device 53 is not a heating device that operates for the purpose of heat generation and generates an arbitrary amount of heat, such as the water heater 34. As the heat generating device 53, an inverter and a motor generator can be used. The heat medium passage 53a of the heat generating device 53 is formed to cool each component by circulating the heat medium.

The inverter is a power conversion unit that converts a direct current into an alternating current. The motor generator outputs traveling driving force by being supplied with electric power, and generates regenerative electric power at the time of deceleration or the like.

Note that a transaxle device can be used as the heat generating device 53. The transaxle device is a device in which a transmission and a final gear/differential gear (a differential gear) are integrated.

One of inlet and outlet ports of the device-side three-way valve 54 is connected to the outlet port side of the heat medium passage 53a in the heat generating device 53. The device-side three-way valve 54 includes an electric three-way flow rate regulating valve having three inlet and outlet ports.

Another inlet and outlet port of the device-side three-way valve 54 is connected to the heat-medium inlet port side of the outside air-heat medium heat exchange unit 29b in the combined heat exchanger 29 through the device-side heat medium flow path 51. Yet another inlet and outlet port of the device-side three-way valve 54 is connected to a device-side bypass flow path 51a.

The device-side bypass flow path 51a is a heat medium flow path for bypassing the outside air-heat medium heat exchange unit 29b of the combined heat exchanger 29 with respect to the flow of the heat medium in the device-side heat medium circuit 50a. The other end side of the device-side bypass flow path 51a is connected to the device-side heat medium flow path 51 that connects the outlet port side of the outside air-heat medium heat exchange unit 29b in the combined heat exchanger 29 and the suction port side of the device-side pump 52.

As a result, the device-side heat medium circuit 50a can switch the flow of the heat medium in the device-side heat medium circuit 50a by controlling the operation of the device-side three-way valve 54. By circulating the heat medium through the device-side bypass flow path 51a and the heat generating device 53 in the device-side heat medium circuit 50a, the waste heat of the heat generating device 53 can be stored in the heat medium of the device-side heat medium circuit 50a.

Next, the inside air conditioning unit 60 will be described with reference to FIG. 3. The inside air conditioning unit 60 blows ventilation air whose temperature has been regulated by the refrigeration cycle device 10 into the vehicle cabin. The inside air conditioning unit 60 is disposed inside an instrument panel at the foremost of the vehicle cabin.

The inside air conditioning unit 60 houses the blower 62, the inside evaporator 23, the heater core 33, and the like inside an air passage formed in the casing 61 forming the outer shell of the inside air conditioning unit 60. The casing 61 forms an air passage for the ventilation air to be supplied to the vehicle cabin. The casing 61 is formed of resin (for example, polypropylene) that has a certain degree of elasticity and excellent strength.

An inside-air and outside-air switching device 63 is disposed on the most upstream side of the casing 61 in a ventilation air flow. The inside-air and outside-air switching device 63 switches inside air (air inside the vehicle cabin) and outside air (air outside the vehicle cabin), and introduces the air into the casing 61.

The inside-air and outside-air switching device 63 continuously regulates the opening areas of an inside-air introduction port through which inside air is introduced into the casing 61 and an outside-air introduction port through which outside air is introduced by an inside-air and outside-air switching door, thereby changing an introduction ratio between the volume of the inside air introduced and the volume of the outside air introduced. The inside-air and outside-air switching door is driven by an inside-air and outside-air switching door electric actuator. The operation of the electric actuator is controlled by a control signal output from the controller 70.

The blower 62 is disposed on the downstream side of the inside-air and outside-air switching device 63 in the ventilation air flow. The blower 62 supplies air sucked through the inside-air and outside-air switching device 63 to the vehicle cabin. The blower 62 is an electric blower that drives a centrifugal multi-blade fan with an electric motor. The rotation speed (that is, the ventilation capability) of the blower 62 is controlled by a control voltage output from the controller 70.

On the downstream side of the blower 62 in the ventilation air flow, the inside evaporator 23 and the heater core 33 are disposed in this order with respect to the ventilation air flow. That is, the inside evaporator 23 is disposed on the upstream side of the heater core 33 in the ventilation air flow.

A cold air bypass passage 65 in which the ventilation air after passing through the inside evaporator 23 flows while bypassing the heater core 33 is provided in the casing 61. An air mix door 64 is disposed on the downstream side of the inside evaporator 23 in the casing 61 in the ventilation air flow and on the upstream side of the heater core 33 in the ventilation air flow.

The air mix door 64 is an air-volume-ratio regulating unit that regulates an air volume ratio between the volume of the ventilation air passing through the side of the heater core 33 and the volume of the ventilation air passing through the cold air bypass passage 65 in the ventilation air after passing through the inside evaporator 23. The air mix door 64 is driven by an air mix door electric actuator. The operation of the electric actuator is controlled by a control signal output from the controller 70.

A mixing space is disposed on the downstream side of the heater core 33 in the casing 61 and the cold air bypass passage 65 in the ventilation air flow. The mixing space is a space for mixing the ventilation air heated by the heater core 33 and the ventilation air passing through the cold air bypass passage 65 and not heated.

Further, openings for blowing the ventilation air (that is, the conditioned air) mixed in the mixing space into the vehicle cabin that is a space to be air conditioned are arranged in the downstream portion of the casing 61 in the ventilation air flow. As the openings, a face opening, a foot opening, and a defroster opening (all not illustrated) are formed.

The face opening is an opening for blowing conditioned air toward the upper body of a passenger in the vehicle cabin. The foot opening is an opening for blowing conditioned air toward the feet of the passenger in the vehicle cabin. The defroster opening is an opening for blowing conditioned air toward the inside surface of a vehicle front window glass.

The face opening, the foot opening, and the defroster opening are respectively connected to a face blow-out port, a foot blow-out port, and a defroster blow-out port (all not illustrated) formed in the vehicle cabin through ducts forming air passages.

The temperature of the conditioned air to be mixed in the mixing space is regulated by the air mix door 64 regulating the air volume ratio between the volume of air passing through the heater core 33 and the volume of air passing through the cold air bypass passage 65. As a result, the temperature of the ventilation air blown into the vehicle cabin from each of the blow-out ports is regulated.

A face door, a foot door, and a defroster door (all not illustrated) are arranged on the upstream side of the face opening, the foot opening, and the defroster opening, respectively, in the ventilation air flow. The face door regulates the opening area of the face opening. The foot door regulates the opening area of the foot opening. The defroster door regulates the opening area of the defroster opening.

The face door, the foot door, and the defroster door constitute a blow-out port mode switching device that switches a blow-out port mode. These doors are connected to an electric actuator for driving a blow-out port mode door via a link mechanism or the like, and are rotated in conjunction therewith. The operation of the electric actuator is also controlled by a control signal output from the controller 70.

Specific examples of the blow-out port mode switched by the blow-out port mode switching device include a face mode, a bi-level mode, and a foot mode.

The face mode is a blow-out port mode in which the face blow-out port is fully opened and air is blown from the face blow-out port toward the upper body of the passenger in the vehicle cabin. The bi-level mode is a blow-out port mode in which both the face blow-out port and the foot blow-out port are opened and air is blown toward the upper body and the feet of the passenger in the vehicle cabin. The foot mode is a blow-out port mode in which the foot blow-out port is fully opened and the defroster blow-out port is opened with a small opening and air is mainly blown from the foot blow-out port.

Further, the blow-out port mode can be switched to the defroster mode by the passenger manually operating a blow-out mode selector switch provided on an operation panel 71. The defroster mode is a blow-out port mode in which the defroster blow-out port is fully opened and air is blown out from the defroster blow-out port to the inside surface of the front window glass.

Next, the outline of the electric control unit of the vehicle air conditioner 1 will be described with reference to FIG. 4. The controller 70 includes a known microcomputer including a CPU, a ROM, a RAM, and the like, and peripheral circuits thereof. The controller 70 performs various calculations and processes on the basis of an air conditioning control program stored in the ROM, and controls the operations of various control target devices connected to the output side.

The various control target devices include the compressor 11, the dehumidifying on-off valve 17a, the heating on-off valve 17b, the heating expansion valve 20a, the cooling expansion valve 20b, the cooling expansion valve 20c, and the outside air fan 22a. The various control target devices further include the high-temperature-side pump 32, the water heater 34, the low-temperature-side pump 42, the electric heater 44, the device-side pump 52, the device-side three-way valve 54, the blower 62, the inside-air and outside-air switching device 63, the air mix door 64, and the like.

Figure 4:
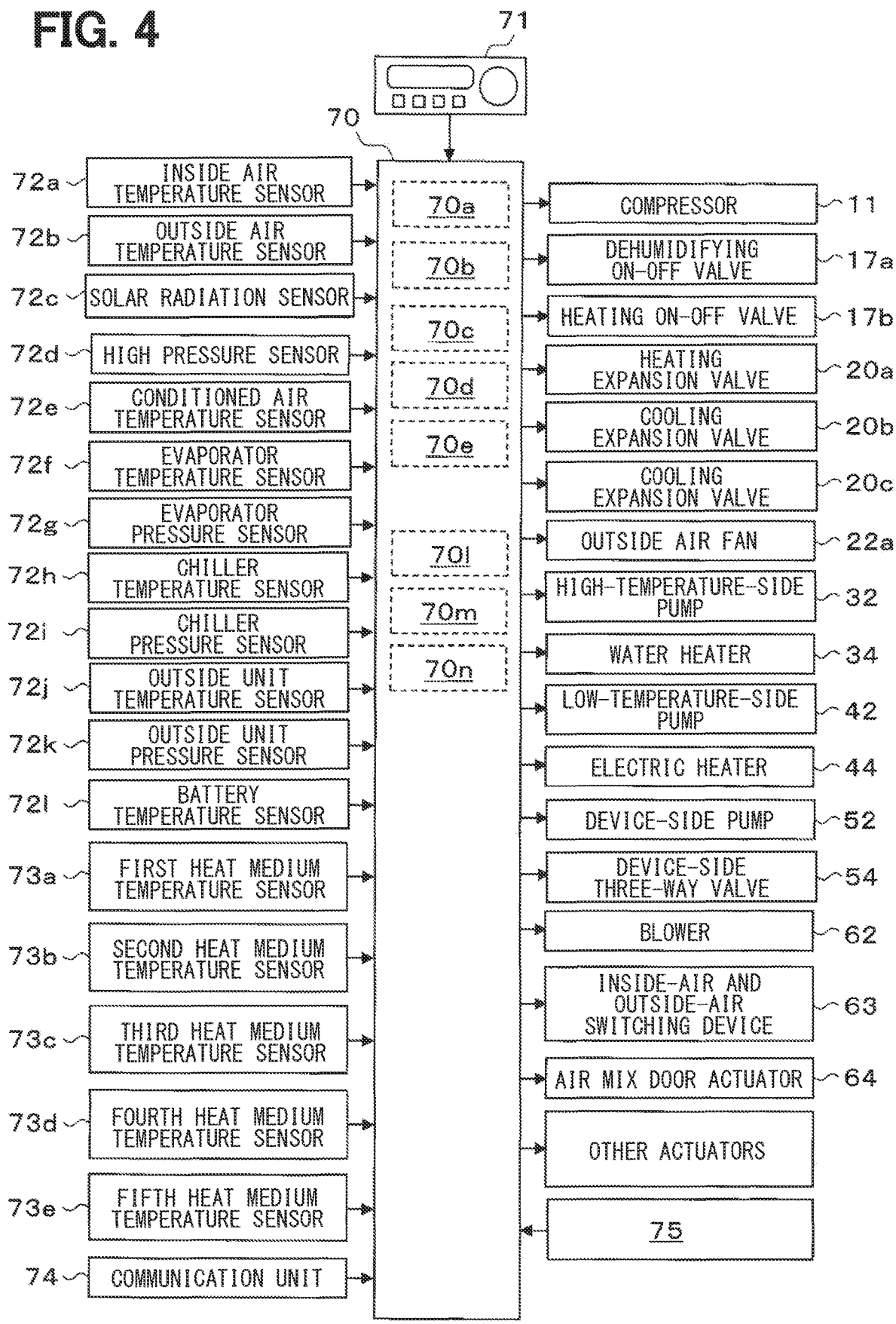
FIG. 4 is a block diagram illustrating an electric control unit of the vehicle air conditioner according to the first embodiment.

As illustrated in FIG. 4, various control sensors are connected to the input side of the controller 70. The control sensors include an inside air temperature sensor 72a, an outside air temperature sensor 72b, a solar radiation sensor 72c, a high pressure sensor 72d, and a conditioned air temperature sensor 72e. The control sensors further include an evaporator temperature sensor 72f, an evaporator pressure sensor 72g, a chiller temperature sensor 72h, a chiller pressure sensor 72i, an outside unit temperature sensor 72j, an outside unit pressure sensor 72k, and a battery temperature sensor 72l.

The inside air temperature sensor 72a is an inside temperature detection unit that detects an inside temperature Tr that is the temperature inside the vehicle cabin. The outside air temperature sensor 72b is an outside air temperature detection unit that detects an outside air temperature Tam that is the temperature outside the vehicle cabin. The solar radiation sensor 72c is a solar-radiation amount detection unit that detects a solar radiation amount As with which the vehicle cabin is irradiated.

The high pressure sensor 72d is a high pressure detection unit that detects a high pressure Pd that is the pressure of the high-pressure refrigerant discharged from the compressor 11. The conditioned air temperature sensor 72e is a conditioned-air temperature detection unit that detects a ventilation air temperature TAV of the ventilation air blown into the vehicle cabin from the mixing space.

The evaporator temperature sensor 72f is an evaporator temperature detection unit that detects a refrigerant evaporation temperature (an evaporator temperature) Te in the inside evaporator 23. Specifically, the evaporator temperature sensor 72f of the present embodiment detects the temperature of the refrigerant on the outlet port side of the inside evaporator 23.

The evaporator pressure sensor 72g is an evaporator pressure detection unit that detects a refrigerant evaporation pressure Pe in the inside evaporator 23. Specifically, the evaporator pressure sensor 72g of the present embodiment detects the pressure of the refrigerant on the outlet port side of the inside evaporator 23.

The chiller temperature sensor 72h is a chiller-side refrigerant temperature detection unit that detects a refrigerant evaporation temperature in the refrigerant passage 24a of the chiller 24. Specifically, the chiller temperature sensor 72h according to the present embodiment detects the temperature of the refrigerant on the outlet port side of the refrigerant passage 24a in the chiller 24.

The chiller pressure sensor 72i is a chiller-side refrigerant pressure detection unit that detects a refrigerant evaporation pressure in the refrigerant passage 24a of the chiller 24. Specifically, the chiller pressure sensor 72i detects the pressure of the refrigerant on the outlet port side of the refrigerant passage 24a in the chiller 24.

The outside unit temperature sensor 72j is an outside unit temperature detection unit that detects an outside unit refrigerant temperature T1 that is the temperature of the refrigerant flowing through the outside air-refrigerant heat exchange unit 29a of the combined heat exchanger 29. Specifically, the outside unit temperature sensor 72j of the present embodiment detects the temperature of the refrigerant on the outlet port side of the outside air-refrigerant heat exchange unit 29a in the combined heat exchanger 29.

The outside unit pressure sensor 72k is an outside unit pressure detection unit that detects an outside unit refrigerant pressure P1 that is the pressure of the refrigerant flowing through the outside air-refrigerant heat exchange unit 29a of the combined heat exchanger 29. Specifically, the outside unit pressure sensor 72k of the present embodiment detects the pressure of the refrigerant on the outlet port side of the outside air-refrigerant heat exchange unit 29a in the combined heat exchanger 29.

The battery temperature sensor 72l is a battery temperature detection unit that detects a battery temperature TB that is the temperature of the battery 75. The battery temperature sensor 72l includes a plurality of temperature detection units, and detects temperatures at a plurality of portions of the battery 75. As a result, the controller 70 can also detect a temperature difference between the individual parts of the battery 75. Furthermore, the average value of detection values of the plurality of temperature sensors is used as the battery temperature TB.

A plurality of heat medium temperature sensors are connected to the input side of the controller 70 in order to detect the temperature of each heat medium in the high-temperature-side heat medium circuit 30, the low-temperature-side heat medium circuit 40, and the device-side heat medium circuit 50a. The heat medium temperature sensors include a first heat medium temperature sensor 73a to a fifth heat medium temperature sensor 73e.

The first heat medium temperature sensor 73a is disposed at the outlet port portion of the heat medium passage 12b in water refrigerant heat exchanger 12, and detects the temperature of the high-temperature-side heat medium flowing out of the water-refrigerant heat exchanger 12. The second heat medium temperature sensor 73b is disposed at the outlet port portion of the heater core 33, and detects the temperature of the high-temperature-side heat medium passing through the heater core 33.

The third heat medium temperature sensor 73c is disposed at the outlet port portion of the heat medium passage in the water heater 34, and detects the temperature of the high-temperature-side heat medium flowing out of the water heater 34. The fourth heat medium temperature sensor 73d is disposed at the inlet port portion of the heat medium passage in the chiller 24, and detects the temperature of the heat medium flowing into the chiller 24.

The fifth heat medium temperature sensor 73e is disposed at the outlet port portion of the heat medium passage 43a in the battery heat exchange unit 43, and detects the temperature of the low-temperature-side heat medium flowing out of the heat medium passage 43a in the battery heat exchange unit 43.

The vehicle air conditioner 1 refers to the detection results of the temperature sensors such as the first heat medium temperature sensor 73a to the fifth heat medium temperature sensor 73e, and switches the flow of the heat medium in the high-temperature-side heat medium circuit 30, the low-temperature-side heat medium circuit 40, and the device-side heat medium circuit 50a.

Furthermore, the operation panel 71 disposed near the instrument panel at the front of the vehicle cabin is connected to the input side of the controller 70. Operation signals from various operation switches provided on the operation panel 71 are input to the controller 70.

Specific examples of the various operation switches provided on the operation panel 71 include an automatic switch, an air conditioner switch, an air volume setting switch, and a temperature setting switch. The automatic switch is an operation switch that sets or cancels the automatic control operation of the refrigeration cycle device 10.

The air conditioner switch is an operation switch that requests the inside evaporator 23 to cool ventilation air. The air volume setting switch is an operation switch that manually sets the air volume of the blower 62. The temperature setting switch is an operation switch that sets a target temperature Tset in the vehicle cabin.

A communication unit 74 is further connected to the controller 70. The communication unit 74 communicates and acquires various types of information via a public network such as the Internet and a mobile phone network and a network including a base station. The controller 70 can thus acquire weather information and the like of the current position of the electric vehicle on which the vehicle air conditioner 1 is mounted.

The controller 70 of the present embodiment is integrally configured with control units which control various control target devices connected to the output side of the controller 70. A configuration (that is, hardware and software) that controls the operation of each control target device configures the control unit that controls the operation of each control target device.

For example, the configuration of the controller 70 that determines whether or not the amount of frosting of the combined heat exchanger 29 exceeds a predetermined reference configures a frosting determination unit 70a. The configuration of the controller 70 that determines whether or not all the frost adhering to the combined heat exchanger 29 is melted by a defrosting operation configures a melting determination unit 70b.

The configuration of the controller 70 that determines whether or not the amount of heat of the low-temperature-side heat medium in the low-temperature-side heat medium circuit 40 is equal to or larger than a predetermined reference amount of heat during the defrosting operation configures a heat-amount determination unit 70c.

The configuration of the controller 70 that estimates the amount of frost adhering to the combined heat exchanger 29 before the defrosting operation in a dry defrosting mode to be described later starts configures a frost-amount estimation unit 70d. The configuration of the controller 70 that estimates the time required to evaporate and remove the frost of the amount of formed frost estimated by the frost-amount estimation unit 70d configures a required-time estimation unit 70e.

The configuration of the controller 70 that executes control to melt the frost adhering to the combined heat exchanger 29 in melting-defrosting configuring the dry defrosting mode to be described later configures a melting control unit 70l. The configuration of the controller 70 that executes control to evaporate and remove, from the combined heat exchanger 29, water generated by the melting of frost in dry defrosting configuring the dry defrosting mode configures a dry control unit 70m.

Further, the configuration of the controller 70 that determines whether or not drying of the combined heat exchanger 29 by evaporating and removing the water generated by the melting of frost in dry defrosting in the dry defrosting mode is completed configures a dry completion determination unit 70n.

Next, the operation of the vehicle air conditioner according to the first embodiment will be described. The vehicle air conditioner 1 is configured to be able to switch refrigerant circuits in order to perform air conditioning in the vehicle cabin and cool the battery 75.

Specifically, the vehicle air conditioner 1 can switch to a refrigerant circuit in a heating mode, a refrigerant circuit in a cooling mode, a refrigerant circuit in a dehumidifying and heating mode, and the like in order to perform air conditioning in the vehicle cabin. The heating mode is an operation mode in which heated ventilation air is blown into the vehicle cabin. The cooling mode is an operation mode in which cooled ventilation air is blown into the vehicle cabin. The dehumidifying and heating mode is an operation mode in which cooled and dehumidified ventilation air is reheated and blown into the vehicle cabin.

These operation modes are switched by executing an air conditioning control program stored in advance in the controller 70. The air conditioning control program is executed when the automatic switch of the operation panel 71 is turned on (ON). In the air conditioning control program, the operation mode is switched based on detection signals of various control sensors and operation signals of the operation panel.

Figure 5:
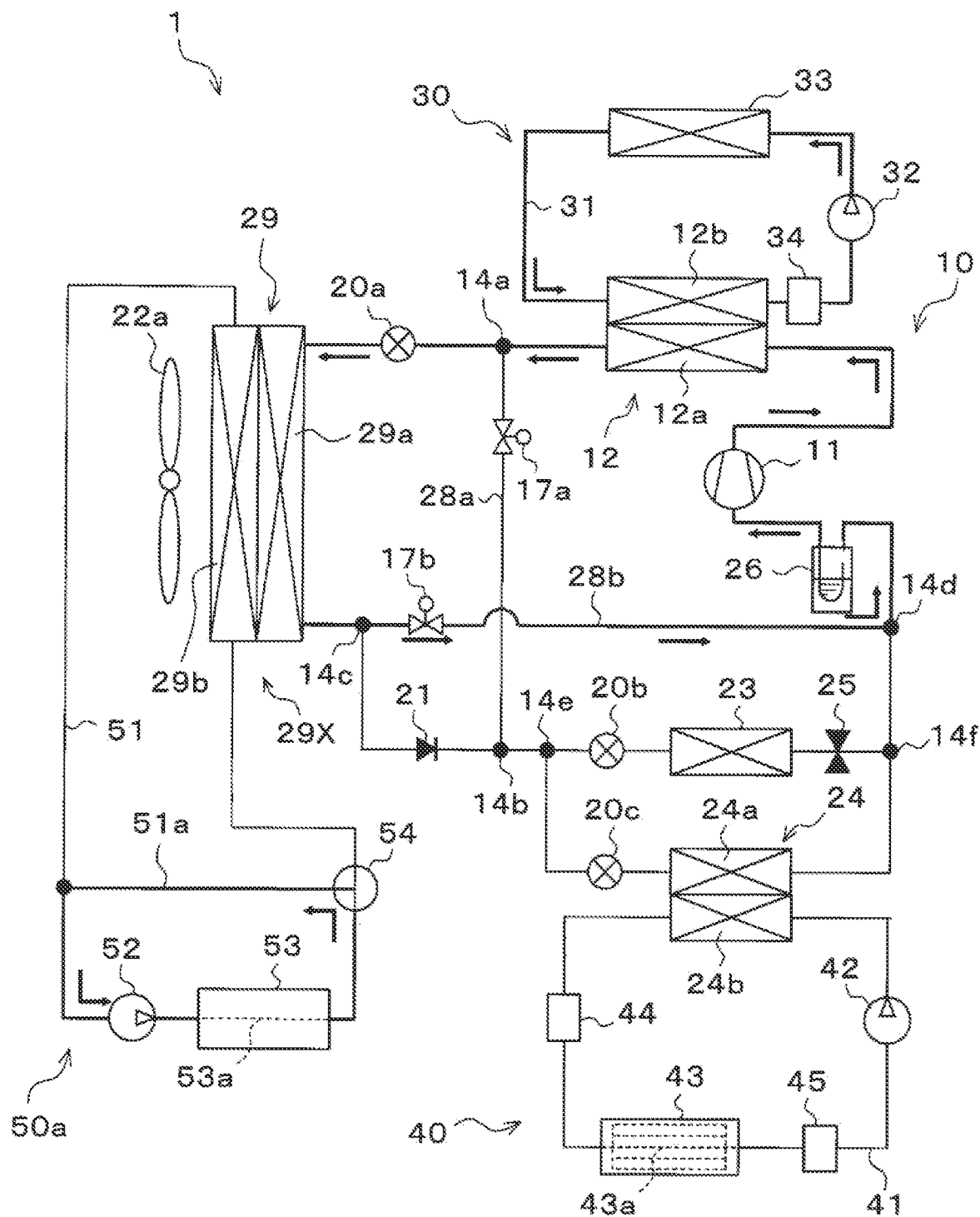
FIG. 5 is an overall configuration diagram illustrating an operation of the vehicle air conditioner according to the first embodiment in a heating mode.

The heating mode in the vehicle air conditioner 1 according to the present embodiment will be described with reference to FIG. 5. In the heating mode, the controller 70 closes the dehumidifying on-off valve 17a and opens the heating on-off valve 17b. The controller 70 brings the heating expansion valve 20a into a throttled state where the refrigerant decompression action is performed, and brings the cooling expansion valve 20b and the cooling expansion valve 20c into a fully closed state.

The controller 70 operates the high-temperature-side pump 32 to pump the high-temperature-side heat medium with predetermined pumping capability. In the heating mode, the controller 70 keeps the low-temperature-side pump 42 stopped.

In the device-side heat medium circuit 50a, the controller 70 operates the device-side three-way valve 54 in such a manner that the heat medium passage 53a of the heat generating device 53 and the device-side bypass flow path 51a communicate with each other, and the inlet and outlet port to the outside air-heat medium heat exchange unit 29b of the combined heat exchanger 29 is closed. At this time, the controller 70 controls the operation of the device-side pump 52 in such a manner that the heat medium temperature of the device-side heat medium circuit 50a falls within a temperature range set in the heat generating device 53.

As a result, the vapor compression refrigeration cycle is configured in the refrigeration cycle device 10 in the heating mode. As illustrated in FIG. 5, the refrigerant in the heating mode flows and circulates through the compressor 11, the water-refrigerant heat exchanger 12, the heating expansion valve 20a, the combined heat exchanger 29, the heating on-off valve 17b, the accumulator 26, and the compressor 11 in this order.

With this circuit configuration, the controller 70 controls the operations of the various control target devices. For example, in the case of the compressor 11, the controller 70 controls the refrigerant discharge capability in such a manner that the temperature of the high-temperature-side heat medium in the heater core 33 approaches a target high-temperature-side heat medium temperature.

The target high-temperature-side heat medium temperature is determined based on a target blowing temperature TAO with reference to a heating mode control map stored in advance in the controller 70. The target blowing temperature TAO is calculated using detection signals of various control sensors and operation signals of the operation panel.

The controller 70 controls the opening of the air mix door 64 in such a manner that the ventilation air temperature TAV detected by the conditioned air temperature sensor 72e approaches the target blowing temperature TAO. In the heating mode, the opening of the air mix door 64 may be controlled in such a manner that the total volume of the ventilation air having passed through the inside evaporator 23 flows into the water-refrigerant heat exchanger 12.

In the refrigeration cycle device 10, when the compressor 11 operates, the high-pressure refrigerant discharged from the compressor 11 flows into the refrigerant passage 12a of the water-refrigerant heat exchanger 12. The refrigerant flowing into the water-refrigerant heat exchanger 12 radiates heat to the high-temperature-side heat medium flowing through the heat medium passage 12b and condenses. As a result, the high-temperature-side heat medium is heated in the water-refrigerant heat exchanger 12.

At this time, in the high-temperature-side heat medium circuit 30, the high-temperature-side heat medium circulates by the operation of the high-temperature-side pump 32. The high-temperature-side heat medium heated by the water-refrigerant heat exchanger 12 flows into the heater core 33 via the water heater 34 and the high-temperature-side pump 32. The high-temperature-side heat medium flowing into the heater core 33 exchanges heat with the ventilation air having passed through the inside evaporator 23. As a result, the ventilation air supplied to the vehicle cabin is heated using at least the high-pressure refrigerant as a heat source.

The refrigerant flowing out of the water-refrigerant heat exchanger 12 flows into the heating expansion valve 20a via the first connection portion 14a, and is decompressed to become a low-pressure refrigerant. The low-pressure refrigerant decompressed by the heating expansion valve 20a flows into the outside air-refrigerant heat exchange unit 29a of the combined heat exchanger 29. The refrigerant flowing into the outside air-refrigerant heat exchange unit 29a of the combined heat exchanger 29 exchanges heat with the outside air supplied from the outside air fan 22a, absorbs heat from the outside air, and evaporates.

The refrigerant flowing out of the combined heat exchanger 29 flows into the accumulator 26 via the third connection portion 14c, the heating on-off valve 17b, and the fourth connection portion 14d. The gas-phase refrigerant separated into gas and liquid in the accumulator 26 is sucked into the compressor 11 and compressed again.

In the heating mode, the vehicle cabin can be heated by blowing the ventilation air heated by the heater core 33 into the vehicle cabin. In the heating mode, the waste heat of the heat generating device 53 can be stored in the heat medium of the device-side heat medium circuit 50a.

As described above, in the heating mode of the vehicle air conditioner 1 according to the present embodiment, the combined heat exchanger 29 absorbs heat from the outside air, and the heat absorbed from the outside air is used for heating the vehicle cabin. Here, in a case where the outside air is low temperature and high humidity air, frost is formed on the surface of the outside air-refrigerant heat exchange unit 29a of the combined heat exchanger 29, and the heat exchange performance of the combined heat exchanger 29 is degraded.

In other words, when frost is formed on the combined heat exchanger 29 in the heating mode, the amount of heat absorbed from the outside air in the combined heat exchanger 29 decreases, and as a result, the heating performance of the vehicle air conditioner 1 is degraded. Therefore, the vehicle air conditioner 1 according to the present embodiment performs a defrosting operation in a plurality of defrosting modes in order to cope with the frost formed on the combined heat exchanger 29.

The operation mode of the defrosting operation in the present embodiment includes a first condensation-heat defrosting mode, a second condensation-heat defrosting mode, a third condensation-heat defrosting mode, a hot gas defrosting mode, and a storage heat defrosting mode. The first condensation-heat defrosting mode, which is one of the operation modes of the defrosting operation, will be described with reference to FIG. 6.

The first condensation-heat defrosting mode is an operation mode in which the combined heat exchanger 29 is defrosted using heat absorbed from the ventilation air in the inside air conditioning unit 60 by the inside evaporator 23 and heat absorbed from the low-temperature-side heat medium circuit 40 by the chiller 24. The heat absorbed from the low-temperature-side heat medium circuit 40 by the chiller 24 includes heat radiated from the battery 75 to the low-temperature-side heat medium and heat applied to the low-temperature-side heat medium by the electric heater 44.

The first condensation-heat defrosting mode is performed, for example, at the time of defrosting the combined heat exchanger 29 in a case where the battery 75 of the electric vehicle is being charged and there is a heat capacity in the vehicle cabin. Since it is assumed that the amount of heat generated in the battery 75 is large during charging of the battery 75, heat generated in the battery 75 by charging can be effectively utilized for the defrosting of the combined heat exchanger 29.

In the first condensation-heat defrosting mode, the controller 70 closes the dehumidifying on-off valve 17*a* and the heating on-off valve 17*b*. The controller 70 brings the heating expansion valve 20*a* into a fully open state, and brings the cooling expansion valve 20*b* and the cooling expansion valve 20*c* into a throttled state.

The controller 70 operates the low-temperature-side pump 42 in the low-temperature-side heat medium circuit 40 to pump the low-temperature-side heat medium with predetermined pumping capability. In the first condensation-heat defrosting mode, the controller 70 keeps the high-temperature-side pump 32 in the high-temperature-side heat medium circuit 30 stopped.

In the device-side heat medium circuit 50*a*, the controller 70 operates the device-side three-way valve 54 in such a manner that the heat medium passage 53*a* of the heat generating device 53 and the device-side bypass flow path 51*a* communicate with each other, and the inlet and outlet port to the outside air-heat medium heat exchange unit 29*b* of the combined heat exchanger 29 is closed.

As a result, at least two refrigerant circulation circuits are configured in the refrigeration cycle device 10 in the case of the first condensation-heat defrosting mode. The refrigerant in the first condensation-heat defrosting mode flows and circulates through the compressor 11, the water-refrigerant heat exchanger 12, the heating expansion valve 20*a*, the combined heat exchanger 29, the check valve 21, the cooling expansion valve 20*b*, the inside evaporator 23, the evaporation pressure regulating valve 25, the accumulator 26, and the compressor 11 in this order.

At the same time, the refrigerant flows and circulates through the compressor 11, the water-refrigerant heat exchanger 12, the heating expansion valve 20*a*, the combined heat exchanger 29, the check valve 21, the cooling expansion valve 20*c*, the chiller 24, the accumulator 26, and the compressor 11 in this order.

With this circuit configuration, the controller 70 controls the operations of the various control target devices. For example, in the case of the compressor 11, the controller 70 controls the refrigerant discharge capability in such a manner that the temperature of the low-temperature-side heat medium in the chiller 24 approaches a target low-temperature-side heat medium temperature. The target low-temperature-side heat medium temperature is determined in such a manner that the battery temperature approaches an appropriate temperature range.

The controller 70 controls the throttle opening of the cooling expansion valve 20*b* in such a manner that the degree of superheating of the refrigerant on the outlet port side of the inside evaporator 23 approaches a predetermined reference evaporator-side degree of superheating (in the present embodiment, 5° C.). The degree of superheating of the refrigerant on the outlet port side of the inside evaporator 23 is calculated from the refrigerant evaporation temperature Te detected by the evaporator temperature sensor 72*f* and the refrigerant evaporation pressure Pe detected by the evaporator pressure sensor 72*g*.

The controller 70 controls the throttle opening of the cooling expansion valve 20*c* in such a manner that the degree of superheating of the refrigerant on the outlet port side of the refrigerant passage 24*a* in the chiller 24 approaches a predetermined reference chiller-side degree of superheating. The degree of superheating of the refrigerant on the outlet port side of the chiller 24 is calculated from the temperature of the refrigerant on the outlet port side detected by the chiller temperature sensor 72*h* and the pressure of the refrigerant on the outlet port side detected by the chiller pressure sensor 72*i*. The reference chiller-side degree of superheating is set in such a manner that the battery temperature TB is the temperature of the low-temperature-side heat medium that can be maintained within an appropriate temperature range of the battery 75.

Figure 6:
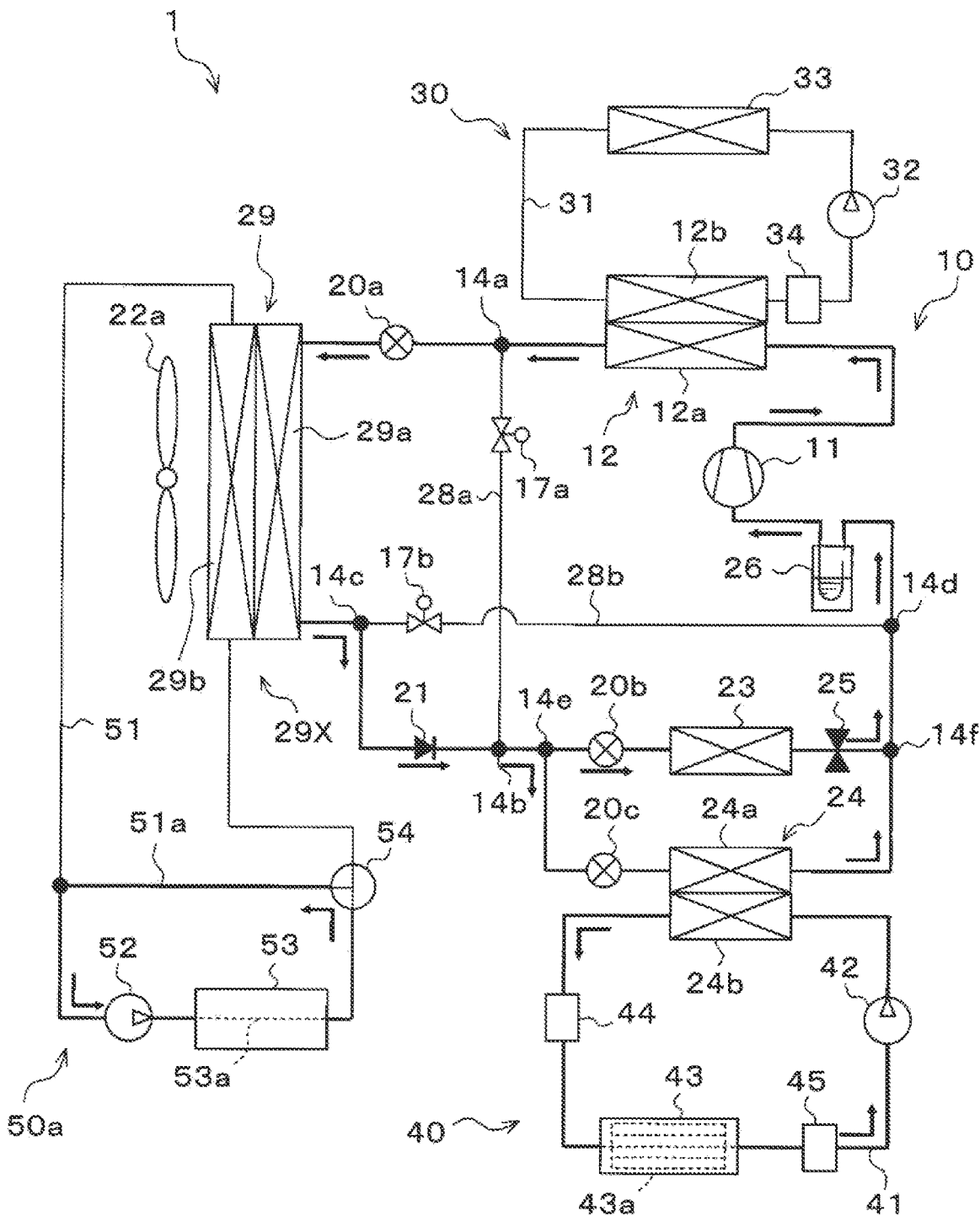
FIG. 6 is an overall configuration diagram illustrating an operation of the vehicle air conditioner according to the first embodiment in a first condensation-heat defrosting mode.

As illustrated in FIG. 6, in the refrigeration cycle device 10, the high-pressure refrigerant discharged from the compressor 11 passes through the refrigerant passage 12*a* of the water-refrigerant heat exchanger 12. At this time, in the high-temperature-side heat medium circuit 30, the high-temperature-side pump 32 is stopped, and thus the refrigerant flowing into the water-refrigerant heat exchanger 12 passes through the refrigerant passage 12*a* almost without radiating heat to the high-temperature-side heat medium flowing through the heat medium passage 12*b*.

The high-pressure refrigerant flowing out of the heat medium passage 12*b* of the water-refrigerant heat exchanger 12 passes through the heating expansion valve 20*a* in a fully open state via the first connection portion 14*a*, and flows into the outside air-refrigerant heat exchange unit 29*a* of the combined heat exchanger 29. Therefore, the high-pressure refrigerant discharged from the compressor 11 flows into the combined heat exchanger 29 almost without radiating heat. As a result, heat of the high-pressure refrigerant can be applied to the outside air-refrigerant heat exchange unit 29*a* of the combined heat exchanger 29, and the combined heat exchanger 29 can be defrosted.

The refrigerant flowing out of the outside air-refrigerant heat exchange unit 29*a* of the combined heat exchanger 29 flows into the fifth connection portion 14*e* via the third connection portion 14*c*, the check valve 21, and the second connection portion 14*b*. The refrigerant flowing out of one outlet port of the fifth connection portion 14*e* is decompressed by the cooling expansion valve 20*b* and flows into the inside evaporator 23. The low-pressure refrigerant flowing into the inside evaporator 23 absorbs heat from the air in the vehicle cabin within the casing 61 and evaporates.

The refrigerant flowing out of the other outlet port of the fifth connection portion 14*e* is decompressed by the cooling expansion valve 20*c* and flows into the refrigerant passage 24*a* of the chiller 24. Here, in the low-temperature-side heat medium circuit 40, the low-temperature-side pump 42 is operated, and thus the low-temperature-side heat medium having absorbed heat from the battery 75 is pumped to the heat medium passage 24b of the chiller 24. The low-pressure refrigerant flowing into the chiller 24 thus absorbs heat from the low-temperature-side heat medium heated by the waste heat of the battery 75 and evaporates.

The refrigerant flowing out of the inside evaporator 23 and the refrigerant flowing out of the chiller 24 are merged at the sixth connection portion 14f to flow into the accumulator 26 via the fourth connection portion 14d. The accumulator 26 separates the refrigerant into gas and liquid and the gas-phase refrigerant is sucked into the compressor 11 and compressed again.

As described above, in the first condensation-heat defrosting mode, the heat of the air in the vehicle cabin absorbed by the inside evaporator 23 and the heat generated in the battery 75 absorbed by the chiller 24 can be pumped up by the refrigeration cycle device 10 and used for defrosting the combined heat exchanger 29.

In the first condensation-heat defrosting mode, the waste heat of the heat generating device 53 can be stored in the heat medium of the device-side heat medium circuit 50a. At this time, by controlling the operation of the device-side three-way valve 54, the stored waste heat of the heat generating device 53 can be used for defrosting the combined heat exchanger 29.

The second condensation-heat defrosting mode, which is one of the operation modes of the defrosting operation, will be described with reference to FIG. 7. The second condensation-heat defrosting mode is an operation mode in which the combined heat exchanger 29 is defrosted using heat absorbed from the low-temperature-side heat medium circuit 40 by the chiller 24. The second condensation-heat defrosting mode is performed, for example, at the time of defrosting the combined heat exchanger 29 in a case where the battery 75 of the electric vehicle is being charged.

In the second condensation-heat defrosting mode, the controller 70 closes the dehumidifying on-off valve 17a and the heating on-off valve 17b. The controller 70 brings the heating expansion valve 20a into a fully open state, and brings the cooling expansion valve 20c into a throttled state. The controller 70 further brings the cooling expansion valve 20b into a fully closed state.

The controller 70 operates the low-temperature-side pump 42 to pump the low-temperature-side heat medium with predetermined pumping capability. The controller 70 keeps the high-temperature-side pump 32 in the high-temperature-side heat medium circuit 30 stopped.

In the device-side heat medium circuit 50a, the controller 70 operates the device-side three-way valve 54 in such a manner that the heat medium passage 53a of the heat generating device 53 and the device-side bypass flow path 51a communicate with each other, and the inlet and outlet port to the outside air-heat medium heat exchange unit 29b of the combined heat exchanger 29 is closed. At this time, the controller 70 controls the operation of the device-side pump 52 in such a manner that the heat medium temperature of the device-side heat medium circuit 50a falls within a temperature range set in the heat generating device 53.

As a result, the vapor compression refrigeration cycle is configured in the refrigeration cycle device 10 in the case of the second condensation-heat defrosting mode. The refrigerant flows and circulates through the compressor 11, the water-refrigerant heat exchanger 12, the heating expansion valve 20a, the combined heat exchanger 29, the check valve 21, the cooling expansion valve 20c, the chiller 24, the accumulator 26, and the compressor 11 in this order.

With this circuit configuration, the controller 70 controls the operations of the various control target devices. In the second condensation-heat defrosting mode, the control target devices are controlled in a manner similar to that in the first condensation-heat defrosting mode except for the cooling expansion valve 20b.

Figure 7:
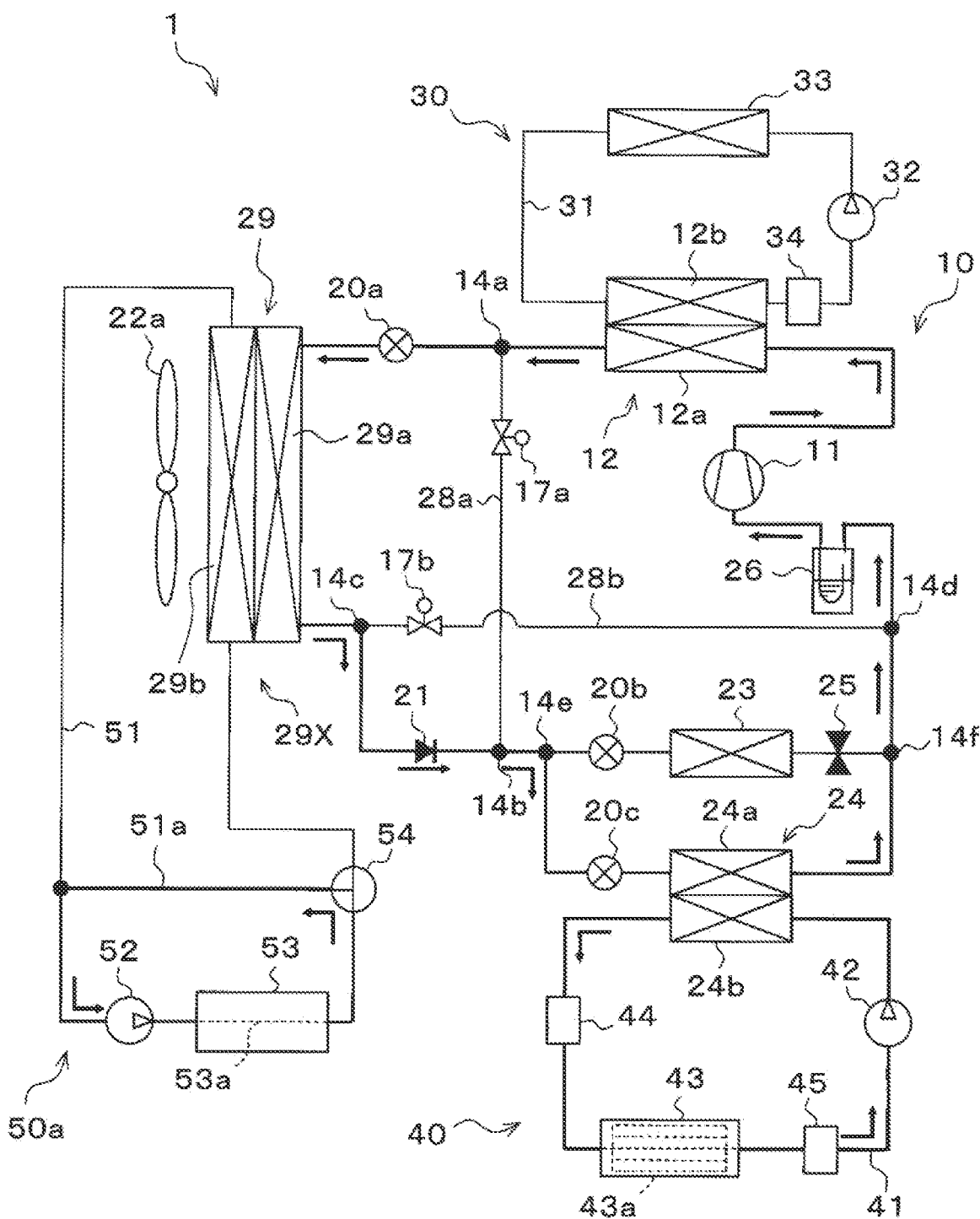
FIG. 7 is an overall configuration diagram illustrating an operation the vehicle air conditioner according to the first embodiment in a second condensation-heat defrosting mode.

As illustrated in FIG. 7, in the refrigeration cycle device 10, the high-pressure refrigerant discharged from the compressor 11 passes through the refrigerant passage 12a of the water-refrigerant heat exchanger 12. The high-pressure refrigerant flowing out of the water-refrigerant heat exchanger 12 passes through the heating expansion valve 20a in a fully open state, and flows into the combined heat exchanger 29.

Therefore, the high-pressure refrigerant discharged from the compressor 11 flows into the combined heat exchanger 29 almost without radiating heat. As a result, the heat of the high-pressure refrigerant can be applied to the combined heat exchanger 29, and the combined heat exchanger 29 can be defrosted.

The refrigerant flowing out of the combined heat exchanger 29 flows into the cooling expansion valve 20c via the check valve 21, the second connection portion 14b, and the fifth connection portion 14e, is decompressed by the cooling expansion valve, and flows into the refrigerant passage 24a of the chiller 24. The low-pressure refrigerant flowing into the chiller 24 thus absorbs heat from the low-temperature-side heat medium heated by the waste heat of the battery 75 and evaporates.

The refrigerant flowing out of the chiller 24 flows into the accumulator 26 via the sixth connection portion 14f and the fourth connection portion 14d. The accumulator 26 separates the refrigerant into gas and liquid and the gas-phase refrigerant is sucked into the compressor 11 and compressed again.

As described above, in the second condensation-heat defrosting mode, the heat generated in the battery 75 and absorbed by the chiller 24 can be pumped up by the refrigeration cycle device 10 and used for defrosting the combined heat exchanger 29.

In the second condensation-heat defrosting mode, the waste heat of the heat generating device 53 can be stored in the heat medium of the device-side heat medium circuit 50a. At this time, by controlling the operation of the device-side three-way valve 54, the stored waste heat of the heat generating device 53 can be used for defrosting the combined heat exchanger 29.

Next, the third condensation-heat defrosting mode, which is one of the operation modes of the defrosting operation, will be described. The third condensation-heat defrosting mode is an operation mode in which the combined heat exchanger 29 is defrosted using heat absorbed from the air inside the vehicle cabin by the inside evaporator 23. The third condensation-heat defrosting mode is performed, for example, at the time of defrosting the combined heat exchanger 29 in a case where the temperature of the low-temperature-side heat medium is lowered and there is a heat capacity in the vehicle cabin.

The operations of the various control target devices in the third condensation-heat defrosting mode are similar to those in the first condensation-heat defrosting mode described above except that the cooling expansion valve 20c is closed. That is, the refrigerant in the third condensation-heat defrosting mode flows and circulates through the compressor 11, the water-refrigerant heat exchanger 12, a second on-off valve 16b, the heating expansion valve 20a, the combined heat exchanger 29, the cooling expansion valve 20b, the inside evaporator 23, the accumulator 26, and the compressor 11 in this order. As a result, in the third condensation-heat defrosting mode, the heat of the air in the vehicle cabin can be pumped up by the refrigeration cycle device 10 and used for defrosting the combined heat exchanger 29.

The vehicle air conditioner 1 is configured to change the cooling expansion valve 20c from a closed state to a throttled state to perform the defrosting operation in the first condensation-heat defrosting mode in a case where cooling of the battery 75 is requested during the defrosting operation in the third condensation-heat defrosting mode.

In a case where the combined heat exchanger 29 is defrosted in the condensation-heat defrosting mode in the vehicle air conditioner 1, the second condensation-heat defrosting mode and the third condensation-heat defrosting mode are selectively used in accordance with the temperature of the low-temperature-side heat medium in the low-temperature-side heat medium circuit 40.

For example, in a case where the low-temperature-side heat medium temperature is equal to or higher than a reference low-temperature-side heat medium temperature (for example, 0° C.) indicating that the calorific value of the battery 75 is large, the second condensation-heat defrosting mode is performed as the operation mode of the defrosting operation. In a case where the low-temperature-side heat medium temperature is lower than the reference low-temperature-side heat medium temperature, the third condensation-heat defrosting mode is performed as the operation mode of the defrosting operation. As a result, the waste heat of the battery 75 can be effectively utilized as the defrosting heat source in the defrosting operation.

In a case where the defrosting operation is performed in the first condensation-heat defrosting mode or the second condensation-heat defrosting mode during the charging of the battery 75, the electric heater 44 may assist the defrosting operation in such a manner that the low-temperature-side heat medium temperature falls within a predetermined low-temperature-side heat medium temperature range. The low-temperature-side heat medium temperature range is the temperature range of the low-temperature-side heat medium set from the viewpoint of ensuring the charging capacity of the battery 75 and preventing degradation in such a manner that the charging efficiency of the battery 75 is maximized, and is, for example, 0° C. to 40° C.

The hot gas defrosting mode, which is one of the operation modes of the defrosting operation in the present embodiment, will be described with reference to FIG. 8. The hot gas defrosting mode is an operation mode in which defrosting is performed by increasing the temperature of the gas-phase refrigerant flowing into the combined heat exchanger 29 by the compression work or the like of the compressor 11. The hot gas defrosting mode is performed, for example, at the time of defrosting the combined heat exchanger 29 in a case where the temperature of the low-temperature-side heat medium is lowered and heat absorption from the battery 75 is prohibited.

In the hot gas defrosting mode, the controller 70 closes the dehumidifying on-off valve 17a and opens the heating on-off valve 17b. The controller 70 brings the heating expansion valve 20a into a throttled state, and brings the cooling expansion valve 20b and the cooling expansion valve 20c into a fully closed state. The controller 70 keeps both the low-temperature-side pump 42 and the high-temperature-side pump 32 stopped.

In the device-side heat medium circuit 50a, the controller 70 operates the device-side three-way valve 54 in such a manner that the heat medium passage 53a of the heat generating device 53 and the device-side bypass flow path 51a communicate with each other, and the inlet and outlet port to the outside air-heat medium heat exchange unit 29b of the combined heat exchanger 29 is closed.

As a result, the vapor compression refrigeration cycle is configured in the refrigeration cycle device 10 in the case of the hot gas defrosting mode. The refrigerant flows and circulates through the compressor 11, the water-refrigerant heat exchanger 12, the heating expansion valve 20a, the combined heat exchanger 29, the heating on-off valve 17b, the accumulator 26, and the compressor 11 in this order.

With this circuit configuration, the controller 70 controls the operations of the various control target devices. In the hot gas defrosting mode, for example, the operation of the compressor 11 is controlled in such a manner that the compressor 11 exhibits predetermined refrigerant discharge capability.

The throttle opening of the heating expansion valve 20a is regulated to a predetermined throttle opening in the hot gas defrosting mode. For example, the throttle opening of the heating expansion valve 20a is regulated in such a manner that the refrigerant temperature on the outlet port side of the refrigerant passage 12a in the water-refrigerant heat exchanger 12 approaches the high-temperature-side heat medium temperature on the outlet port side of the heat medium passage 12b in the water-refrigerant heat exchanger 12.

Figure 8:
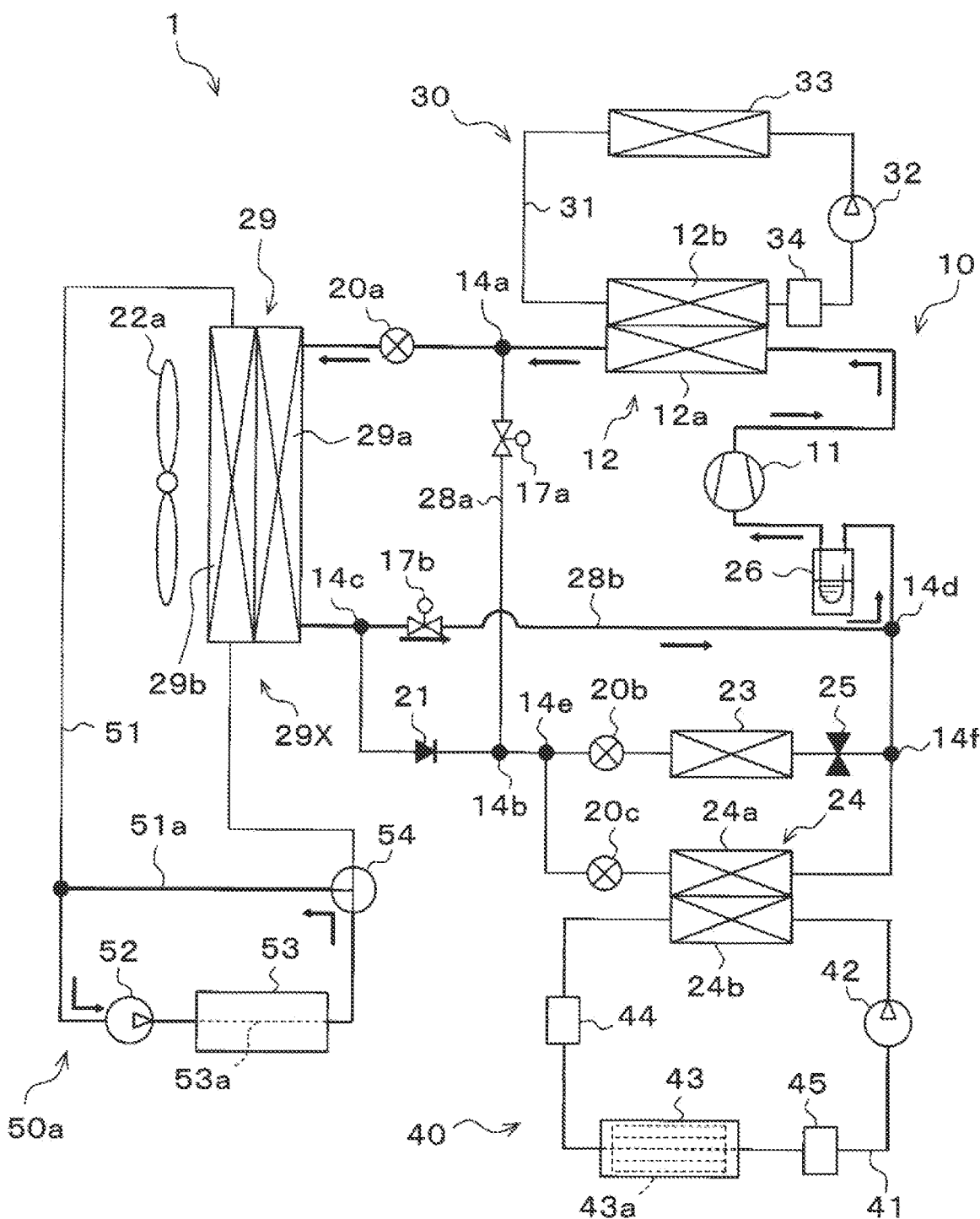
FIG. 8 is an overall configuration diagram illustrating an operation of the vehicle air conditioner according to the first embodiment in a hot gas defrosting mode.

As illustrated in FIG. 8, in the refrigeration cycle device 10, the high-pressure refrigerant discharged from the compressor 11 passes through the refrigerant passage 12a of the water-refrigerant heat exchanger 12. The high-pressure refrigerant flowing out of the water-refrigerant heat exchanger 12 passes through the heating expansion valve 20a in a fully open state, and flows into the combined heat exchanger 29.

Therefore, the high-pressure refrigerant discharged from the compressor 11 flows into the combined heat exchanger 29 almost without radiating heat. As a result, the heat of the high-pressure refrigerant applied by the compression work of the compressor 11 can be transferred to the combined heat exchanger 29, and the combined heat exchanger 29 can be defrosted.

The refrigerant flowing out of the combined heat exchanger 29 flows into the accumulator 26 via the third connection portion 14c, the heating on-off valve 17b, and the fourth connection portion 14d. The accumulator 26 separates the refrigerant into gas and liquid and the gas-phase refrigerant is sucked into the compressor 11 and compressed again.

As described above, in the hot gas defrosting mode, the heat applied to the high-pressure refrigerant by the compression work of the compressor 11 can be used to defrost the combined heat exchanger 29. In the hot gas defrosting mode, the waste heat of the heat generating device 53 can be stored in the heat medium of the device-side heat medium circuit 50a. At this time, by controlling the operation of the device-side three-way valve 54, the stored waste heat of the heat generating device 53 can be used for defrosting the combined heat exchanger 29.

Next, the storage heat defrosting mode, which is one of the operation modes of the defrosting operation, will be described with reference to FIG. 9. The storage heat defrosting mode is an operation mode in which the combined heat exchanger 29 is defrosted using heat stored in the heat medium circulating in the device-side heat medium circuit 50a. The storage heat defrosting mode is performed, for example, at the time of defrosting the combined heat exchanger 29 in a case where the operation of the refrigeration cycle device 10 is prohibited.

In the storage heat defrosting mode, the controller 70 stops the operation of the compressor 11, opens the dehumidifying on-off valve 17a, and closes the heating on-off valve 17b. The controller 70 brings the heating expansion valve 20a, the cooling expansion valve 20b, and the cooling expansion valve 20c into a fully open state. The controller 70 keeps both the low-temperature-side pump 42 and the high-temperature-side pump 32 stopped.

In the device-side heat medium circuit 50a, the controller 70 operates the device-side three-way valve 54 in such a manner that the heat medium passage 53a of the heat generating device 53 and the outside air-heat medium heat exchange unit 29b of the combined heat exchanger 29 communicate with each other, and the inlet and outlet port of the device-side bypass flow path 51a is closed. At this time, the controller 70 operates the device-side pump 52 to circulate the heat medium in the device-side heat medium circuit 50a so as to achieve the pumping capability set in the storage heat defrosting mode.

As a result, in the device-side heat medium circuit 50a, the heat medium flows and circulates through the device-side pump 52, the heat medium passage 53a of the heat generating device 53, the heat medium passage of the outside air-heat medium heat exchange unit 29b in the combined heat exchanger 29, and the device-side pump 52 in this order.

In the vehicle air conditioner 1, waste heat generated in the heat generating device 53 is stored in the heat medium circulating in the device-side heat medium circuit 50a in the heating mode or the like. Therefore, in the storage heat defrosting mode, the heat medium storing the waste heat of the heat generating device 53 can flow into the outside air-heat medium heat exchange unit 29b of the combined heat exchanger 29, and the waste heat of the heat generating device 53 can be transferred to the outside air-heat medium heat exchange unit 29b of the combined heat exchanger 29.

As illustrated in FIG. 2, in the combined heat exchanger 29, the outside air-heat medium heat exchange unit 29b and the outside air-refrigerant heat exchange unit 29a are thermally connected via the heat exchange fins 29e. Therefore, the waste heat of the heat generating device 53 can be transferred to the outside air-refrigerant heat exchange unit 29a via the outside air-heat medium heat exchange unit 29b and the heat exchange fins 29e, and can be used for defrosting the combined heat exchanger 29.

As described above, in the storage heat defrosting mode, the combined heat exchanger 29 can be defrosted by effectively utilizing the waste heat of the heat generating device 53 without operating the refrigeration cycle device 10.

The defrosting operation of the combined heat exchanger 29 in the vehicle air conditioner 1 according to the present embodiment is implemented by the controller 70 executing the defrosting control program stored in the ROM. This defrosting control program is executed in a case where the amount of frost adhering to the combined heat exchanger 29 exceeds a predetermined reference.

Figure 10:
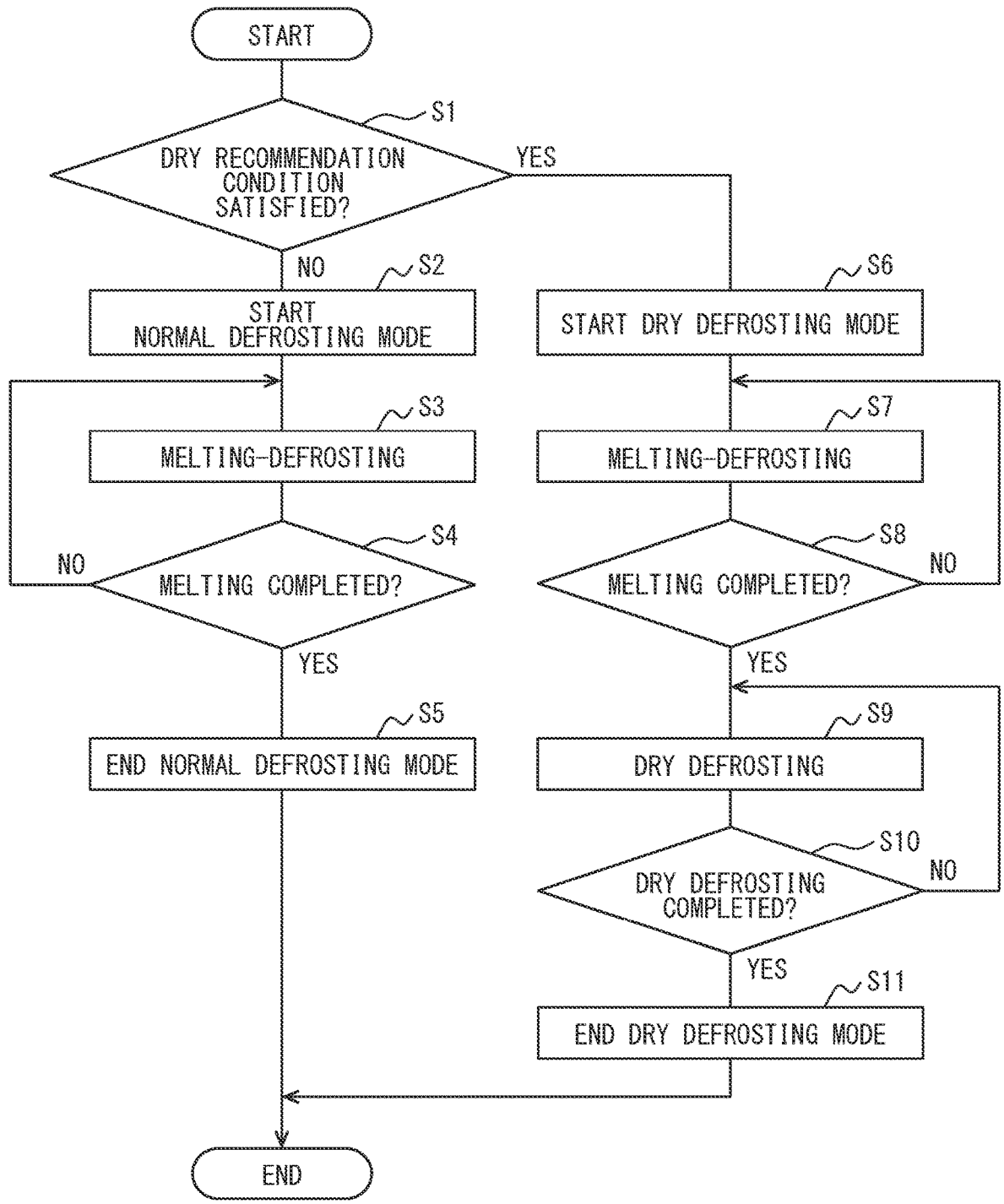
FIG. 10 is a flowchart of a defrosting control program in the vehicle air conditioner.

As illustrated in FIG. 10, the defrosting control program can perform a normal defrosting mode in which frost adhering to the combined heat exchanger 29 is melted, and a dry defrosting mode in which frost adhering to the combined heat exchanger 29 is melted, and residual water caused by melting is evaporated to be dried.

First, it is determined in step S1 whether or not the dry recommendation condition is satisfied. The dry recommendation condition is a criterion for determining whether or not there is a high possibility that the residual water is refrozen and the heat exchange performance of the combined heat exchanger 29 is degraded again if the residual water generated by the defrosting operation remains attached to the surface of the combined heat exchanger 29.

In the present embodiment, weather information or the like of the current position of the electric vehicle is acquired by the communication unit 74, and if a low outside air temperature of 0° C. or lower continues for a predetermined period in the future, it is determined that the dry recommendation condition is satisfied. If the dry recommendation condition is not satisfied, the defrosting operation in the normal defrosting mode starts in step S2. On the other hand, if the dry recommendation condition is satisfied, the defrosting operation in the dry defrosting mode starts in step S6.

First, the defrosting operation in the normal defrosting mode will be described. In the normal defrosting mode, melting-defrosting for melting frost adhering to the combined heat exchanger 29 is performed. In step S3, any one of the first condensation-heat defrosting mode to the third condensation-heat defrosting mode, the hot gas defrosting mode, and the storage heat defrosting mode is selected in accordance with the operation state of the vehicle air conditioner 1 and the surrounding environment, and melting-defrosting starts in the selected operation mode.

For example, in the condensation-heat defrosting mode such as the first condensation-heat defrosting mode, the controller 70 controls the refrigerant discharge capability of the compressor 11 in such a manner that the temperature of the low-temperature-side heat medium in the chiller 24 approaches the target low-temperature-side heat medium temperature (for example, 5° C.). The controller 70 controls the throttle openings of the cooling expansion valve 20b and the cooling expansion valve 20c in such a manner that the degree of superheating of the refrigerant on the outlet port side of the refrigerant passage 24a in the chiller 24 approaches the predetermined reference chiller-side degree of superheating (for example, 10° C.).

The outside air fan 22a corresponding to the amount of outside air supplied to the combined heat exchanger 29 is stopped in any operation mode. This is because, if the outside air is supplied at the time of melting frost, heat is removed by the outside air, so that the efficiency of melting the frost is reduced.

It is determined in step S4 whether or not the melting of the frost adhering to the combined heat exchanger 29 is completed. Specifically, for example, if the discharge pressure of compressor 11 is higher than a predetermined reference pressure (for example, 0.7 MPa), or if a predetermined period (for example, 300 s) has elapsed from the start of melting-defrosting, it is determined that the melting of the frost on the combined heat exchanger 29 is completed.

If it is determined that the melting of the frost on the combined heat exchanger 29 is completed, the process proceeds to step S5, and the defrosting operation in the normal defrosting mode is ended. On the other hand, if it is determined that the melting of the frost on the combined heat exchanger 29 is not completed, the process returns to step S3, and the melting-defrosting in the normal defrosting mode is continued.

As described above, even in a case where the frost adhering to the combined heat exchanger 29 is melted in the defrosting operation, if the outside air temperature is a low temperature of 0° C. or lower, water (hereinafter, also referred to as "residual water") generated by melting is frozen again, and the heat exchange performance of the combined heat exchanger 29 is degraded. The degradation in the heat exchange performance of the combined heat exchanger 29 causes a degradation in the air conditioning performance of the vehicle air conditioner 1 and the like, and thus it is necessary to prevent refreezing of water generated by defrosting.

As a method of preventing refreezing of residual water caused by defrosting, it is conceivable to evaporate water generated by defrosting to remove water from the surface of the combined heat exchanger 29. It is conceivable that there is an efficient condition for evaporating and removing water from the combined heat exchanger 29 during the defrosting operation in the vehicle air conditioner 1.

Therefore, in order to specify useful conditions in terms of energy efficiency and quality of the vehicle air conditioner 1 in evaporating and removing water from the combined heat exchanger 29, the evaporation of water in the combined heat exchanger 29 will be considered.

First, preconditions for considering the evaporation of water in the combined heat exchanger 29 will be described. It is assumed that the frost adhering to the combined heat exchanger 29 melts and becomes water in 1 to 2 minutes after the start of the defrosting operation and all the adhering frost is melted, from the tendency of past actual measurement results.

It is assumed that there is no distribution of the evaporation surface of the residual water on the surface of the combined heat exchanger 29. The refrigerant temperature in the combined heat exchanger 29 is assumed to be uniform at the condensation temperature. All the wind speeds on the evaporation surface of the residual water of the combined heat exchanger 29 are assumed to be uniform. In the evaporation and removal of residual water, changes over time such as transient changes in water surface area are ignored.

The evaporation water temperature of the residual water on the surface of the combined heat exchanger 29 is defined as the following relationship. The value obtained by multiplying the value obtained by subtracting the evaporation water temperature of the residual water from the refrigerant condensation temperature of the combined heat exchanger 29 by the conductivity of water and the evaporation surface area and dividing the multiplied value by the thickness of the residual water is equal to the value obtained by multiplying the value obtained by subtracting the refrigerant condensation temperature of the combined heat exchanger 29 from the outside air temperature by the thermal conductivity of water to air and the evaporation surface area.

With respect to the water retention state of the residual water in the air passage of the combined heat exchanger 29, it is assumed that the inside of a fin partitioning the air passage is not filled with the residual water, and the evaporation surface area of the combined heat exchanger 29 in this case has a predetermined value.

Under the preconditions described above, an evaporation rate Va per unit area will be considered using a plurality of experimental formulas illustrated in FIG. 11. Specifically, an experimental formula for a diffusion coefficient D, an experimental formula for a Reynolds number Re, an experimental formula for a Schmitt number Sc, an experimental formula for a Sherwood number Sh, and an experimental formula for the evaporation rate Va per unit area are used.

It is found from the experimental formulas shown in FIG. 11 that the evaporation rate Va per unit area tends to increase as a wind speed Vc increases. The evaporation rate Va per unit area tends to increase as the evaporation water temperature of residual water increases. The evaporation water temperature of the residual water increases as the refrigerant condensation temperature increases, and also increases as the wind speed Vc decreases. In a case where the wind speed Vc is increased at the same refrigerant condensation temperature, both factors of increasing and decreasing the evaporation rate Va per unit area are affected.

Figure 12:
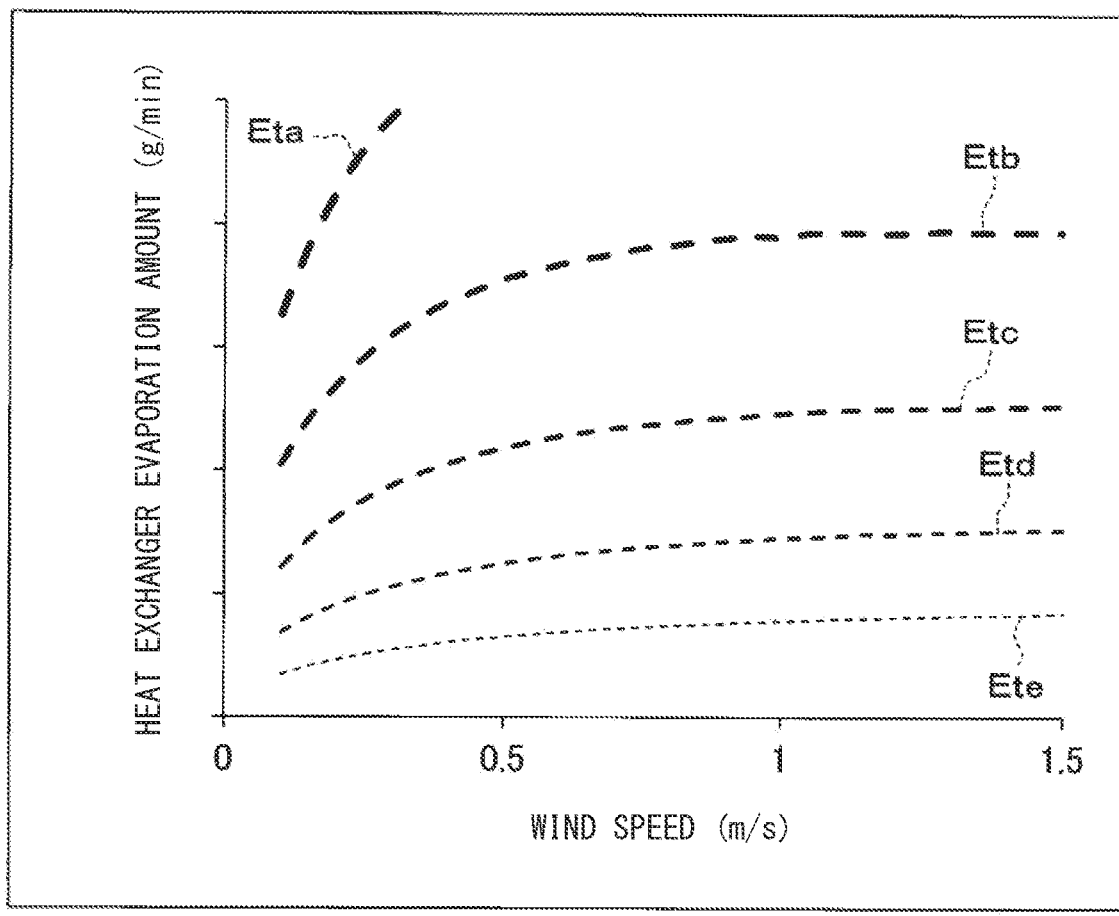
FIG. 12 is a graph showing a relationship between a heat exchanger evaporation amount and a wind speed for the condensation temperature of an outside air heat exchanger.

FIG. 12 illustrates a result of calculation of the relationship between a heat exchanger evaporation amount and the wind speed Vc for different refrigerant condensation temperatures using the experimental formulas shown in FIG. 11. Eta in FIG. 12 represents the relationship between the heat exchanger evaporation amount and the wind speed at a refrigerant condensation temperature of 20° C.

Similarly, Etb represents the relationship between the heat exchanger evaporation amount and the wind speed at a refrigerant condensation temperature of 30° C., and Etc represents the relationship between the heat exchanger evaporation amount and the wind speed at a refrigerant condensation temperature of 40° C. Etd represents the relationship between the heat exchanger evaporation amount and the wind speed at a refrigerant condensation temperature of 50° C., and Ete represents the relationship between the heat exchanger evaporation amount and the wind speed at a refrigerant condensation temperature of 60° C.

It can be seen from the graph shown in FIG. 12 that the heat exchanger evaporation amount tends to increase due to an increase in the evaporation water temperature of residual water due to an increase in the wind speed Vc. It can be seen that the heat exchanger evaporation amount tends to increase due to an increase in the evaporation water temperature of residual water due to an increase in refrigerant condensation temperature. That is, by appropriately regulating the refrigerant condensation temperature and the wind speed Vc of the outside air fan 22a, which can be controlled by the vehicle air conditioner 1, the residual water in the combined heat exchanger 29 can be more efficiently evaporated and removed.

Here, in the vehicle air conditioner 1 according to the present embodiment, in a case where the residual water in the combined heat exchanger 29 is evaporated and removed, it is assumed that the refrigeration cycle device 10 is operated in order to achieve the refrigerant condensation temperature and the wind speed Vc described above.

Figure 13:
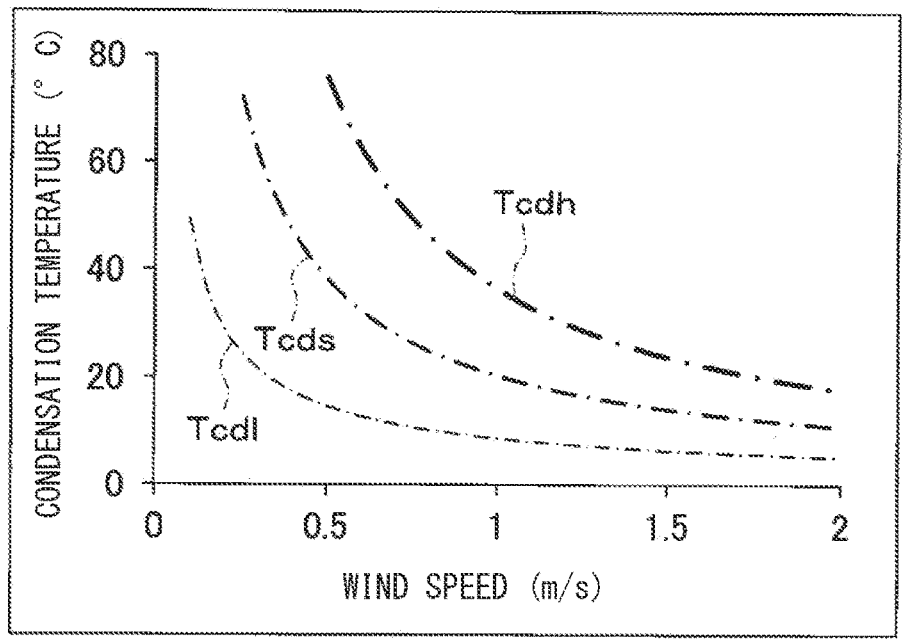
FIG. 13 is a graph showing a relationship between a condensation temperature and the wind speed for a compressor rotation speed.

The relationship between the refrigerant condensation temperature and the wind speed in a range that can be achieved by a general refrigeration cycle is examined. FIG. 13 is a graph showing the relationship between the refrigerant condensation temperature and the wind speed in a case where the refrigerant discharge capability of the compressor and the heat absorption amount of the chiller 24 are set as conditions.

In FIG. 13, Tcdh represents the relationship between the refrigerant condensation temperature and the wind speed in a case where the rotation speed of the compressor 11 and the heat absorption amount of the chiller 24 are maximum. Tcdl represents the relationship between the refrigerant condensation temperature and the wind speed in a case where the rotation speed of the compressor 11 and the heat absorption amount of the chiller 24 are minimum. Tcds represents the relationship between the refrigerant condensation temperature and the wind speed in a case where the rotation speed of the compressor 11 and the heat absorption amount of the chiller 24 are standard values.

Figure 14:
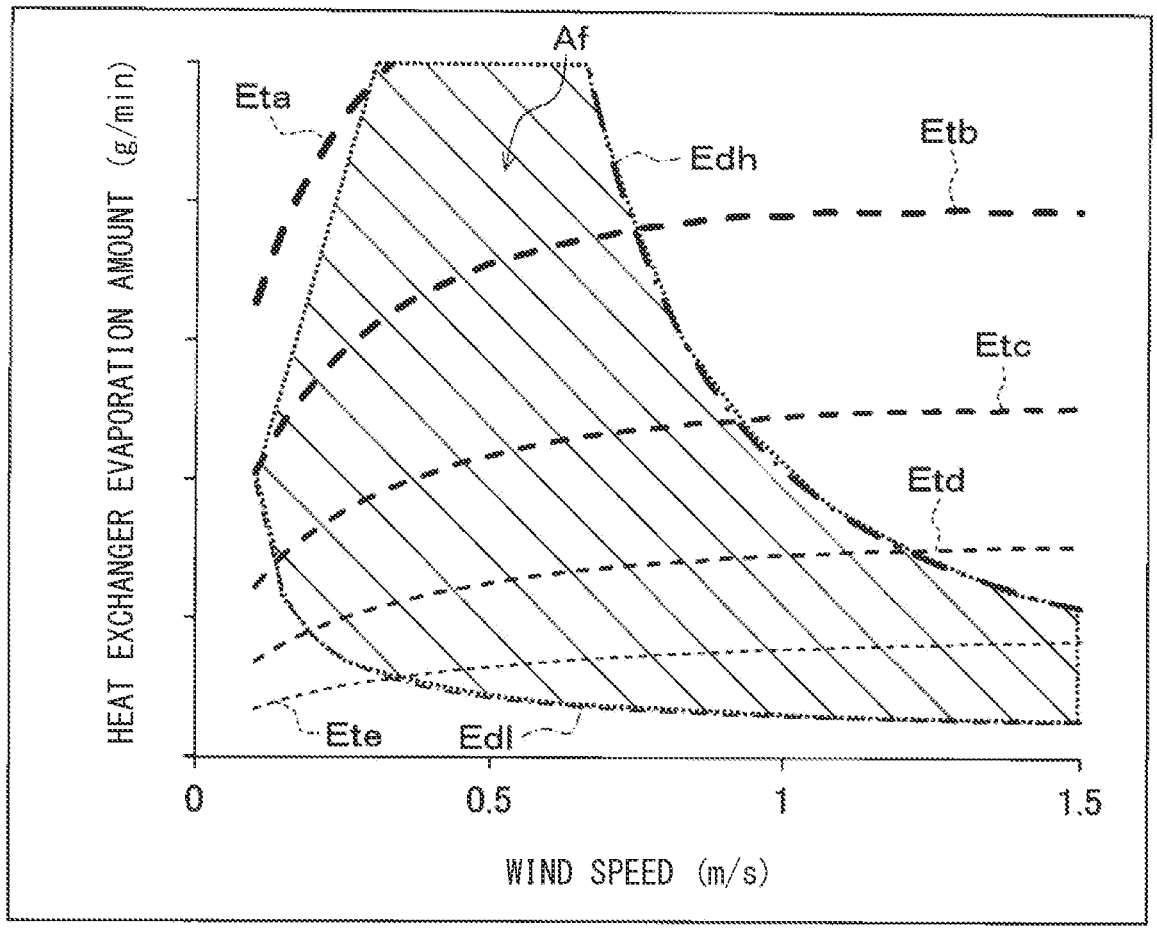
FIG. 14 is a graph showing an operating condition area that can be achieved by a refrigeration cycle device in the relationship between the heat exchanger evaporation amount and the wind speed.

The graph shown in FIG. 14 is formed using the graphs shown in FIGS. 12 and 13. In FIG. 14, Edh represents the relationship between the heat exchanger evaporation amount and the wind speed in a case where the rotation speed of the compressor 11 and the heat absorption amount of the chiller 24 are maximum. Edl represents the relationship between the heat exchanger evaporation amount and the wind speed in a case where the rotation speed of the compressor 11 and the heat absorption amount of the chiller 24 are minimum. Wds represents the relationship between the heat exchanger evaporation amount and the wind speed in a case where the rotation speed of the compressor 11 and the heat absorption amount of the chiller 24 are standard values.

According to the graph shown in FIG. 14, it is possible to specify an operating condition area Af that can be achieved by the refrigeration cycle in accordance with the wind speed. By operating the refrigeration cycle under the heat exchanger evaporation amount and the wind speed Vc included in the operating condition area Af, the residual water in the combined heat exchanger 29 can be at least evaporated and removed in a relatively short period of time.

The evaporation and removal of residual water in the combined heat exchanger 29 means that water vapor derived from the residual water is generated. In a case where water vapor is generated from the combined heat exchanger 29 in the drive unit chamber when the outside air temperature is low, it is recognized from the outside that white mist gas is generated from the drive unit chamber. As a result, it may be erroneously recognized that white smoke is generated from a device in the drive unit chamber.

Therefore, when the residual water in the combined heat exchanger 29 is evaporated and removed, it is necessary to promote the evaporation and removal of residual water while the visibility of white fog is suppressed. As a criterion for the visibility of white fog, a method using a psychrometric chart is known.

Figure 15:
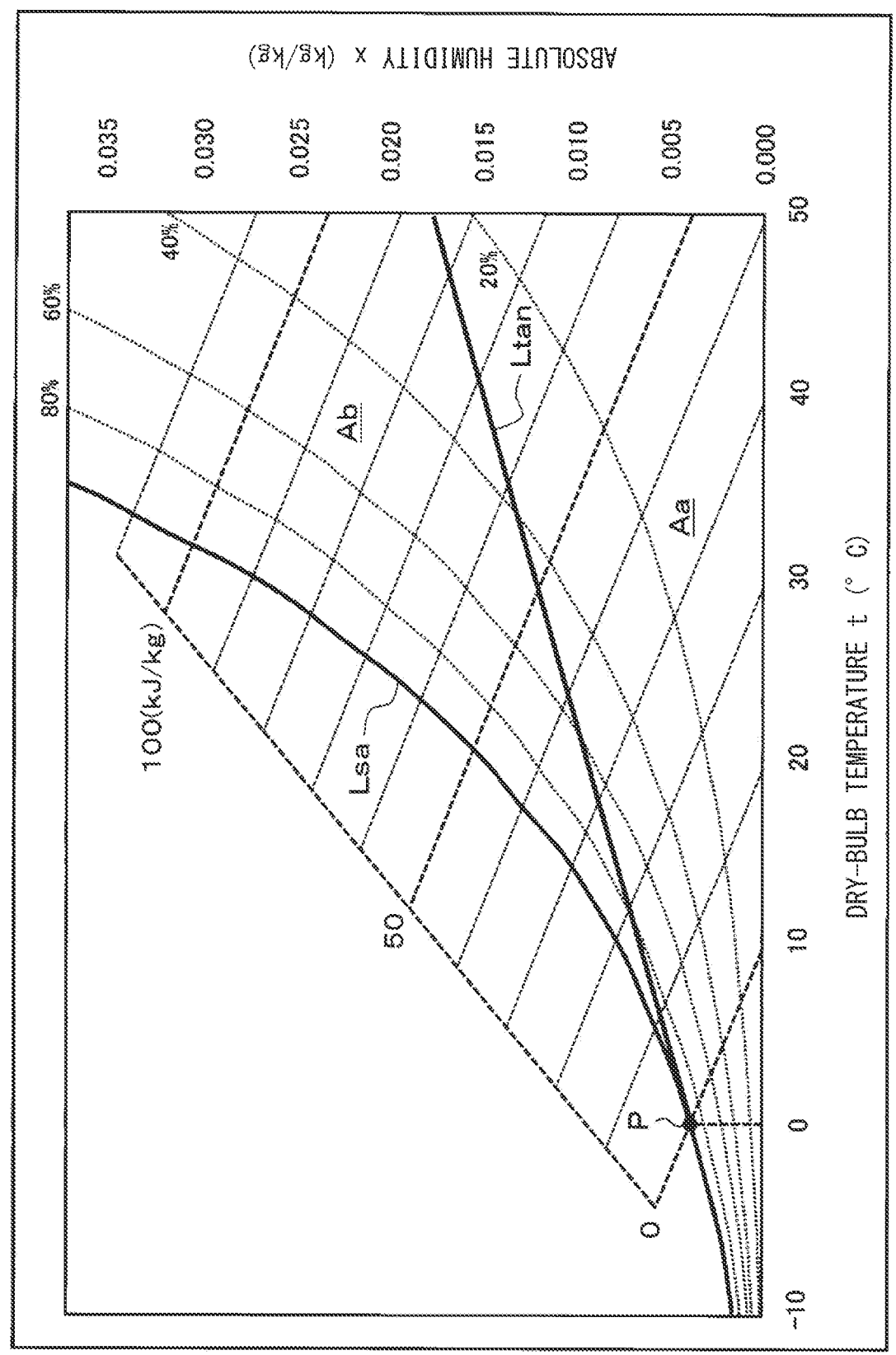
FIG. 15 is a psychrometric chart showing the criteria of visibility of white fog in dry defrosting.

FIG. 15 is an explanatory diagram of a psychrometric chart. In this chart, the horizontal axis represents a temperature, the vertical axis represents an absolute humidity, and each oblique curve in the chart represents a relative humidity $\Psi$. A line with a relative humidity $\Psi$ of 100% is particularly referred to as "saturation line Lsa". The area on the left side of the saturation line Lsa is in a state where water is completely liquefied. The area on the right side of the saturation line Lsa is in a state where water vapor and other gases (air and the like) are mixed. In the gas in this state, the higher the relative humidity $\Psi$ is, the more water is condensed and the gas is easily visually recognized as white fog.

Here, it is assumed that water vapor is erroneously recognized as white fog at the time of the evaporation and removal of residual water in the combined heat exchanger 29 when intermixing of outside air and air after passing through the combined heat exchanger 29 is completed. When the intermixing of the outside air and the air after passing through the combined heat exchanger 29 is completed, a relationship based on a mixing ratio between the outside air and the air is finally obtained. Although the diffusion of heat is faster than the diffusion of materials, it is considered that the state where the white fog is visually recognized and becomes a problem can be defined as a state where intermixing is completed from empirical knowledge, and it can be determined by the mixing ratio between the outside air and the air after passing through the combined heat exchanger 29.

With reference to FIG. 15, the determination of visibility of white fog using a psychrometric chart will be described by taking a case where the outside air temperature is 0° C. as an example. First, a tangent L tan to the saturation line Lsa is obtained from the saturation point at the outside air temperature in the psychrometric chart. The tangent L tan indicates the visibility limit at which water vapor is recognized as white fog. In the case shown in FIG. 15, the tangent L tan passing through a saturation point P at an outside air temperature of 0° C. is obtained.

In the psychrometric chart of FIG. 15, the area located below the tangent line L tan corresponds to a visibility suppressed area Aa where water vapor generated from the combined heat exchanger 29 is not recognized as white fog. On the other hand, in the psychrometric chart, the area located below the saturation line Lsa and above the tangent line L tan corresponds to a visible area Ab where water vapor generated from the combined heat exchanger 29 is recognized as white fog and becomes a problem.

Whether the water vapor is visually recognized as the white fog can be specified by determining whether the state of the water vapor at the time when the mixing of the outside air and the air after passing through the combined heat exchanger 29 is completed belongs to the visibility suppressed area Aa or the visible area Ab. Therefore, by controlling the refrigerant condensation temperature and the wind speed Vc in the outside heat exchanger 22 in such a manner that the state of the air at the time when the mixing of the outside air and the air after passing through the outside heat exchanger 22 is completed belongs to the visibility suppressed area Aa, quick dry defrosting can be performed while the visibility of white fog is suppressed.

By setting the state of air at the time when the mixing of the outside air and the air after passing through the outside heat exchanger 22 is completed as the visibility suppressed area Aa using the tangent L tan in the psychrometric chart as a reference, the state of air does not belong to the visible area Ab. Therefore, it is possible to sufficiently suppress the visibility of white fog in the process until the mixing of the outside air and the air after passing through the outside heat exchanger 22 is completed.

Here, on the assumption that the refrigerant-side capability and the air-side capability in the refrigeration cycle are balanced, an air-side specific enthalpy Sep for refrigerant-side outside unit capability at an arbitrary wind speed Vc and at a refrigeration cycle balance point (that is, the refrigerant discharge capability and the heat absorption amount) at which a refrigerant condensation temperature is obtained is calculated. In the psychrometric chart, a specific enthalpy line Lse corresponding to the air-side specific enthalpy Sep is specified from the air-side specific enthalpy Sep.

Figure 16:
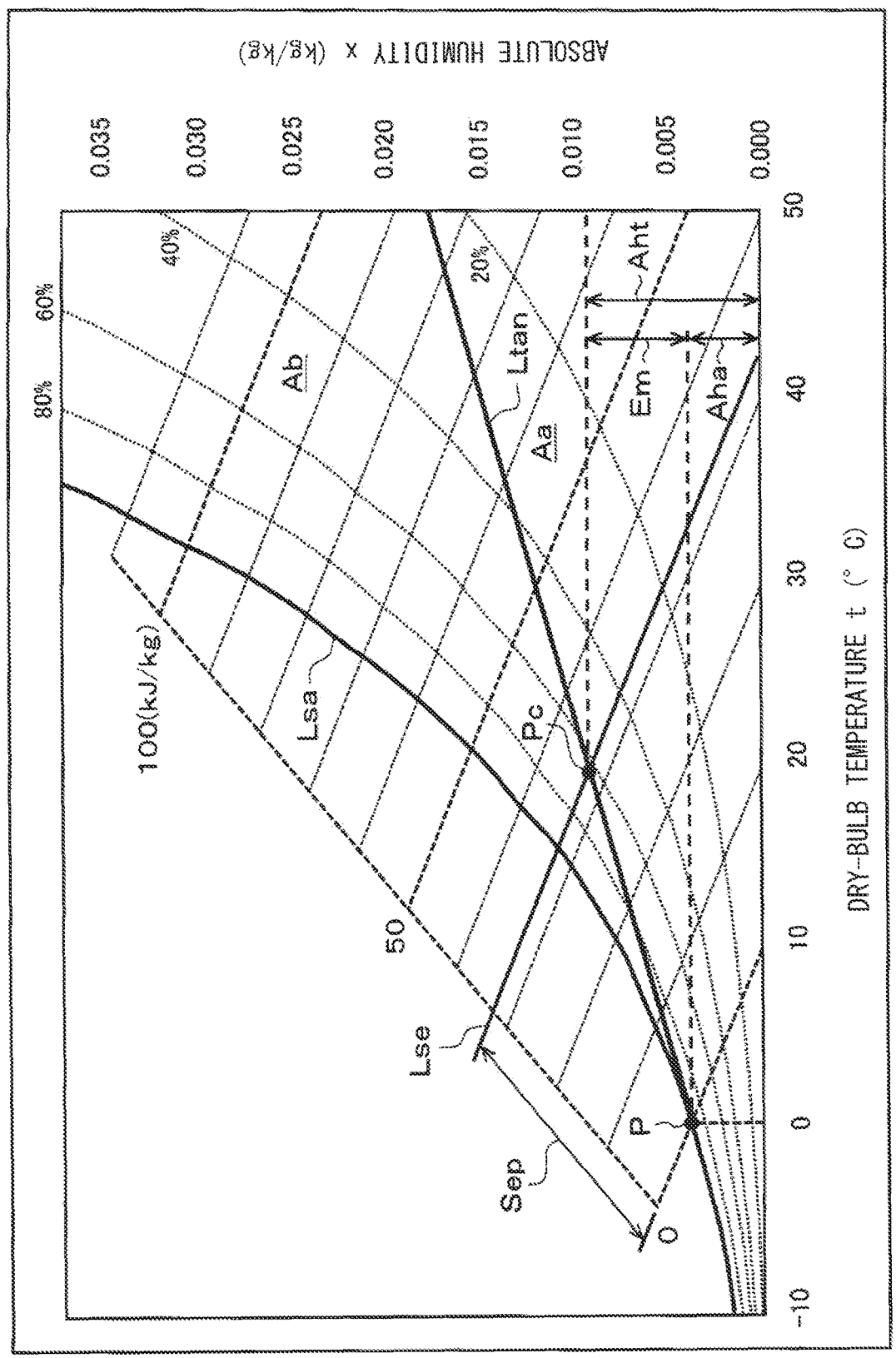
FIG. 16 is a psychrometric chart in calculating an allowable upper limit evaporation amount per unit weight.

For example, assuming a certain arbitrary system, in a case where the outside air temperature is 0° C., the wind speed Vc is 0.5 m/s, and the refrigerant condensation temperature is 35° C., the air-side specific enthalpy is calculated as 33 kJ/kg. The specific enthalpy line Lse corresponding to 33 kJ/kg calculated is then specified in the psychrometric chart shown in FIG. 16.

Next, an intersection point Pc between the tangent L tan and the specific enthalpy line Lse is specified. Here, an allowable upper limit evaporation amount Em per unit passing air weight is calculated by subtracting an absolute humidity Aha at the intersection point Pc from an absolute humidity Aht at the saturation point P of the outside air temperature. The allowable upper limit evaporation amount Em per unit passing air weight indicates the amount of water vapor allowed until the saturation of air per unit weight after passing through the combined heat exchanger 29.

Figure 17:
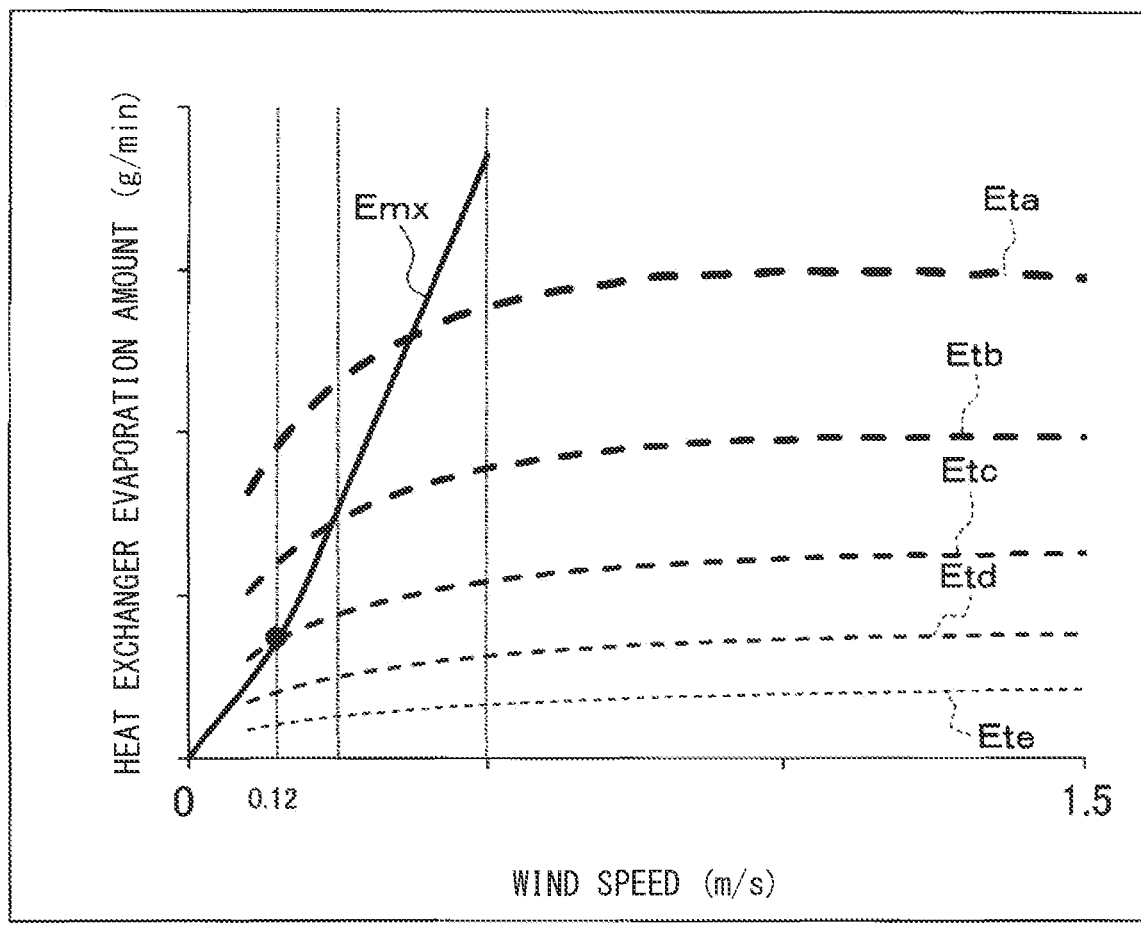
FIG. 17 is a graph showing a relationship between an outside unit evaporation amount and the wind speed for the condensation temperature, and the allowable upper limit evaporation amount.

The allowable upper limit evaporation amount Em per unit passing air weight calculated in this manner was calculated by changing various conditions such as the wind speed Vc and the refrigerant condensation temperature. The allowable upper limit evaporation amounts Em per unit passing air weight under various conditions are summarized as an allowable upper limit evaporation amount line Emx in FIG. 17. In FIG. 17, when the heat exchanger evaporation amount and the wind speed Vc are in an area located below the allowable upper limit evaporation amount line Emx, the residual water can be efficiently evaporated and removed in a state where water vapor is not visually recognized as white fog finally.

In the defrosting operation of the vehicle air conditioner 1, it is assumed that the maximum allowable amount of frost adheres to the combined heat exchanger 29 by the heating operation at a low outside air temperature. Therefore, in the present embodiment, a necessary water evaporation amount En that needs to be evaporated and removed from the combined heat exchanger 29 is obtained by subtracting the amount of water falling from the combined heat exchanger 29 due to the melting of frost from the maximum allowable frost amount.

Figure 18:
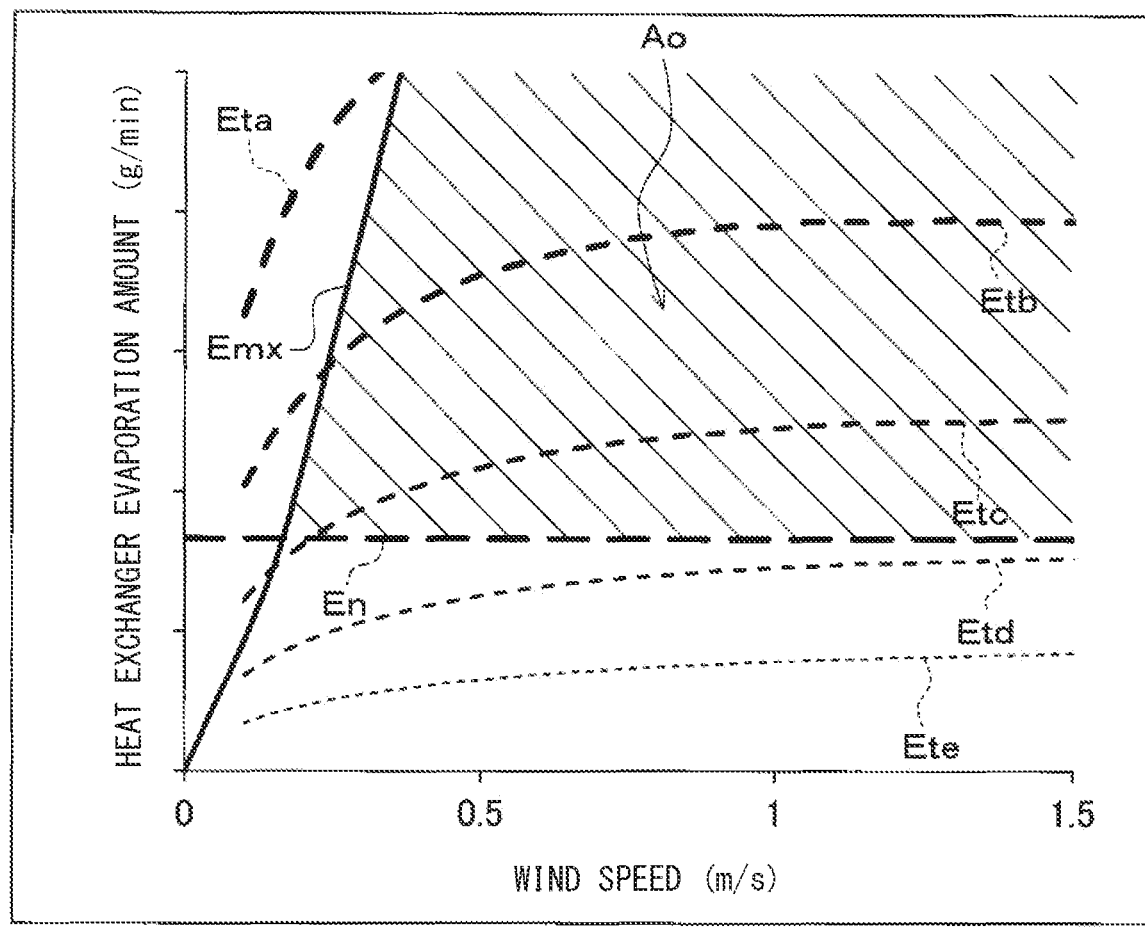
FIG. 18 is a graph showing a target area for sufficiently recovering the heat exchange performance of the outside heat exchanger while suppressing the visibility of white fog in dry defrosting.

As shown in FIG. 18, in evaporating and removing residual water from the combined heat exchanger 29, the operation condition for quickly recovering the heat exchange performance of the combined heat exchanger 29 without visually recognizing white fog is defined as a target area Ao. The target area Ao is set in such a manner that the wind speed is higher than the wind speed Vc for the allowable upper limit evaporation amount line Emx, and the heat exchanger evaporation amount is larger than the necessary water evaporation amount En.

Figure 19:
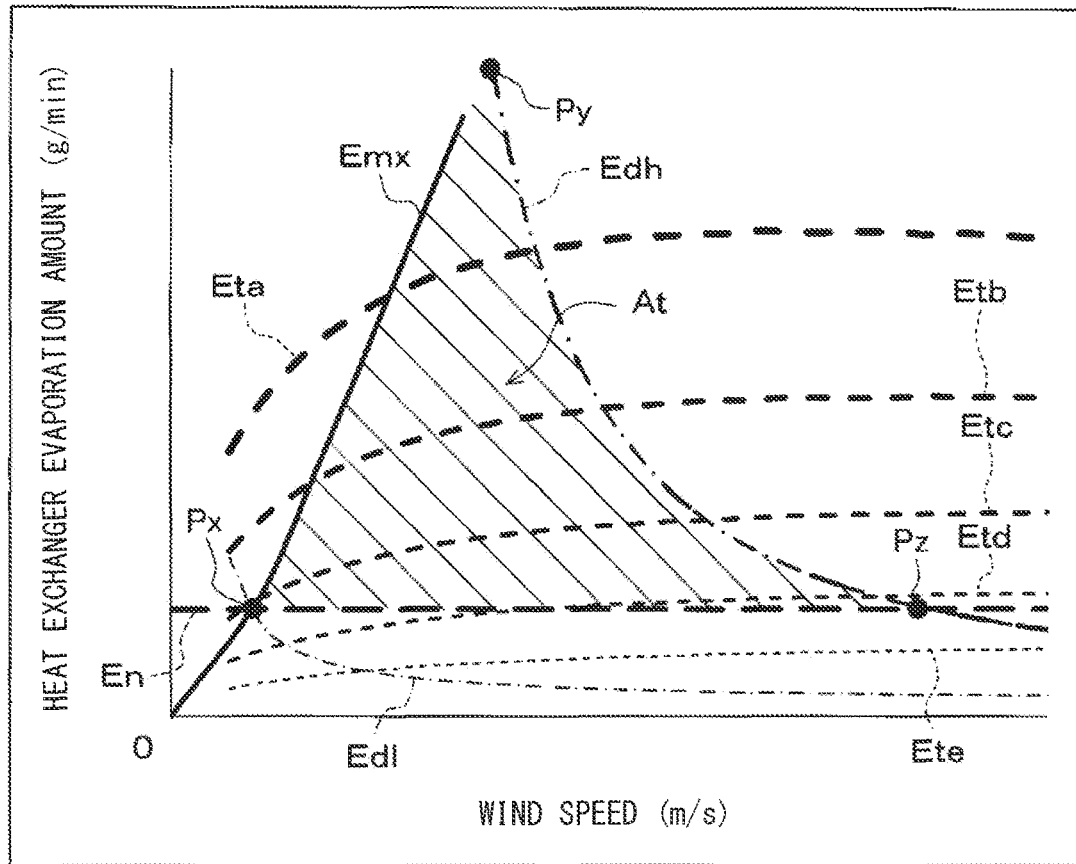
FIG. 19 is a graph showing a feasible target area for sufficiently recovering the heat exchange performance of the outside heat exchanger while suppressing the visibility of white fog in dry defrosting.

The discussion made using FIGS. 10 to 18 can be summarized in a graph shown in FIG. 19. The graph of FIG. 19 is a summary of the graph shown in FIG. 14 and the graph shown in FIG. 18. A target area At shown in the graph of FIG. 19 indicates the operation condition for quickly recovering the heat exchange performance of the combined heat exchanger 29 without visually recognizing white fog in the operation condition that can be performed in the refrigeration cycle to evaporate and remove residual water. Specifically, the target area At is defined by an overlapping area of the operating condition area Af in FIG. 14 and the target area Ao in FIG. 18.

As illustrated in FIG. 19, the target area At includes a point Px, a point Py, and a point Pz. The point Px indicates an intersection point of the allowable upper limit evaporation amount line Emx and the necessary water evaporation amount En. The point Py indicates an intersection point of the allowable upper limit evaporation amount line Emx and the curve Edh indicating the heat exchanger evaporation amount in a case where the rotation speed of the compressor 11 and the heat absorption amount of the chiller 24 are maximum. The point Pz indicates an intersection point of the curve Edh and the necessary water evaporation amount En.

The minimum value of the wind speed Vc in the target area At is the wind speed at the point Px and is 0.12 m/s, and the maximum value of the wind speed Vc in the target area At is the wind speed at the point Pz and is 1.2 m/s.

Therefore, when the residual water is evaporated and removed from the combined heat exchanger 29 in the defrosting operation, by regulating the wind speed of the outside air fan 22a in the range of 0.12 m/s to 1.2 m/s, the residual water can be quickly evaporated and removed without visually recognizing white fog.

The minimum value of the heat exchanger evaporation amount in the target area At is specified based on the heat exchanger evaporation amounts at the points Px and Pz, and corresponds to the necessary water evaporation amount En. Since the refrigerant condensation temperature can be specified from the heat exchanger evaporation amount, the minimum value of the refrigerant condensation temperature in the target area At is specified to 15° C.

The maximum value of the heat exchanger evaporation amount in the target area At is specified based on the heat exchanger evaporation amount at the point Py. The maximum value of the refrigerant condensation temperature in the target area At is calculated from the heat exchanger evaporation amount at the point Py, and is specified to 70° C.

Therefore, when the residual water is evaporated and removed from the combined heat exchanger 29 in the defrosting operation, by supplying the amount of heat regulated in such a manner that the refrigerant condensation temperature is 15° C. to 70° C. to the combined heat exchanger 29, the residual water can be quickly evaporated and removed without visually recognizing white fog.

Control may be executed using a defrosting condition coefficient DCC as the operation condition for the evaporation and removal of residual water from the combined heat exchanger 29. The defrosting condition coefficient DCC is a parameter set by integrating the wind speed Vc supplied to the combined heat exchanger 29 by the outside air fan 22a and the refrigerant condensation temperature in the combined heat exchanger 29. In calculating the defrosting condition coefficient DCC, degrees Celsius is used as a unit of the refrigerant condensation temperature in the outside heat exchanger 22. This is because a temperature difference from the melting point of water is an important factor in discussing dry defrosting.

In a case where the defrosting condition coefficient DCC is used, the defrosting condition coefficient DCC for the target area At is set to 1.8 to 35. The value "1.8" for the defrosting condition coefficient DCC is a value for the point Px, and is obtained by multiplying 0.12 m/s by 15° C. The value "35" for the defrosting condition coefficient DCC is a value for the point Py, and is obtained by multiplying 0.5 m/s by 70° C.

Therefore, when the residual water is evaporated and removed from the combined heat exchanger 29, by regulating the wind speed Vc and the refrigerant condensation temperature in such a manner that the defrosting condition coefficient DCC is 1.8 to 35, the residual water can be quickly evaporated and removed without visually recognizing white fog.

Returning to FIG. 10, the dry defrosting mode of the defrosting control program will be described. In the dry defrosting mode, after melting-defrosting, dry defrosting is performed in which residual water caused by the melted frost is evaporated and dried. In dry defrosting, the operation of the vehicle air conditioner 1 is controlled using parameters such as the wind speed Vc and the refrigerant condensation temperature determined as described above.

When the dry recommendation condition is satisfied and the process proceeds to step S6, melting-defrosting in the dry defrosting mode is performed. The purpose of melting-defrosting in step S7 is to melt the frost adhering to the combined heat exchanger 29, and control similar to that in step S3 described above is executed.

It is determined in step S8 whether or not the melting of the frost adhering to the combined heat exchanger 29 is completed. In step S8, a determination is made by a method similar to that in step S4 described above. If it is determined that the melting of the frost in the combined heat exchanger 29 is completed by melting-defrosting in the dry defrosting mode, the process proceeds to step S9, and dry defrosting starts.

In step S9, any one of the first condensation-heat defrosting mode to the third condensation-heat defrosting mode, the hot gas defrosting mode, and the storage heat defrosting mode is selected in accordance with the operation state of the vehicle air conditioner 1 and the surrounding environment, and dry defrosting starts in the selected operation mode.

At this time, the controller 70 controls the operations of the compressor 11, the outside air fan 22a, and the like in accordance with the selected operation mode. For example, in a case where dry defrosting is performed in the condensation-heat defrosting mode, the controller 70 controls the refrigerant discharge capability of the compressor 11 in such a manner that the refrigerant condensation temperature in the combined heat exchanger 29 approaches a target condensation temperature TCO. The target condensation temperature TCO is determined with reference to a control map stored in advance in the controller 70.

Figure 20:
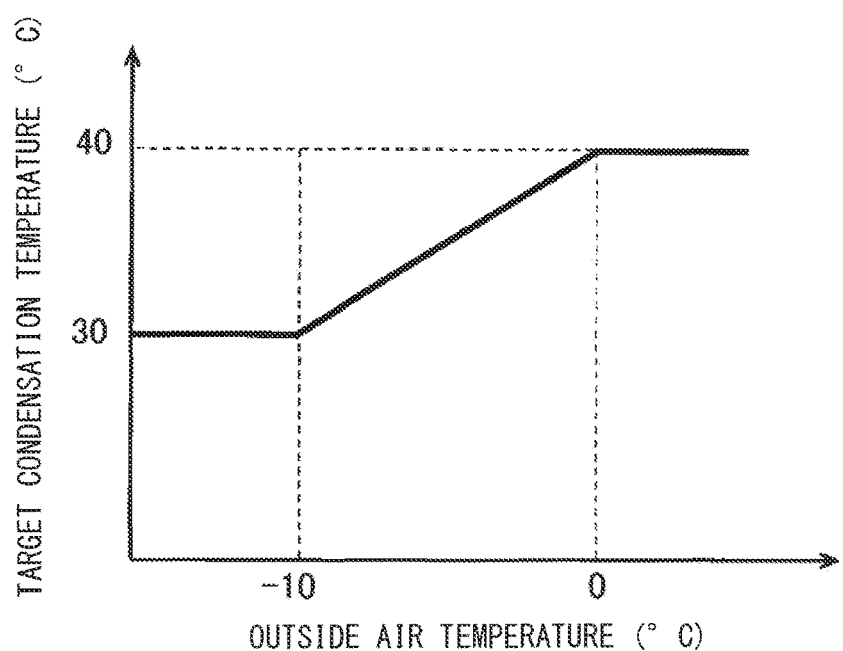
FIG. 20 is a control characteristic diagram for determining a target condensation temperature in dry defrosting.

In the present embodiment, as shown in the control characteristic diagram of FIG. 20, the target condensation temperature TCO is determined to increase as the outside air temperature rises. As a result, the refrigerant condensation temperature in dry defrosting is regulated to decrease as the outside air temperature is lower within the range of 15° C. to 70° C. In the case of the storage heat defrosting mode, the heat medium temperature of the device-side heat medium circuit 50a is regulated to decrease as the outside air temperature is lower within the range of 15° C. to 70° C.

The controller 70 controls the throttle openings of the cooling expansion valve 20b and the cooling expansion valve 20c in such a manner that the degree of superheating of the refrigerant on the outlet port side of the refrigerant passage 24a in the chiller 24 approaches the predetermined reference chiller-side degree of superheating (for example, 10° C.).

The rotation speed of the outside air fan 22a corresponding to the amount of outside air supplied to the combined heat exchanger 29 is controlled so as to approach a target wind speed VaO. The target wind speed VaO is determined with reference to the control map stored in advance in the controller 70.

Figure 21:
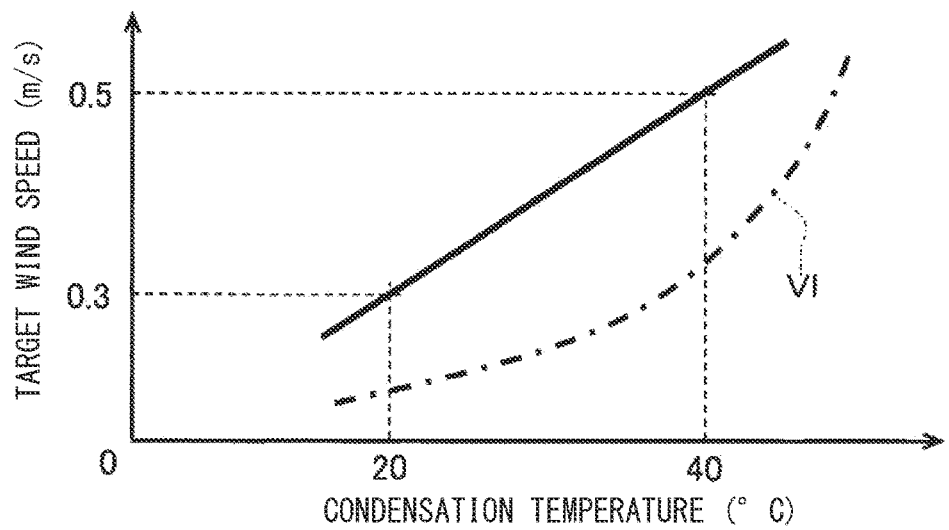
FIG. 21 is a control characteristic diagram for determining a target wind speed in dry defrosting.

In the present embodiment, as shown in the control characteristic diagram of FIG. 21, the target wind speed VaO is determined so as to decrease as the refrigerant condensation temperature of the combined heat exchanger 29 decreases. As described above, since the target condensation temperature TCO is set to decrease as the outside air temperature becomes lower, the target wind speed VaO is also set to decrease as the outside air temperature becomes lower.

In the control characteristic diagram shown in FIG. 21, the target wind speed VaO is set to be larger than a visibility limit wind speed VI in a state where the operation of the outside air fan 22a is performed. The visibility limit wind speed VI indicates the upper limit value of the wind speed Vc at which water vapor is visually recognized as white fog in dry defrosting at the refrigerant condensation temperature of the combined heat exchanger 29. As a result, by setting the target wind speed VaO in dry defrosting in accordance with the control characteristic diagram shown in FIG. 21, it is possible to promote the evaporation and removal of residual water from the combined heat exchanger 29 while the visibility of white fog is suppressed.

When the process proceeds to step S10, it is determined whether nor not dry defrosting in the dry defrosting mode is completed. In the present embodiment, it is determined that dry defrosting is completed when the residual water on the surface of the combined heat exchanger 29 is evaporated and removed from the surface of the combined heat exchanger 29.

Figure 22:
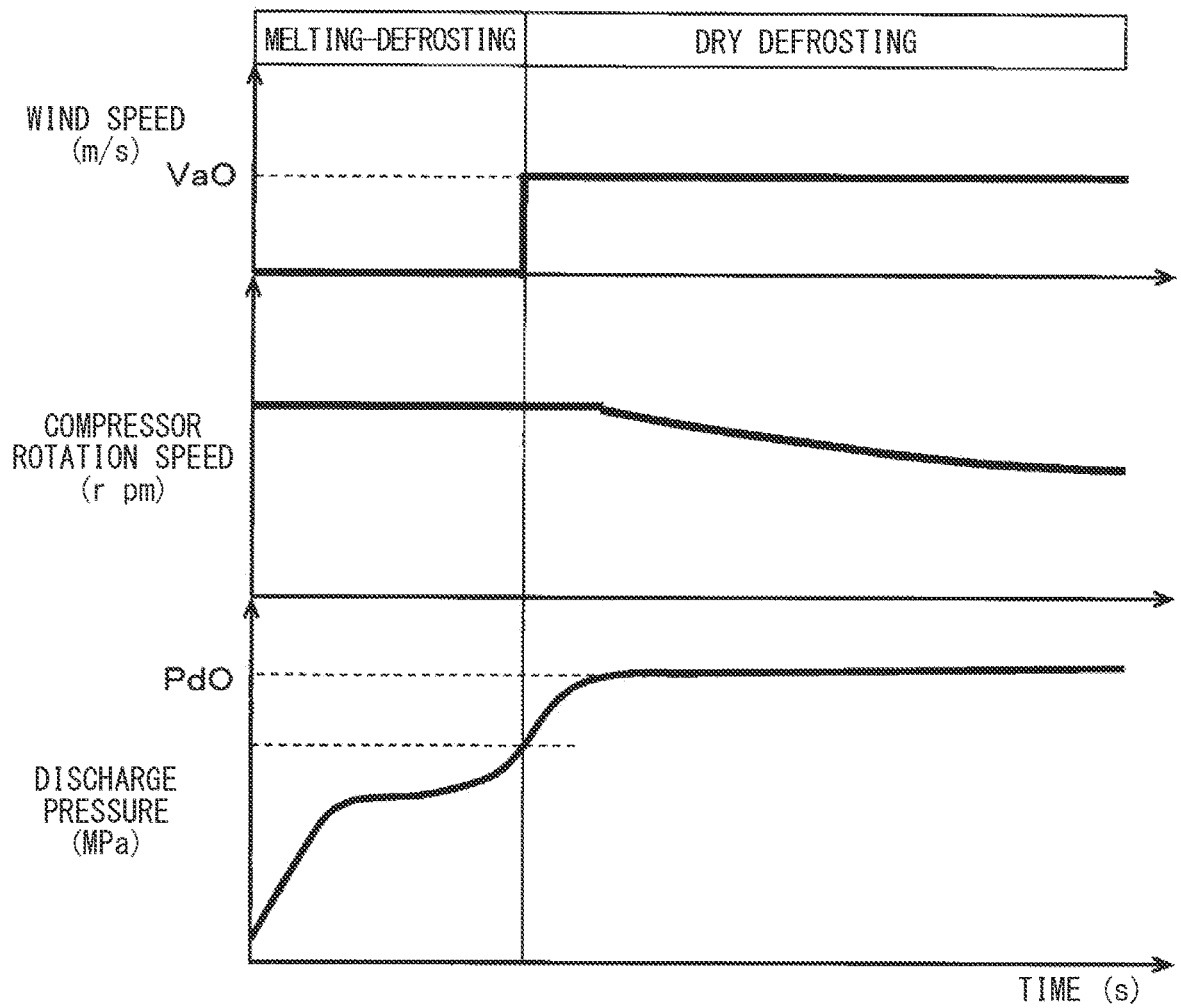
FIG. 22 is an explanatory diagram illustrating an example of changes in the wind speed, the compressor rotation speed, and a discharge pressure in a dry defrosting mode.

As illustrated in FIG. 22, in the dry defrosting mode, after melting-defrosting is completed, dry defrosting is performed. Since it is conceivable that the residual water evaporated by dry defrosting is derived from the melting of frost in melting-defrosting, it is conceivable that there is a strong correlation between the amount of energy input at the time of melting-defrosting and the amount of energy required at the time of dry defrosting.

In step S10 in the present embodiment, whether or not dry defrosting is completed is determined by using the relationship between the amount of energy input at the time of melting-defrosting and the amount of energy required at the time of dry defrosting.

A specific description will be given with reference to FIG. 23. In step S21, the amount of molten water is estimated. The amount of molten water means the total amount of frost melted by melting-defrosting. The amount of molten water is estimated by dividing the total amount of energy input to the melting of frost in melting-defrosting by the melting heat of ice per unit weight.

Specifically, the total amount of energy input to the melting of frost at the time of melting-defrosting is calculated by cumulatively adding a value obtained by subtracting the loss of heat radiation due to a wind speed or the like from the total value of the amount of work of the compressor 11 and the amount of heat absorbed from the chiller 24. The total amount of energy calculated corresponds to an example of the amount of energy input. The loss of heat radiation due to a wind speed or the like corresponds to the amount of heat radiation at the time of melting-defrosting.

The amount of heat radiation energy at the time of melting-defrosting is specified using, for example, a control table obtained by experimentally acquiring the loss of heat radiation to air from the relationship between a wind speed and an outside air temperature. In the control table, the lower the outside air temperature, the larger the amount of heat radiation energy. In the control table, the higher the wind speed, the larger the amount of heat radiation energy.

By dividing the total amount of energy calculated by the melting heat (for example, about 334 kj/kg) of ice per unit weight, the amount of molten water, which is the total amount of frost melted at the time of melting-defrosting, is estimated.

In step S22, a necessary amount of work is calculated using the amount of molten water calculated. The necessary amount of work means the amount of energy required to evaporate residual water corresponding to the amount of molten water in dry defrosting, and corresponds to an example of the necessary amount of energy. Specifically, the necessary amount of work is calculated by multiplying the amount of molten water estimated in step S21 by the latent heat of vaporization (for example, about 2400 kj/kg) of water per unit weight.

It is determined in step S23 whether or not the amount of dry input work, which is an integrated value of energy input during dry defrosting, is equal to or larger than the necessary amount of work (that is, equal to or larger than the necessary amount of energy). The amount of dry input work corresponds to an example of the amount of dry input energy. Note that the amount of dry input energy is the amount of energy input for drying residual water during dry defrosting, and does not limit the input process. That is, the amount of dry input energy also includes the amount of energy input using a heat medium at the time of dry defrosting.

When the amount of dry input energy is specified, the amount of heat radiation energy at the time of dry defrosting is excluded from the total value of the amount of work of the compressor 11 and the amount of heat absorption in the chiller 24. The amount of heat radiation energy at the time of dry defrosting means the loss of heat radiated to air at the time of dry defrosting. Therefore, by using the wind speed and the outside air temperature at the time of dry defrosting with reference to the control table described above, the amount of heat radiation energy at the time of dry defrosting can be specified.

If the amount of dry input work is equal to or larger than the necessary amount of work, it is conceivable that all the residual water generated by melting-defrosting is evaporated by dry defrosting, and thus it is determined that dry defrosting is completed. If the amount of dry input work is less than the necessary amount of work, it is determined that dry defrosting is not completed.

By performing the dry defrosting completion determination in this manner, the vehicle air conditioner 1 can reliably remove residual water in the combined heat exchanger 29. In addition, by considering the amount of heat radiation energy at the time of melting-defrosting and at the time of dry defrosting in step S21 and step S23, it is possible to improve the accuracy in determining the completion of removal of residual water. Since the wind speed and the outside air temperature are used, the amount of heat radiation energy is appropriately specified in accordance with the environment at the time of melting-defrosting and at the time of dry defrosting. From this point as well, it is possible to enhance the accuracy in determining the completion of dry defrosting.

Note that steps S21 and S22 may be performed when melting-defrosting in the dry defrosting mode is completed (that is, immediately before the start of dry defrosting). The outside air temperature and the wind speed are used to specify the amount of heat radiation energy, but the present disclosure is not limited thereto. It is also possible to use the outside air humidity and the heating temperature of the combined heat exchanger 29. Alternatively, a predetermined value, ratio, or the like may be used as the amount of heat radiation energy.

Returning to FIG. 10 again, step S10 and subsequent steps of the defrosting control program will be described. If it is determined in step S10 that dry defrosting is completed, the process proceeds to step S11 to complete dry defrosting. Thereafter, the defrosting control program ends. On the other hand, if it is determined that dry defrosting is not completed, the process returns to step S9, and dry defrosting is continuously performed.

As described above, the vehicle air conditioner 1 according to the first embodiment performs, in the dry defrosting mode, the melting-defrosting for melting the frost adhering to the combined heat exchanger 29 and the dry defrosting for evaporating and drying the residual water generated by the melting of the frost. As a result, the vehicle air conditioner 1 can suppress refreezing of the residual water at the time of defrosting the combined heat exchanger 29, and can recover the heat exchange performance of the combined heat exchanger 29.

Furthermore, since the dry defrosting in the dry defrosting mode is ended when it is determined in step S10 that the evaporation and removal of the residual water is completed, the vehicle air conditioner 1 can more reliably suppress the refreezing of the residual water in the combined heat exchanger 29.

In step S10, as illustrated in FIG. 20, the amount of molten water is estimated, the necessary amount of work is calculated, and whether or not the amount of dry input work is equal to or larger than the necessary amount of work is determined, so that whether or not dry defrosting is completed is determined. As a result, the accuracy in determining the completion of the dry defrosting mode is improved, and thus the vehicle air conditioner 1 can reliably remove the residual water on the surface of the combined heat exchanger 29.

The vehicle air conditioner 1 according to the first embodiment supplies air regulated within the range of 0.12 m/s to 1.2 m/s to the combined heat exchanger 29 during the dry defrosting in the dry defrosting mode.

As a result, the vehicle air conditioner 1 can promote the evaporation and removal of the residual water adhering to the combined heat exchanger 29 and can efficiently recover the heat exchange performance of the combined heat exchanger 29 in a shorter period of time, and thus can suppress the refreezing of the residual water.

In dry defrosting, by regulating the wind speed of air supplied to the combined heat exchanger 29 within the range of 0.12 m/s to 1.2 m/s, it is possible to suppress the water vapor derived from the residual water in the combined heat exchanger 29 from being visually recognized as white fog.

As shown in FIG. 21, the target wind speed VaO is set to decrease as the outside air temperature decreases within the range of 0.12 m/s to 1.2 m/s. As a result, the vehicle air conditioner 1 can achieve energy saving in the dry defrosting in the dry defrosting mode.

The vehicle air conditioner 1 according to the present embodiment regulates the refrigerant condensation temperature of the refrigerant flowing through the combined heat exchanger 29 to fall within the range of 15° C. to 70° C. at the time of the dry defrosting in the dry defrosting mode, and supplies the amount of heat to the combined heat exchanger 29. As a result, since the vehicle air conditioner 1 can promote the evaporation and removal of the residual water adhering to the combined heat exchanger 29, the vehicle air conditioner can efficiently recover the heat exchange performance of the combined heat exchanger 29 in a shorter period of time and suppress the refreezing of the residual water.

The vehicle air conditioner 1 regulates the refrigerant condensation temperature of the refrigerant flowing through the combined heat exchanger 29 to fall within the range of 15° C. to 70° C. at the time of dry defrosting, and supplies the amount of heat to the combined heat exchanger 29. As a result, the vehicle air conditioner 1 can suppress the water vapor derived from the residual water in the combined heat exchanger 29 from being visually recognized as white fog during dry defrosting.

As shown in FIG. 20, the target condensation temperature TCO is set to decrease as the outside air temperature decreases within the range of 15° C. to 70° C. As a result, the vehicle air conditioner 1 can achieve energy saving in the dry defrosting in the dry defrosting mode.

According to the vehicle air conditioner 1, in the melting-defrosting in the dry defrosting mode, air supply to the combined heat exchanger 29 by the outside air fan 22*a* is stopped, and the wind speed Vc in the combined heat exchanger 29 is set to be lower than 0.12 m/s. As a result, at the time of melting-defrosting, it is possible to suppress a heat loss due to air supply and efficiently melt the frost adhering to the combined heat exchanger 29.

In the dry defrosting that is started when it is determined in step S8 that the melting of the frost is completed, air is supplied at a wind speed within the range of 0.12 m/s to 1.2 m/s, so that the residual water can be efficiently evaporated while being suppressed from being visually recognized as white fog.

In the vehicle air conditioner 1, the outside air heat exchange unit 29X includes the combined heat exchanger 29 and the device-side heat medium circuit 50a. The combined heat exchanger 29 according to the first embodiment is configured by thermally connecting the outside air-refrigerant heat exchange unit 29a that causes the refrigerant to absorb heat by heat exchange with the outside air during the heating operation and the outside air-heat medium heat exchange unit 29b that exchanges heat between the outside air and the heat medium using the heat exchange fins 29e. As illustrated in FIG. 1, in the device-side heat medium circuit 50a, the heat generating device 53 is disposed as an auxiliary heat source capable of regulating the temperature of the heat medium flowing through the device-side heat medium circuit 50a.

Figure 9:
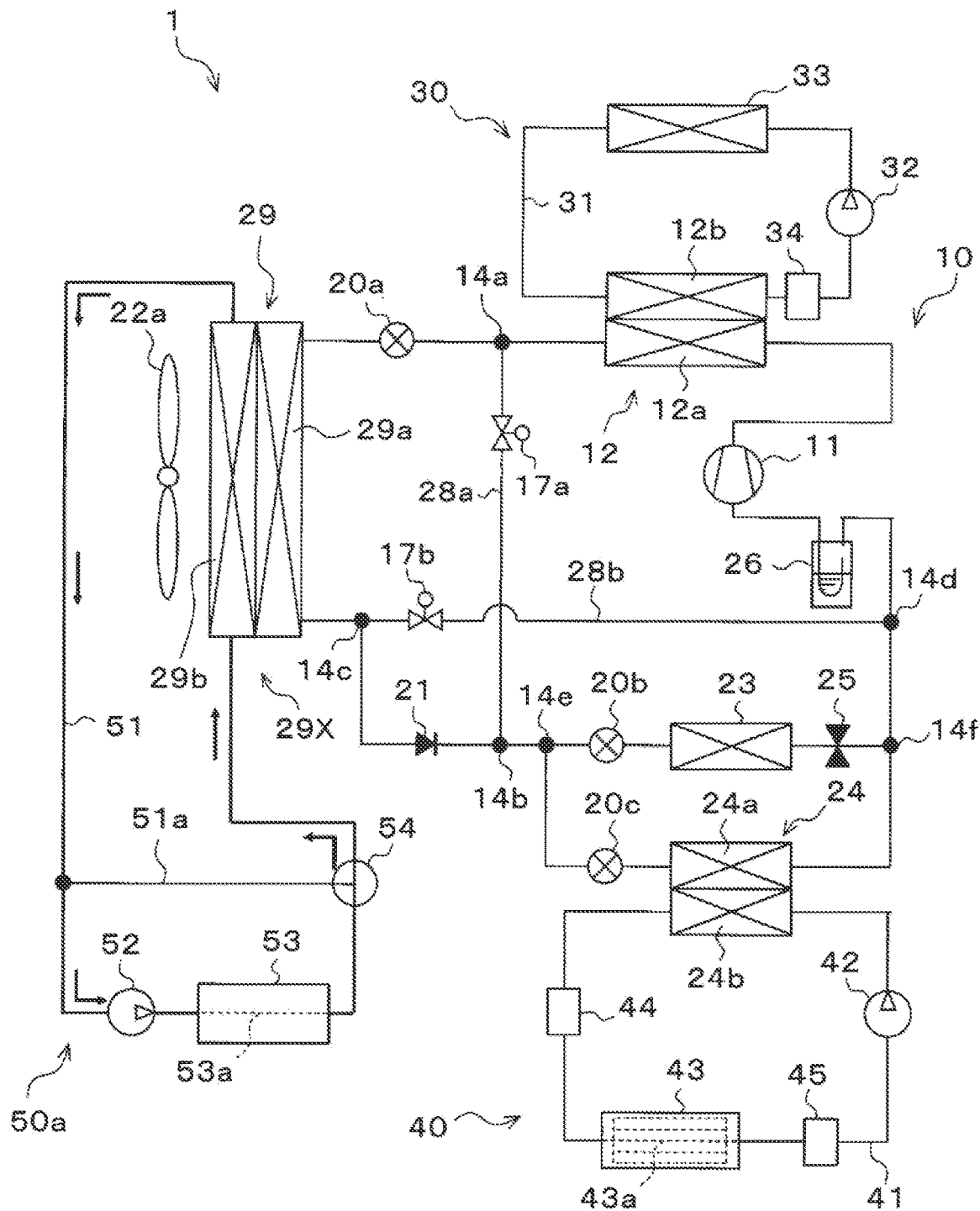
FIG. 9 is an overall configuration diagram illustrating an operation of the vehicle air conditioner according to the first embodiment in a storage heat defrosting mode.

Therefore, as illustrated in FIG. 9, the vehicle air conditioner 1 according to the first embodiment can achieve the storage heat defrosting mode in which waste heat of the heat generating device 53 is stored and used for defrosting the combined heat exchanger 29 as the operation mode of the defrosting operation. Since it is possible to effectively utilize the waste heat of the heat generating device 53 at the time of defrosting the combined heat exchanger 29, energy saving in the defrosting operation can be promoted.

First Modification of First Embodiment

Figure 23:
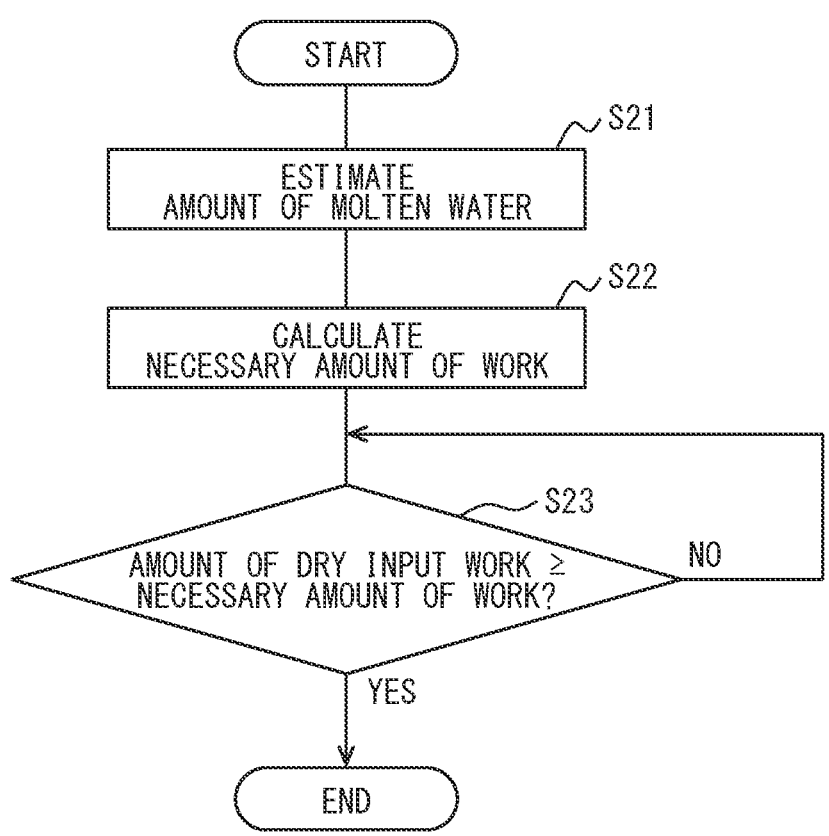
FIG. 23 is a flowchart related to the determination of completion of dry defrosting in the vehicle air conditioner.

In step S10 in the first embodiment, the completion of dry defrosting is determined by the method illustrated in FIG. 23, but the completion of dry defrosting may be determined by another method. In a dry defrosting mode according to a first modification, the refrigerant discharge capability of the compressor 11 during dry defrosting is assumed to be a predetermined constant value (for example, a target rotation speed NcO).

Figure 24:
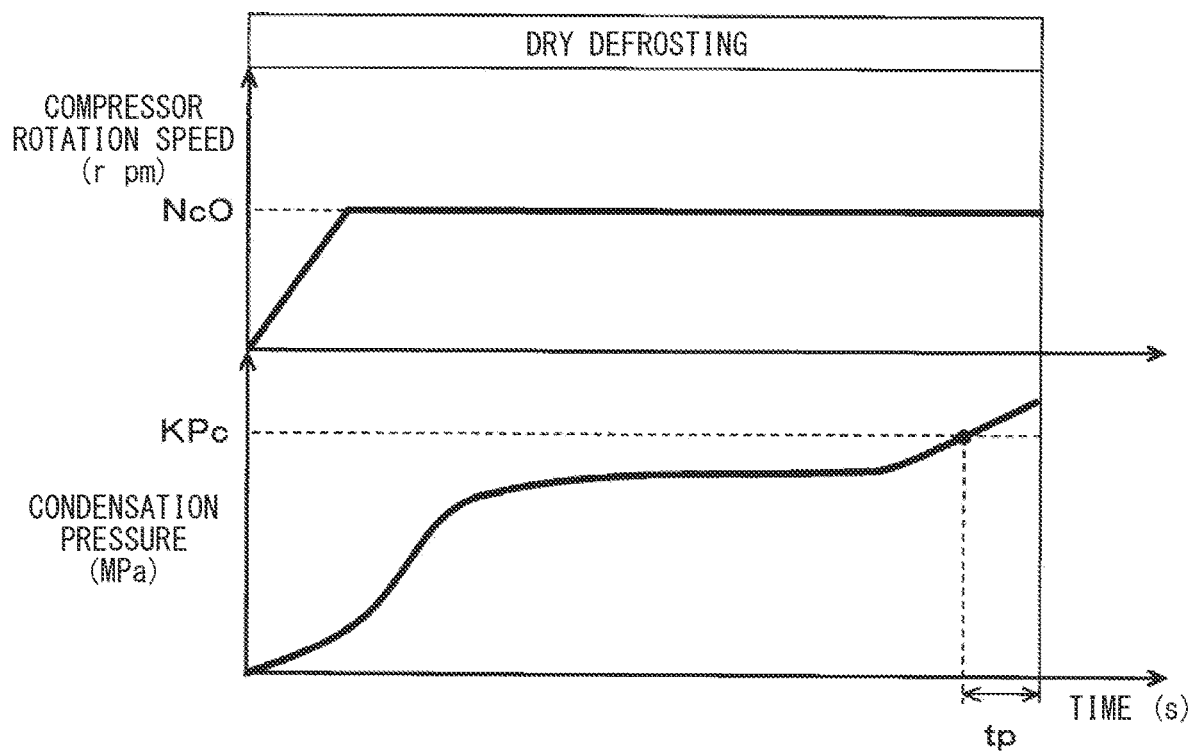
FIG. 24 is an explanatory diagram illustrating a first modification related to the determination of completion of dry defrosting.

As shown in FIG. 24, in dry defrosting according to the first modification, in a case where residual water adheres to the surface of the combined heat exchanger 29, heat of the refrigerant in the combined heat exchanger 29 is used for evaporating the residual water. Accordingly, the refrigerant condensation pressure of the combined heat exchanger 29 does not greatly change.

On the other hand, in a case where dry defrosting is completed and the residual water disappears from the surface of the combined heat exchanger 29, the amount of heat acting as the latent heat of vaporization of the residual water becomes excessive. Accordingly, the refrigerant condensation pressure in the combined heat exchanger 29 gradually increases.

According to the first modification, the completion of the dry defrosting is determined based on whether or not the refrigerant condensation pressure is higher than a predetermined reference condensation pressure KPc in a state where the refrigerant discharge capability of the compressor 11 in dry defrosting is constant. As a result, it is possible to specify that residual water has been removed from the surface of the combined heat exchanger 29 by dry defrosting, as in the first embodiment.

The completion of dry defrosting may be determined when a predetermined time tp has elapsed after the refrigerant condensation pressure exceeds the reference condensation pressure KPc. With this determination, the residual water can be reliably removed from the surface of the combined heat exchanger 29. The completion of dry defrosting may be determined when the refrigerant condensation pressure exceeds the reference condensation pressure KPc.

Second Modification of First Embodiment

It is also possible to use a method different from those of the first embodiment and the first modification in determining the completion of dry defrosting. In a dry defrosting mode according to a second modification, the refrigerant discharge capability (for example, the rotation speed) of the compressor 11 is assumed to be regulated in accordance with a target condensation pressure PcO determined by an outside air temperature.

The target condensation pressure PcO in this case is the target value of the condensation pressure in an outside air heat exchanger (for example, the combined heat exchanger 29) operating as a condenser at the time of dry defrosting. In the second modification, at the time of dry defrosting, the refrigerant discharge capability of the compressor 11 is regulated using a physical amount (for example, a refrigerant temperature or a refrigerant discharge pressure) correlated with the condensation pressure of the combined heat exchanger 29. Note that a refrigerant pressure sensor may be disposed on the refrigerant outlet port side of the combined heat exchanger 29, and regulation may be performed using the detection value.

Figure 25:
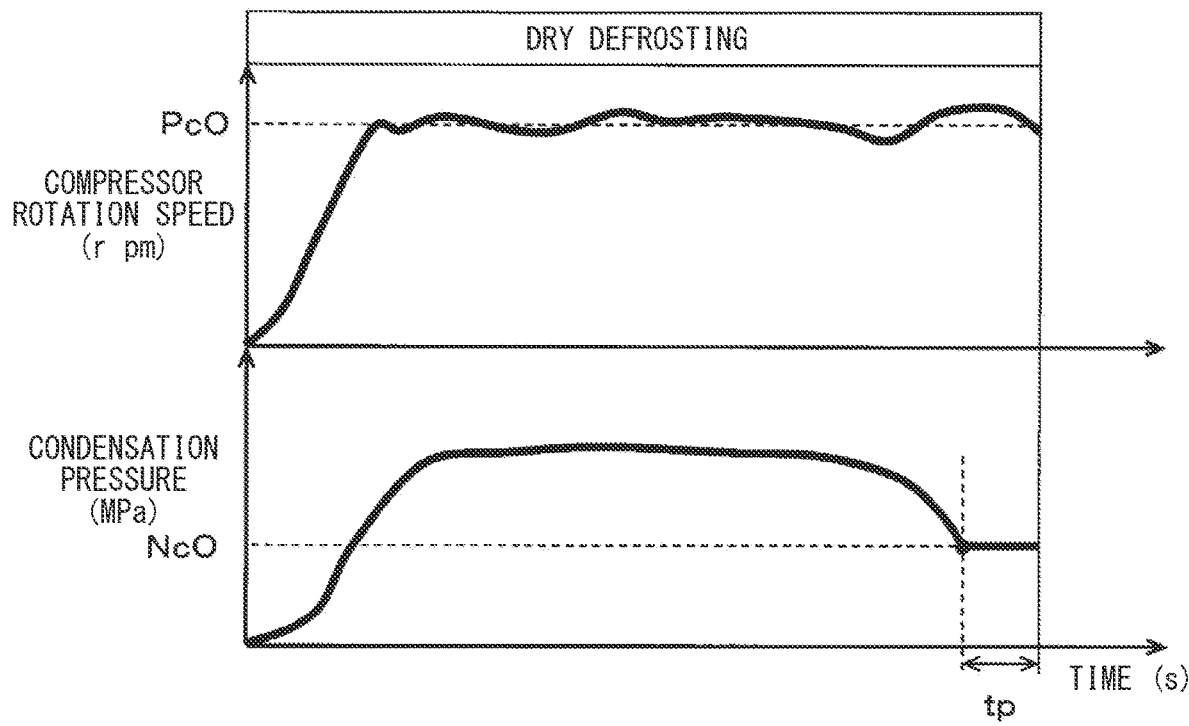
FIG. 25 is an explanatory diagram illustrating a second modification related to the determination of completion of dry defrosting.

In dry defrosting according to the second modification, after dry defrosting progresses and the residual water is removed from the surface of the combined heat exchanger 29, the rotation speed of the compressor 11 decreases to reach a predetermined reference rotation speed KNc as illustrated in FIG. 25. The reference rotation speed KNc is an index corresponding to the reference discharge capability of the compressor 11.

Therefore, according to the second modification, in a case where the refrigerant discharge capability of the compressor 11 in dry defrosting is regulated in accordance with the target condensation pressure PcO, the completion of dry defrosting is determined based on whether the rotation speed of the compressor 11 decreases to the reference rotation speed KNc. As a result, it is possible to specify that residual water has been removed from the surface of the combined heat exchanger 29 by dry defrosting, as in the first embodiment and the first modification.

In a case where the refrigerant discharge capability of compressor 11 is regulated in accordance with the target condensation pressure PcO during the dry defrosting operation, the completion of dry defrosting can also be determined based on whether or not the rotation speed of the compressor 11 decreases by a predetermined reference amount or more. When the evaporation and removal of the residual water is completed, the amount of energy used for evaporating the residual water out of the amount of energy input to the combined heat exchanger 29 becomes unnecessary, and thus a determination can also be made by this method. As a result, it is possible to specify that residual water has been removed from the surface of the combined heat exchanger 29 by dry defrosting, as in the first embodiment and the first modification.

The completion of dry defrosting may be determined when the predetermined time tp has elapsed after the rotation speed of the compressor 11 decreases to the reference rotation speed KNc. With this determination, the residual water can be reliably removed from the surface of the combined heat exchanger 29. Alternatively, the completion of dry defrosting may be determined when the rotation speed of the compressor 11 decreases to the reference rotation speed KNc.

Third Modification of First Embodiment

Furthermore, it is also possible to use a method different from those of the first embodiment, the first modification, and the second modification in determining the completion of dry defrosting. In a third modification, the amount of frost adhering to the combined heat exchanger 29 is estimated before the start of melting-defrosting in the dry defrosting mode. For example, the amount of the frost adhering to the combined heat exchanger 29 at the start of melting-defrosting is estimated from the duration of the heating operation, the outside air temperature during the heating operation, and the like.

The time required to melt, evaporate, and remove the estimated amount of frost adhering to the combined heat exchanger 29 is then calculated. The completion of the dry defrosting mode (that is, the completion of dry defrosting) is determined based on whether the time elapsed from the start of the dry defrosting mode exceeds the required time. As a result, it is possible to specify that residual water has been removed from the surface of the combined heat exchanger 29 by dry defrosting, as in the first embodiment, the first modification, and the second modification.

Second Embodiment

As illustrated in FIGS. 26 to 33, the present embodiment will describe a vehicle air conditioner 1 applied to a configuration different from that of the first embodiment. In FIGS. 26 to 33, the same or equivalent parts as those of the first embodiment are denoted by the same reference numerals. The same applies to the following drawings.

The vehicle air conditioner 1 according to a second embodiment includes a refrigeration cycle device 10, a high-temperature-side heat medium circuit 30, a low-temperature-side heat medium circuit 40, an inside air conditioning unit 60, and a controller 70.

Figure 26:
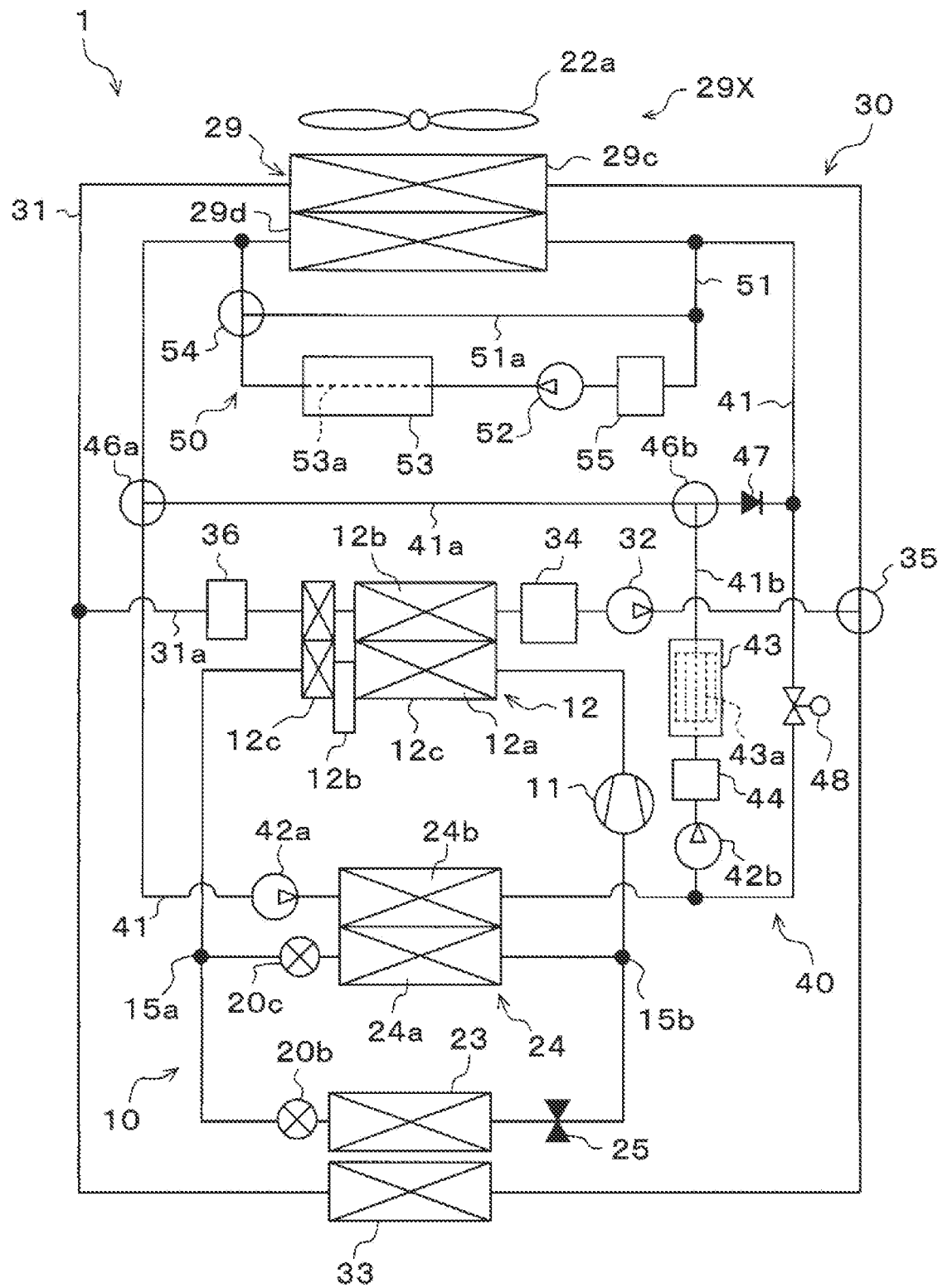
FIG. 26 is an overall configuration diagram of a vehicle air conditioner according to a second embodiment.

As illustrated in FIG. 26, the refrigeration cycle device 10 according to the second embodiment includes a compressor 11, a water-refrigerant heat exchanger 12, a cooling expansion valve 20b, a cooling expansion valve 20c, an inside evaporator 23, a chiller 24, an evaporation pressure regulating valve 25, and the like.

In the second embodiment, the inlet port side of a refrigerant passage 12a in the water-refrigerant heat exchanger 12 is connected to the discharge port of the compressor 11. The water-refrigerant heat exchanger 12 includes the refrigerant passage 12a and a heat medium passage 12b as in the embodiment described above. The water-refrigerant heat exchanger 12 is a heating heat exchanger that exchanges heat between the high-pressure refrigerant flowing through the refrigerant passage 12a and the high-temperature-side heat medium flowing through the heat medium passage 12b to heat the high-temperature-side heat medium.

The water-refrigerant heat exchanger 12 includes a so-called subcool heat exchanger, and has a condensing portion 12c, a receiver portion 12d, and a subcooling portion 12e. The condensing portion 12c is a condensing heat exchange unit that exchanges heat between the high-pressure refrigerant discharged from the compressor 11 and the high-temperature-side heat medium of the high-temperature-side heat medium circuit 30 to condense the refrigerant.

The receiver portion 12d is a liquid receiving unit that separates the refrigerant flowing out of the condensing portion 12c into gas and liquid, and stores the separated liquid-phase refrigerant. The subcooling portion 12e is a subcooling heat exchange unit that exchanges heat between the liquid-phase refrigerant flowing out of the receiver portion 12d and the high-temperature-side heat medium of the high-temperature-side heat medium circuit 30 to subcool the liquid-phase refrigerant. The water-refrigerant heat exchanger 12 constitutes a part of the heating unit together with the high-temperature-side heat medium circuit 30.

The inlet port side of a refrigerant branch portion 15a is connected to the outlet port of the refrigerant passage 12a in the water-refrigerant heat exchanger 12. The refrigerant branch portion 15a is a three-way joint having three inlet and outlet ports communicating with each other.

The inlet port side of a refrigerant passage 24a in the chiller 24 is connected to one outlet port of the refrigerant branch portion 15a via the cooling expansion valve 20c. The refrigerant inlet port side of the inside evaporator 23 is connected to the other outlet port of the refrigerant branch portion 15a via the cooling expansion valve 20b. The cooling expansion valve 20b and the cooling expansion valve 20c are configured similarly to those in the embodiment described above, and correspond to an example of a decompression unit.

The inlet port side of the refrigerant passage 24a in the chiller 24 is connected to the outlet port of the cooling expansion valve 20c. The chiller 24 is an evaporator that cools the low-temperature-side heat medium of the low-temperature-side heat medium circuit 40 passing through a heat medium passage 24b by heat exchange with the low-pressure refrigerant flowing through the refrigerant passage 24a. One inlet port side of a refrigerant merging portion 15b is connected to the outlet port of the refrigerant passage 24a in the chiller 24.

The refrigerant inlet port side of the inside evaporator 23 is connected to the outlet port of the cooling expansion valve 20b. The inside evaporator 23 is an evaporator that exchanges heat between the low-pressure refrigerant decompressed by the cooling expansion valve 20b and ventilation air, and is an example of the air conditioning evaporator.

The inlet port side of the evaporation pressure regulating valve 25 is connected to the refrigerant outlet port of the inside evaporator 23. The other inlet port side of the refrigerant merging portion 15b is connected to the outlet port of the evaporation pressure regulating valve 25. The refrigerant merging portion 15b merges the flow of the refrigerant flowing out of the refrigerant passage of the chiller 24 with the flow of the refrigerant flowing out of the evaporation pressure regulating valve 25. The inlet port side of the compressor 11 is connected to the outlet port of the refrigerant merging portion 15b.

Next, the high-temperature-side heat medium circuit 30 according to the second embodiment is configured by connecting the water-refrigerant heat exchanger 12, a combined heat exchanger 29, a high-temperature-side pump 32, a heater core 33, a water heater 34, a high-temperature-side three-way valve 35, a high-temperature-side reserve tank 36, and the like using a high-temperature-side heat medium flow path 31.

As illustrated in FIG. 26, in the high-temperature-side heat medium circuit 30, a common flow path 31a is disposed in parallel with a first heat exchange unit 29c of the combined heat exchanger 29 and the heater core 33. In the common flow path 31a, the high-temperature-side reserve tank 36, the heat medium passage 12b of the water-refrigerant heat exchanger 12, the water heater 34, and the high-temperature-side pump 32 are disposed.

The high-temperature-side reserve tank 36 is a storage unit that stores a high-temperature-side heat medium excess in the high-temperature-side heat medium circuit 30. The high-temperature-side reserve tank 36 has a heat medium supply port for supplying the high-temperature-side heat medium when the amount of the high-temperature-side heat medium in the high-temperature-side heat medium circuit 30 is insufficient.

The inlet port side of the heat medium passage 12b in the water-refrigerant heat exchanger 12 is connected to the heat-medium outlet port side of the high-temperature-side reserve tank 36. The water heater 34 functioning as a heating source in the high-temperature-side heat medium circuit 30 is connected to the outlet port side of the heat medium passage 12b in the water-refrigerant heat exchanger 12.

The suction port side of the high-temperature-side pump 32 is connected to the downstream side of the water heater 34. One inlet and outlet port side of the high-temperature-side three-way valve 35 is connected to the discharge port of the high-temperature-side pump 32. The high-temperature-side three-way valve 35 includes a three-way flow rate regulating valve having three inlet and outlet ports.

The heat-medium inlet port side of the heater core 33 is connected to one outlet port of the high-temperature-side three-way valve 35. The first heat exchange unit 29c of the combined heat exchanger 29 is connected to the other outlet port of the high-temperature-side three-way valve 35. The heat medium inlet port side of the high-temperature-side reserve tank 36 is connected to the heat-medium outlet port side of the heater core 33 through the common flow path 31a.

The combined heat exchanger 29 is a heat exchanger in which the first heat exchange unit 29c that exchanges heat between the high-temperature-side heat of the high-temperature-side heat medium circuit 30 and outside air and a second heat exchange unit 29d that exchanges heat between the low-temperature-side heat medium circulating in the low-temperature-side heat medium circuit 40 and the outside air are integrally formed. The heat medium inlet port side of the high-temperature-side reserve tank 36 is connected to the heat-medium outlet port side of the first heat exchange unit 29c through the common flow path 31a.

Also in the second embodiment, the combined heat exchanger 29 corresponds to an example of the outside air heat exchanger, and constitutes an outside air heat exchange unit 29X. The combined heat exchanger 29 is disposed on the front side of a drive unit chamber, and the first heat exchange unit 29c is disposed on the vehicle front side of the second heat exchange unit 29d. In other words, the first heat exchange unit 29c is disposed on the upstream side of the second heat exchange unit 29d in an outside air flow.

In the combined heat exchanger 29, an outside air fan 22a is disposed to supply outside air to the first heat exchange unit 29c and the second heat exchange unit 29d. That is, since the outside air fan 22a can regulate the wind speed (the air volume) of the outside air with respect to the combined heat exchanger 29, the outside air fan corresponds to an example of the wind speed regulation unit.

The first heat exchange unit 29c and the second heat exchange unit 29d of the combined heat exchanger 29 according to the second embodiment have a so-called tank-and-tube heat exchanger structure. The tank-and-tube heat exchanger that exchanges heat between a heat medium (that is, the high-temperature-side heat medium or the low-temperature-side heat medium) and air (that is, outside air) includes a plurality of tubes through which the heat medium flows, a tank for distributing or collecting the heat medium flowing through the tubes, and the like. The heat medium flowing through the tubes stacked and arranged at intervals in a certain direction exchanges heat with the air flowing through the air passage formed between the adjacent tubes.

Figure 27:
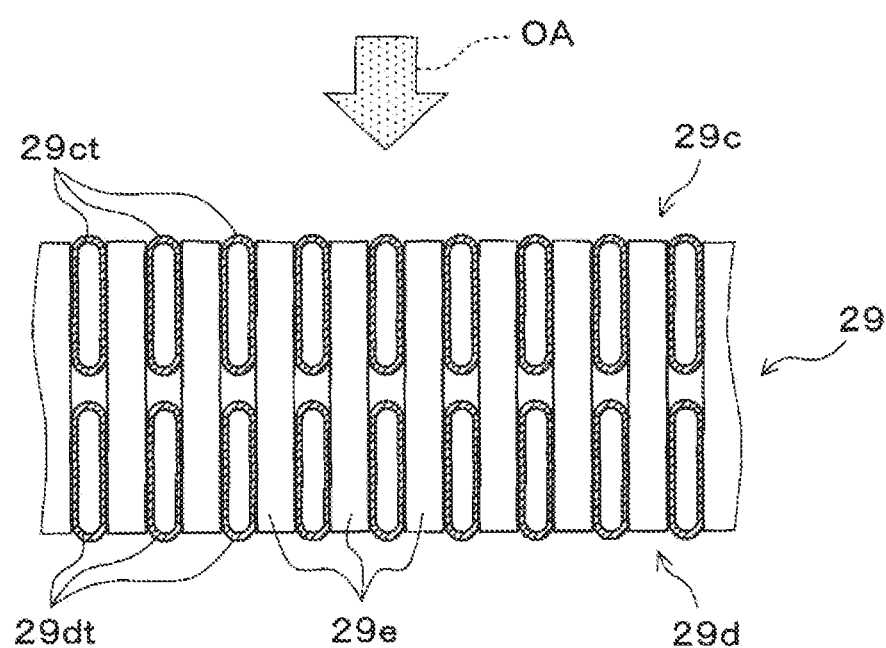
FIG. 27 is a schematic diagram illustrating a configuration of a combined heat exchanger according to the second embodiment.

As illustrated in FIG. 27, a heat exchange fin 29e is disposed in an air passage formed between tubes 29ct in the first heat exchange unit 29c and in an air passage formed between tubes 29dt in the second heat exchange unit 29d. The heat exchange fin 29e is made of one thin plate-shaped metal member. The heat exchange fin 29e is a member that promotes heat exchange between the heat medium and the outside air in the first heat exchange unit 29c and also promotes heat exchange between the heat medium and the outside air in the second heat exchange unit 29d.

In the combined heat exchanger 29, the heat exchange fins 29e are brazed to both the tubes 29ct of the first heat exchange unit 29c and the tubes 29dt of the second heat exchange unit 29d, and connect the first heat exchange unit 29c and the second heat exchange unit 29d. As a result, in the combined heat exchanger 29, heat can be transferred between the high-temperature-side heat medium on the side of the first heat exchange unit 29c and the low-temperature-side heat medium on the side of the second heat exchange unit 29d via the heat exchange fins 29e.

As illustrated in FIG. 26, at the end of the common flow path 31a opposite to the high-temperature-side three-way valve 35, the flow of the high-temperature-side heat medium flowing out of the first heat exchange unit 29c of the combined heat exchanger 29 and the flow of the high-temperature-side heat medium flowing out of the heater core 33 are merged.

The low-temperature-side heat medium circuit 40 according to the second embodiment is configured by connecting the chiller 24, the combined heat exchanger 29, a first low-temperature-side pump 42a, a first low-temperature-side three-way valve 46a, a low-temperature-side on-off valve 48, a heat medium passage 43a of a battery heat exchange unit 43, and the like using a low-temperature-side heat medium flow path 41. The low-temperature-side heat medium flow path 41 is an annular heat medium flow path that connects the heat medium passage of the second heat exchange unit 29d in the combined heat exchanger 29 and the heat medium passage 24b of the chiller 24.

The inlet port side of the heat medium passage 24b in the chiller 24 is connected to the discharge port of the first low-temperature-side pump 42a. The basic configuration of the first low-temperature-side pump 42a is similar to that of the high-temperature-side pump 32.

The heat medium inlet port side of the second heat exchange unit 29d in the combined heat exchanger 29 is connected to the outlet port of the heat medium passage 24b in the chiller 24 via the low-temperature-side on-off valve 48. The low-temperature-side on-off valve 48 is an electromagnetic valve that opens and closes the low-temperature-side heat medium flow path 41 that connects the chiller 24 and the combined heat exchanger 29.

The heat medium inlet port side of the second heat exchange unit 29d in the combined heat exchanger 29 is connected to the outlet port side of the low-temperature-side on-off valve 48. Therefore, the second heat exchange unit 29d of the combined heat exchanger 29 can cause the low-temperature-side heat medium to absorb the heat of the outside air by heat exchange between the low-temperatureside heat medium of the low-temperature-side heat medium circuit 40 and the outside air supplied from the outside air fan 22a.

The first low-temperature-side three-way valve 46a is connected to the heat-medium outlet port side of the second heat exchange unit 29d in the combined heat exchanger 29. As described above, one of the inlet and outlet ports of the first low-temperature-side three-way valve 46a is connected to the second heat exchange unit 29d of the combined heat exchanger 29. The other inlet and outlet port of the first low-temperature-side three-way valve 46a is connected to the suction port side of the first low-temperature-side pump 42a through the low-temperature-side heat medium flow path 41. The remaining inlet and outlet port of the first low-temperature-side three-way valve 46a is connected to one of the inlet and outlet ports of a second low-temperature-side three-way valve 46b through a bypass flow path 41a.

As illustrated in FIG. 26, the bypass flow path 41a is disposed in the low-temperature-side heat medium circuit 40. One end side of the bypass flow path 41a is connected to the remaining inlet and outlet port of the first low-temperature-side three-way valve 46a. The other end side of the bypass flow path 41a is connected to the low-temperature-side heat medium flow path 41 that connects the outlet port of the low-temperature-side on-off valve 48 and the heat medium inlet port of the second heat exchange unit 29d in the combined heat exchanger 29.

The second low-temperature-side three-way valve 46b is disposed in the bypass flow path 41a. The second low-temperature-side three-way valve 46b has a configuration similar to that of the first low-temperature-side three-way valve 46a. As described above, the first low-temperature-side three-way valve 46a is connected to one of the inlet and outlet ports of the second low-temperature-side three-way valve 46b through the bypass flow path 41a. The remaining inlet and outlet port of the second low-temperature-side three-way valve 46b is connected to a low-temperature-side check valve 47 through the bypass flow path 41a. One end side of a battery connection flow path 41b is connected to the remaining inlet and outlet port of the second low-temperature-side three-way valve 46b.

The battery connection flow path 41b is a heat medium flow path that extends from the low-temperature-side heat medium flow path 41 connecting the outlet port of the heat medium passage 24b in the chiller 24 and the low-temperature-side on-off valve 48 and that is connected to the inlet and outlet port of the second low-temperature-side three-way valve 46b. In the battery connection flow path 41b, a second low-temperature-side pump 42b, an electric heater 44, and the heat medium passage 43a of the battery heat exchange unit 43 are disposed.

The inlet port side of the heat medium passage 43a in the battery heat exchange unit 43 is connected to the electric heater 44 through the battery connection flow path 41b. A PTC heater can be used as the electric heater 44, and corresponds to an example of a heating source in the low-temperature-side heat medium circuit 40.

The discharge port side of the second low-temperature-side pump 42b is connected to the inlet port side of the heat medium passage in the electric heater 44 through the battery connection flow path 41b. The basic configuration of the second low-temperature-side pump 42b is similar to those of the high-temperature-side pump 32 and the first low-temperature-side pump 42a.

A device-side circuit unit 50 according to the second embodiment is a heat medium circuit that uses heat generated in a heat generating device 53 mounted on an electric vehicle. The device-side circuit unit 50 also functions as a part of the configuration of the low-temperature-side heat medium circuit 40. The device-side circuit unit 50 is configured by connecting the heat generating device 53, a device-side pump 52, a device-side three-way valve 54, and a device-side reserve tank 55 using a device-side heat medium flow path 51.

As illustrated in FIG. 26, one end portion of the device-side heat medium flow path 51 is connected to the low-temperature-side heat medium flow path 41 on the heat medium inlet port side of the second heat exchange unit 29d in the combined heat exchanger 29. The other end portion of the device-side heat medium flow path 51 is connected to the low-temperature-side heat medium flow path 41 on the heat-medium outlet port side of the second heat exchange unit 29d.

A heat medium passage 53a of the heat generating device 53 is disposed in the device-side heat medium flow path 51. The discharge port of the device-side pump 52 is connected to the inlet port side of the heat medium passage 53a in the heat generating device 53. The basic configuration of the device-side pump 52 is similar to that of the high-temperature-side pump 32 or the like.

As illustrated in FIG. 26, the suction port of the device-side pump 52 is connected to the device-side reserve tank 55 through the device-side heat medium flow path 51. The device-side reserve tank 55 is a storage unit that stores a low-temperature-side heat medium excess in the low-temperature-side heat medium circuit 40 including the device-side circuit unit 50.

The device-side reserve tank 55 has a heat medium supply port for supplying the low-temperature-side heat medium when the amount of the low-temperature-side heat medium in the low-temperature-side heat medium circuit 40 is insufficient. The heat medium inlet port side of the device-side reserve tank 55 is connected to the low-temperature-side heat medium flow path 41 on the heat medium inlet port side of the second heat exchange unit 29d in the combined heat exchanger 29 through the device-side heat medium flow path 51.

One of inlet and outlet ports of the device-side three-way valve 54 is connected to the outlet port side of the heat medium passage 53a in the heat generating device 53. Another inlet and outlet port of the device-side three-way valve 54 is connected to the low-temperature-side heat medium flow path 41 on the heat-medium outlet port side of the second heat exchange unit 29d in the combined heat exchanger 29 through the device-side heat medium flow path 51.

A device-side bypass flow path 51a is connected to yet another inlet and outlet port of the device-side three-way valve 54. The device-side bypass flow path 51a is a heat medium flow path for bypassing the second heat exchange unit 29d of the combined heat exchanger 29 with respect to the flow of the heat medium. The other end side of the device-side bypass flow path 51a is connected to the device-side heat medium flow path 51 on the inlet port side of the device-side reserve tank 55.

Figure 28:
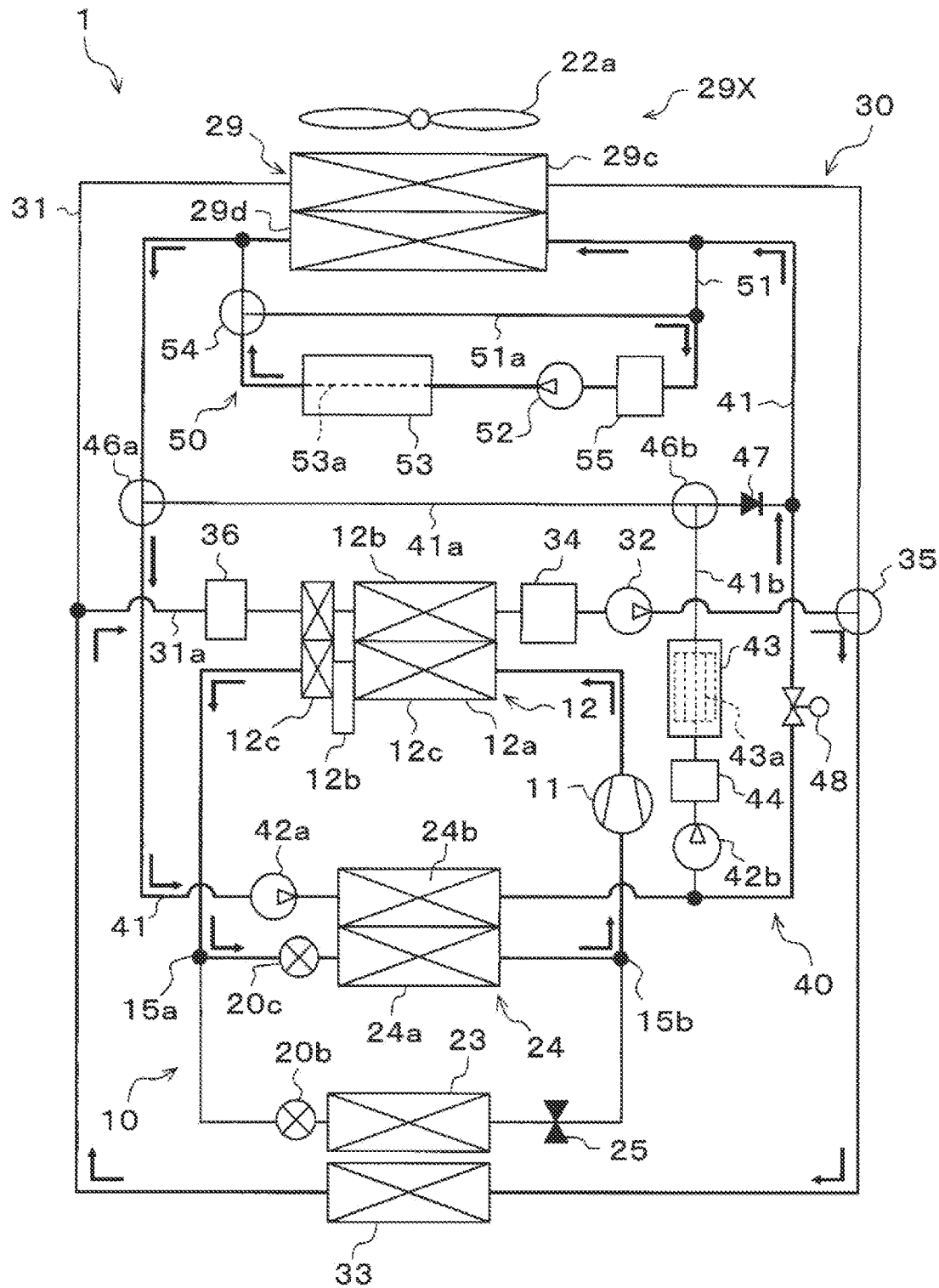
FIG. 28 is an overall configuration diagram illustrating an operation of the vehicle air conditioner according to the second embodiment in the heating mode.

Next, the heating mode in the vehicle air conditioner 1 according to the second embodiment will be described with reference to FIG. 28. In the heating mode according to the second embodiment, the controller 70 brings the cooling expansion valve 20c into a throttled state and brings the cooling expansion valve 20b into a fully closed state. In addition, the controller 70 controls the operation of the compressor 11 so as to exhibit the refrigerant discharge capability set in the heating mode.

In the high-temperature-side heat medium circuit 30, the controller 70 operates the high-temperature-side pump 32 in such a manner that the high-temperature-side heat medium circulates. The controller 70 then operates the high-temperature-side three-way valve 35 in such a manner that the inlet and outlet port on the side of the common flow path 31a communicates with the inlet and outlet port on the side of the heater core 33, and the inlet and outlet port to the side of the first heat exchange unit 29c of the combined heat exchanger 29 is closed.

In the low-temperature-side heat medium circuit 40, the controller 70 operates the first low-temperature-side three-way valve 46a in such a manner that the inlet and outlet port on the side of the second heat exchange unit 29d of the combined heat exchanger 29 communicates with the inlet and outlet port on the side of the first low-temperature-side pump 42a, and the inlet and outlet port on the side of the bypass flow path 41a is closed. In addition, the controller 70 opens the low-temperature-side on-off valve 48. The controller 70 operates the first low-temperature-side pump 42a and stops the second low-temperature-side pump 42b.

In the device-side circuit unit 50, the controller 70 operates the device-side three-way valve 54 in such a manner that the inlet and outlet port on the side of the heat generating device 53 communicates with the inlet and outlet port on the side of the device-side bypass flow path 51a, and the inlet and outlet port on the side of the second heat exchange unit 29d of the combined heat exchanger 29 is closed. The controller 70 controls the operation of the device-side pump 52 in such a manner that the heat medium temperature of the device-side heat medium circuit 50a falls within a temperature range set in the heat generating device 53.

As a result, the vapor compression refrigeration cycle is configured in the refrigeration cycle device 10 in the heating mode. As illustrated in FIG. 28, the refrigerant in the heating mode flows and circulates through the compressor 11, the water-refrigerant heat exchanger 12, the cooling expansion valve 20c, the chiller 24, and the compressor 11 in this order.

In the high-temperature-side heat medium circuit 30 in the heating mode, the high-temperature-side heat medium flows and circulates through the high-temperature-side pump 32, the high-temperature-side three-way valve 35, the heater core 33, the high-temperature-side reserve tank 36, the water-refrigerant heat exchanger 12, the water heater 34, and the high-temperature-side pump 32 in this order.

In the low-temperature-side heat medium circuit 40 in the heating mode, the low-temperature-side heat medium flows and circulates through the first low-temperature-side pump 42a, the chiller 24, the low-temperature-side on-off valve 48, the second heat exchange unit 29d of the combined heat exchanger 29, the first low-temperature-side three-way valve 46a, and the first low-temperature-side pump 42a in this order.

In the device-side circuit unit 50 in the heating mode, the low-temperature-side heat medium flows and circulates through the device-side pump 52, the heat generating device 53, the device-side three-way valve 54, the device-side bypass flow path 51a, the device-side reserve tank 55, and the device-side pump 52 in this order.

With this circuit configuration, the controller 70 controls the operations of the various control target devices. For example, in the case of the compressor 11, the controller 70 controls the refrigerant discharge capability in such a manner that the temperature of the high-temperature-side heat medium in the heater core 33 approaches a target high-temperature-side heat medium temperature.

The target high-temperature-side heat medium temperature is determined based on the target blowing temperature TAO with reference to a heating mode control map stored in advance in the controller 70. The target blowing temperature TAO is calculated using detection signals of various control sensors and operation signals of the operation panel.

The controller 70 controls the throttle opening of the cooling expansion valve in such a manner that the degree of superheating of the refrigerant on the outlet port side of the refrigerant passage 24a in the chiller 24 approaches a predetermined reference chiller-side degree of superheating. The degree of superheating of the refrigerant on the outlet port side of the chiller 24 is calculated from the temperature of the refrigerant on the outlet port side detected by a chiller temperature sensor 72h and the pressure of the refrigerant on the outlet port side detected by a chiller pressure sensor 72i. The reference chiller-side degree of superheating is set in such a manner that the battery temperature TB is the temperature of the low-temperature-side heat medium that can be maintained within an appropriate temperature range of the battery 75.

The controller 70 controls the opening of an air mix door 64 in such a manner that the ventilation air temperature TAV detected by a conditioned air temperature sensor 72e approaches the target blowing temperature TAO. In the heating mode, the opening of the air mix door 64 may be controlled in such a manner that the total volume of the ventilation air having passed through the inside evaporator 23 flows into the water-refrigerant heat exchanger 12.

In the refrigeration cycle device 10 in the heating mode, when the compressor 11 operates, the high-pressure refrigerant discharged from the compressor 11 flows into the refrigerant passage 12a of the water-refrigerant heat exchanger 12. The refrigerant flowing into the water-refrigerant heat exchanger 12 radiates heat to the high-temperature-side heat medium flowing through the heat medium passage 12b and condenses. As a result, the high-temperature-side heat medium is heated in the water-refrigerant heat exchanger 12.

The refrigerant flowing out of the water-refrigerant heat exchanger 12 flows into the cooling expansion valve 20c, and is decompressed to become a low-pressure refrigerant. The low-pressure refrigerant passing through the refrigerant passage 24a of the chiller 24 exchanges heat with the low-temperature-side heat medium flowing through the heat medium passage 24b, absorbs heat from the low-temperature-side heat medium, and evaporates. The refrigerant flowing out of the refrigerant passage 24a of the chiller 24 is sucked into the compressor 11 and compressed again.

In the low-temperature-side heat medium circuit 40 in the heating mode, the low-temperature-side heat medium circulates through the second heat exchange unit 29d of the combined heat exchanger 29 and the heat medium passage 24b of the chiller 24. Therefore, in the second heat exchange unit 29d of the combined heat exchanger 29, the low-temperature-side heat medium absorbs heat from the outside air supplied by the outside air fan 22a and flows into the heat medium passage 24b of the chiller 24.

In the heating mode, the vehicle cabin can be heated by blowing the ventilation air heated by the heater core 33 into the vehicle cabin while using the outside air as a heat source. In the heating mode, the waste heat of the heat generating device 53 can be stored in the low-temperature-side heat medium of the device-side circuit unit 50.

Also in the second embodiment, in a case where the outside air is low temperature and high humidity air during the heating operation, frost is formed on the combined heat exchanger 29. The vehicle air conditioner 1 according to the second embodiment includes, as the operation mode of the defrosting operation, a first condensation-heat defrosting mode, a second condensation-heat defrosting mode, a third condensation-heat defrosting mode, a storage heat defrosting mode, a battery-waste-heat use defrosting mode, and a heater use defrosting mode.

As the operation mode of the defrosting operation according to the second embodiment, the first condensation-heat defrosting mode will be described first with reference to FIG. 29. The first condensation-heat defrosting mode of the second embodiment is an operation mode in which the combined heat exchanger 29 is defrosted using heat absorbed from the ventilation air by the inside evaporator 23 and heat absorbed from the low-temperature-side heat medium circuit 40 by the chiller 24, as in the first embodiment.

The first condensation-heat defrosting mode is performed, for example, at the time of defrosting the combined heat exchanger 29 in a case where the battery 75 of the electric vehicle is being charged and there is a heat capacity in the vehicle cabin. When the battery 75 is being charged, it is assumed that the amount of heat generated in the battery 75 is large.

In the first condensation-heat defrosting mode, the controller 70 brings the cooling expansion valve 20b and the cooling expansion valve 20c into a throttled state with a throttle opening suitable for each valve. In addition, the controller 70 controls the operation of the compressor 11 so as to exhibit the refrigerant discharge capability set in the first condensation-heat defrosting mode.

In the high-temperature-side heat medium circuit 30, the controller 70 operates the high-temperature-side pump 32 in such a manner that the high-temperature-side heat medium circulates. The controller 70 then operates the high-temperature-side three-way valve 35 in such a manner that the inlet and outlet port on the side of the common flow path 31a communicates with the inlet and outlet port on the side of the first heat exchange unit 29c of the combined heat exchanger 29, and the inlet and outlet port on the side of the heater core 33 is closed.

In the low-temperature-side heat medium circuit 40, the controller 70 operates the first low-temperature-side three-way valve 46a in such a manner that the inlet and outlet port on the side of the bypass flow path 41a communicates with the inlet and outlet port on the side of the first low-temperature-side pump 42a, and the inlet and outlet port on the side of the second heat exchange unit 29d of the combined heat exchanger 29 is closed.

The controller 70 operates the second low-temperature-side three-way valve 46b in such a manner that the inlet and outlet port on the side of the battery connection flow path 41b communicates with the inlet and outlet port on the side of the bypass flow path 41a, and the inlet and outlet port on the side of the low-temperature-side check valve 47 is closed. Further, the controller 70 operates the first low-temperature-side pump 42a and the second low-temperature-side pump 42b, and closes the low-temperature-side on-off valve 48.

In the device-side circuit unit 50, the controller 70 operates the device-side three-way valve 54 in such a manner that the inlet and outlet port on the side of the heat generating device 53 communicates with the inlet and outlet port on the side of the device-side bypass flow path 51a, and the inlet and outlet port on the side of the second heat exchange unit 29d of the combined heat exchanger 29 is closed. The controller 70 controls the operation of the device-side pump 52 in such a manner that the heat medium temperature of the device-side heat medium circuit 50a falls within a temperature range set in the heat generating device 53.

As a result, at least two refrigerant circulation circuits are configured in the refrigeration cycle device 10 in the first condensation-heat defrosting mode. The refrigerant in the first condensation-heat defrosting mode flows and circulates through the compressor 11, the water-refrigerant heat exchanger 12, the cooling expansion valve 20c, the chiller 24, and the compressor 11 in this order. At the same time, the refrigerant flows and circulates through the compressor 11, the water-refrigerant heat exchanger 12, the cooling expansion valve 20b, the inside evaporator 23, the evaporation pressure regulating valve 25, and the compressor 11 in this order.

In the high-temperature-side heat medium circuit 30 in the first condensation-heat defrosting mode, the high-temperature-side heat medium flows and circulates through the high-temperature-side pump 32, the high-temperature-side three-way valve 35, the combined heat exchanger 29, the high-temperature-side reserve tank 36, the water-refrigerant heat exchanger 12, the water heater 34, and the high-temperature-side pump 32 in this order.

In the low-temperature-side heat medium circuit 40 in the first condensation-heat defrosting mode, the circulation circuit of the low-temperature-side heat medium through the battery connection flow path 41b and the bypass flow path 41a is configured. Specifically, the low-temperature-side heat medium flows and circulates through the first low-temperature-side pump 42a, the chiller 24, the second low-temperature-side pump 42b, the electric heater 44, the battery heat exchange unit 43, the second low-temperature-side three-way valve 46b, the first low-temperature-side three-way valve 46a, and the first low-temperature-side pump 42a in this order.

In the device-side circuit unit 50 in the first condensation-heat defrosting mode, the low-temperature-side heat medium flows and circulates through the device-side pump 52, the heat generating device 53, the device-side three-way valve 54, the device-side bypass flow path 51a, the device-side reserve tank 55, and the device-side pump 52 in this order.

With this circuit configuration, the controller 70 controls the operations of the various control target devices. For example, in the case of the compressor 11, the controller 70 controls the refrigerant discharge capability in such a manner that the temperature of the high-temperature-side heat medium in the heater core 33 approaches a target high-temperature-side heat medium temperature.

The controller 70 controls the throttle opening of the cooling expansion valve 20b in such a manner that the degree of superheating of the refrigerant on the outlet port side of the inside evaporator 23 approaches a predetermined reference evaporator-side degree of superheating (in the present embodiment, 5° C.). The degree of superheating of the refrigerant on the outlet port side of the inside evaporator 23 is calculated from the refrigerant evaporation temperature Te detected by an evaporator temperature sensor 72f and the refrigerant evaporation pressure Pe detected by an evaporator pressure sensor 72g.

The controller 70 controls the throttle opening of the cooling expansion valve in such a manner that the degree of superheating of the refrigerant on the outlet port side of the refrigerant passage 24a in the chiller 24 approaches a predetermined reference chiller-side degree of superheating. The degree of superheating of the refrigerant on the outlet port side of the chiller 24 is calculated from the temperature of the refrigerant on the outlet port side detected by the chiller temperature sensor 72h and the pressure of the refrigerant on the outlet port side detected by the chiller pressure sensor 72i. The reference chiller-side degree of superheating is set in such a manner that the battery temperature TB is the temperature of the low-temperature-side heat medium that can be maintained within an appropriate temperature range of the battery 75.

Figure 29:
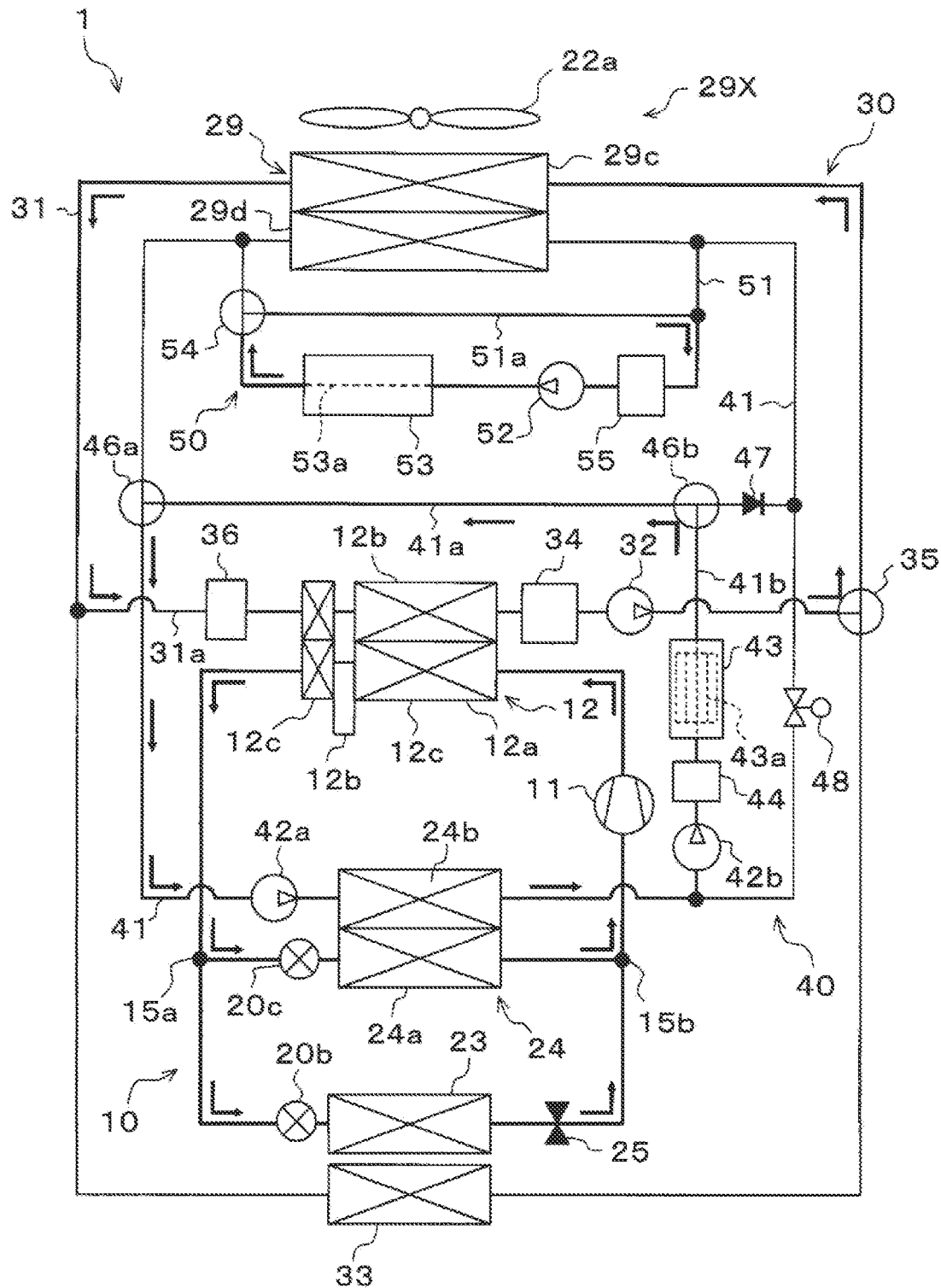
FIG. 29 is an overall configuration diagram illustrating an operation of the vehicle air conditioner according to the second embodiment in the first condensation-heat defrosting mode.

As illustrated in FIG. 29, in the refrigeration cycle device 10, the high-pressure refrigerant discharged from the compressor 11 passes through the refrigerant passage 12a of the water-refrigerant heat exchanger 12. The refrigerant radiates heat to the high-temperature-side heat medium flowing through the heat medium passage 12b of the water-refrigerant heat exchanger 12 and heats the high-temperature-side heat medium.

In the first condensation-heat defrosting mode, when flowing out of the heat medium passage 12b of the water-refrigerant heat exchanger 12, the high-temperature-side heat medium flows into the first heat exchange unit 29c of the combined heat exchanger 29. As a result, the high-temperature-side heat medium can apply heat of the high-pressure refrigerant to the combined heat exchanger 29.

As illustrated in FIG. 27, in the combined heat exchanger 29, the first heat exchange unit 29c and the second heat exchange unit 29d are thermally connected via the heat exchange fins 29e. Therefore, the heat of the high-pressure refrigerant can be transferred to the second heat exchange unit 29d via the high-temperature-side heat medium and the heat exchange fins 29e, so that the combined heat exchanger 29 can be defrosted.

The flow of the refrigerant flowing out of the refrigerant passage 12a of the water-refrigerant heat exchanger 12 is branched into the flow on the side of the cooling expansion valve 20b and the flow on the side of the cooling expansion valve 20c at the refrigerant branch portion 15a. The refrigerant flowing out of one outlet port of the refrigerant branch portion 15a is decompressed by the cooling expansion valve 20b and flows into the inside evaporator 23. The low-pressure refrigerant flowing into the inside evaporator 23 absorbs heat from the air in the vehicle cabin within the casing 61 and evaporates.

The refrigerant flowing out of the other outlet port of the refrigerant branch portion 15a is decompressed by the cooling expansion valve 20c and flows into the refrigerant passage 24a of the chiller 24. In the low-temperature-side heat medium circuit 40, the low-temperature-side pump 42 operates, and the low-temperature side heat medium circulates through the battery heat exchange unit 43. Therefore, the low-temperature-side heat medium having absorbed heat from the battery 75 is pumped to the heat medium passage 24b of the chiller 24. That is, the low-pressure refrigerant flowing into the chiller 24 absorbs heat from the low-temperature-side heat medium heated by the waste heat of the battery 75 and evaporates.

The refrigerant flowing out of the inside evaporator 23 and the refrigerant flowing out of the chiller 24 are merged at the refrigerant merging portion 15b, sucked into the compressor 11, and compressed again.

As described above, in the first condensation-heat defrosting mode, the heat of the air in the vehicle cabin absorbed by the inside evaporator 23 and the heat generated in the battery 75 and absorbed by the chiller 24 can be pumped up by the refrigeration cycle device 10 and used for defrosting the combined heat exchanger 29. Therefore, the first condensation-heat defrosting mode corresponds to an example of the battery heat use mode.

In the first condensation-heat defrosting mode, the waste heat of the heat generating device 53 can be stored in the low-temperature-side heat medium of the device-side circuit unit 50. At this time, by controlling the operation of the device-side three-way valve 54, the stored waste heat of the heat generating device 53 can be used for defrosting the combined heat exchanger 29.

Next, the second condensation-heat defrosting mode and the third condensation-heat defrosting mode according to the second embodiment will be described. The second condensation-heat defrosting mode is an operation mode in which the combined heat exchanger 29 is defrosted using heat absorbed from the low-temperature-side heat medium circuit 40 by the chiller 24, as in the first embodiment. The third condensation-heat defrosting mode is an operation mode in which the combined heat exchanger 29 is defrosted using heat absorbed from the air inside the vehicle cabin by the inside evaporator 23.

First, the operations of the various control target devices in the second condensation-heat defrosting mode according to the second embodiment are similar to those in the first embodiment according to the second embodiment except that the cooling expansion valve 20b is closed.

Figure 30:
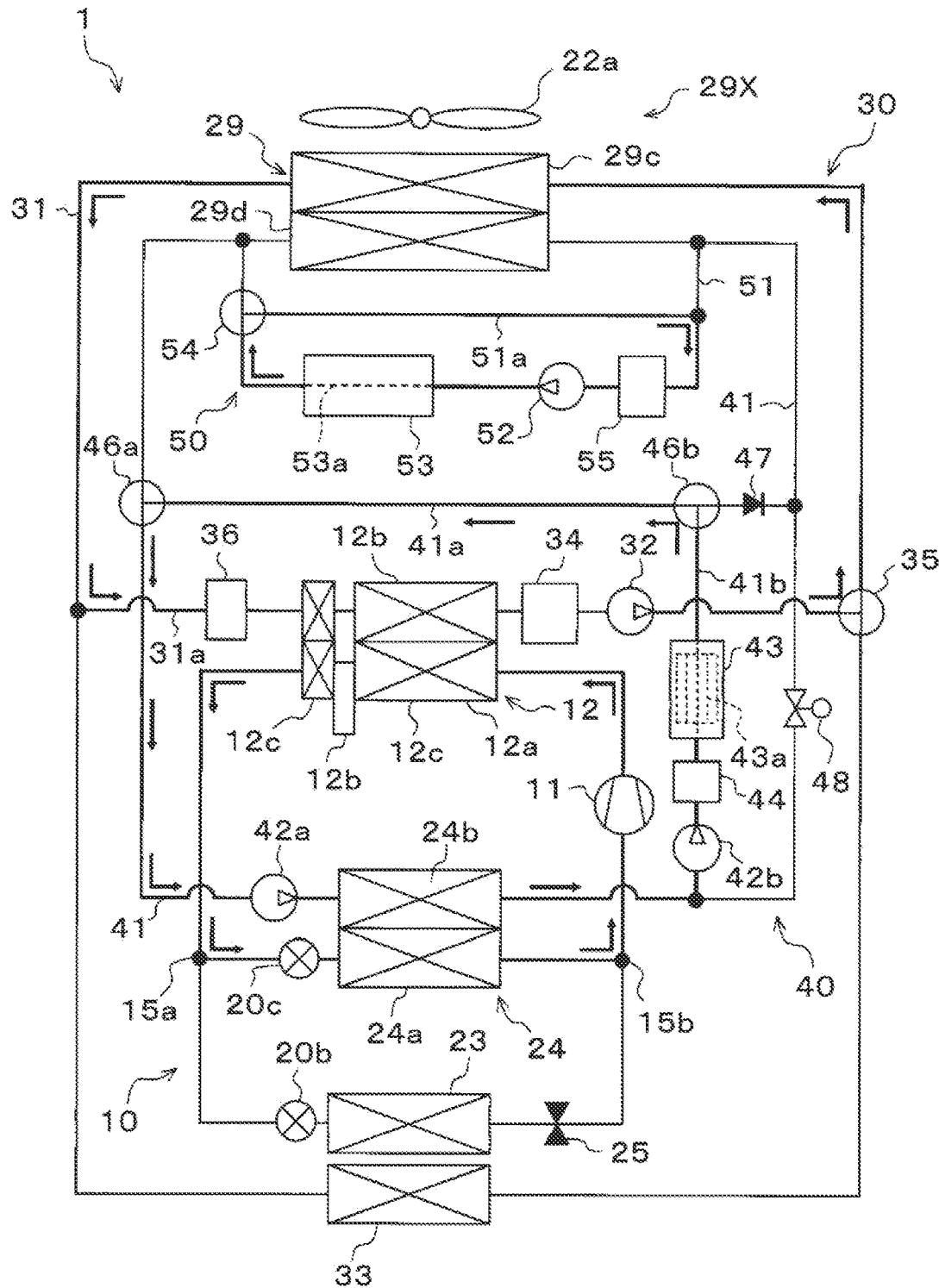
FIG. 30 is an overall configuration diagram illustrating an operation of the vehicle air conditioner according to the second embodiment in the second condensation-heat defrosting mode.

As a result, in the refrigeration cycle device 10 in the second condensation-heat defrosting mode, as illustrated in FIG. 30, the refrigerant flows and circulates through the compressor 11, the water-refrigerant heat exchanger 12, the cooling expansion valve 20c, the chiller 24, and the compressor 11 in this order.

In the high-temperature-side heat medium circuit 30 in the second condensation-heat defrosting mode, the high-temperature-side heat medium flows and circulates through the high-temperature-side pump 32, the high-temperature-side three-way valve 35, the combined heat exchanger 29, the high-temperature-side reserve tank 36, the water-refrigerant heat exchanger 12, the water heater 34, and the high-temperature-side pump 32 in this order.

In the low-temperature-side heat medium circuit 40 in the second condensation-heat defrosting mode, the circulation circuit of the low-temperature-side heat medium through the battery connection flow path 41b and the bypass flow path 41a is configured. Specifically, the low-temperature-side heat medium flows and circulates through the first low-temperature-side pump 42a, the chiller 24, the second low-temperature-side pump 42b, the electric heater 44, the battery heat exchange unit 43, the second low-temperature-side three-way valve 46b, the first low-temperature-side three-way valve 46a, and the first low-temperature-side pump 42a in this order.

In the device-side circuit unit 50 in the second condensation-heat defrosting mode, the low-temperature-side heat medium flows and circulates through the device-side pump 52, the heat generating device 53, the device-side three-way valve 54, the device-side bypass flow path 51a, the device-side reserve tank 55, and the device-side pump 52 in this order.

With this circuit configuration, the controller 70 controls the operations of the various control target devices. In the second condensation-heat defrosting mode, the control target devices are controlled in a manner similar to that in the first condensation-heat defrosting mode except for the cooling expansion valve 20b.

As illustrated in FIG. 30, in the second condensation-heat defrosting mode, the heat generated in the battery 75 and absorbed by the chiller 24 can be pumped up by the refrigeration cycle device 10 and used for defrosting the combined heat exchanger 29. Therefore, the second condensation-heat defrosting mode corresponds to an example of the battery heat use mode.

In the second condensation-heat defrosting mode, the waste heat of the heat generating device 53 can be stored in the low-temperature-side heat medium of the device-side circuit unit 50. At this time, by controlling the operation of the device-side three-way valve 54, the stored waste heat of the heat generating device 53 can be used for defrosting the combined heat exchanger 29.

Next, the operations of the various control target devices in the third condensation-heat defrosting mode according to the second embodiment are similar to those in the first condensation-heat defrosting mode described above except that the cooling expansion valve 20c is closed. That is, in the third condensation-heat defrosting mode, the refrigerant flows and circulates through the compressor 11, the water-refrigerant heat exchanger 12, the cooling expansion valve 20b, the inside evaporator 23, and the compressor 11 in this order. The flow of the high-temperature-side heat medium and the like in the high-temperature-side heat medium circuit 30 are similar to those in the first condensation-heat defrosting mode. As a result, in the third condensation-heat defrosting mode, the heat of the air in the vehicle cabin can be pumped up by the refrigeration cycle device 10 and used for defrosting the combined heat exchanger 29.

The storage heat defrosting mode that is the operation mode of the defrosting operation in the second embodiment will be described with reference to FIG. 31. The storage heat defrosting mode is an operation mode in which the combined heat exchanger 29 is defrosted using heat stored in the low-temperature-side heat medium without operating the refrigeration cycle device 10 in the operation mode such as the heating mode in the second embodiment.

As described above, as illustrated in FIGS. 28 to 30, in the device-side circuit unit 50 in the heating mode or the like, the low-temperature-side heat medium flows through the device-side pump 52, the heat generating device 53, the device-side three-way valve 54, the device-side heat medium flow path 51, the device-side reserve tank 55, and the device-side pump 52 in this order. Therefore, the waste heat of the heat generating device 53 is stored in the low-temperature-side heat medium of the device-side circuit unit 50. In the storage heat defrosting mode, the combined heat exchanger 29 is defrosted using heat stored in the low-temperature-side heat medium of the device-side circuit unit 50 without operating the refrigeration cycle device 10.

In the storage heat defrosting mode, the controller 70 stops the compressor 11, and brings the cooling expansion valve 20b and the cooling expansion valve 20c into a fully open state. Accordingly, the refrigeration cycle device 10 does not operate in the storage heat defrosting mode.

In the high-temperature-side heat medium circuit 30, the controller 70 stops the high-temperature-side pump 32. The controller 70 then operates the high-temperature-side three-way valve 35 in such a manner that the inlet and outlet port on the side of the common flow path 31a communicates with the inlet and outlet port on the side of the heater core 33, and the inlet and outlet port to the side of the first heat exchange unit 29c of the combined heat exchanger 29 is closed. Therefore, in the high-temperature-side heat medium circuit 30 in the storage heat defrosting mode, the high-temperature-side heat medium does not circulate.

In the low-temperature-side heat medium circuit 40, the controller 70 stops the first low-temperature-side pump 42a and the second low-temperature-side pump 42b. The controller 70 operates the first low-temperature-side three-way valve 46a in such a manner that the inlet and outlet port on the side of the bypass flow path 41a communicates with the inlet and outlet port on the side of the second heat exchange unit 29d of the combined heat exchanger 29, and the inlet and outlet port on the side of the first low-temperature-side pump 42a is closed. In addition, the controller 70 closes the low-temperature-side on-off valve 48. Therefore, in the low-temperature-side heat medium circuit 40 in the storage heat defrosting mode, the low-temperature-side heat medium does not circulate.

In the device-side circuit unit 50 in the storage heat defrosting mode, the controller 70 operates the device-side three-way valve 54 in such a manner that the inlet and outlet port on the side of the heat generating device 53 communicates with the inlet and outlet port on the side of the second heat exchange unit 29d of the combined heat exchanger 29, and the inlet and outlet port on the side of the device-side bypass flow path 51a is closed. The controller 70 then operates the device-side pump 52 to pump the low-temperature-side heat medium in the device-side circuit unit 50 with the pumping capability set in the storage heat defrosting mode.

Figure 31:
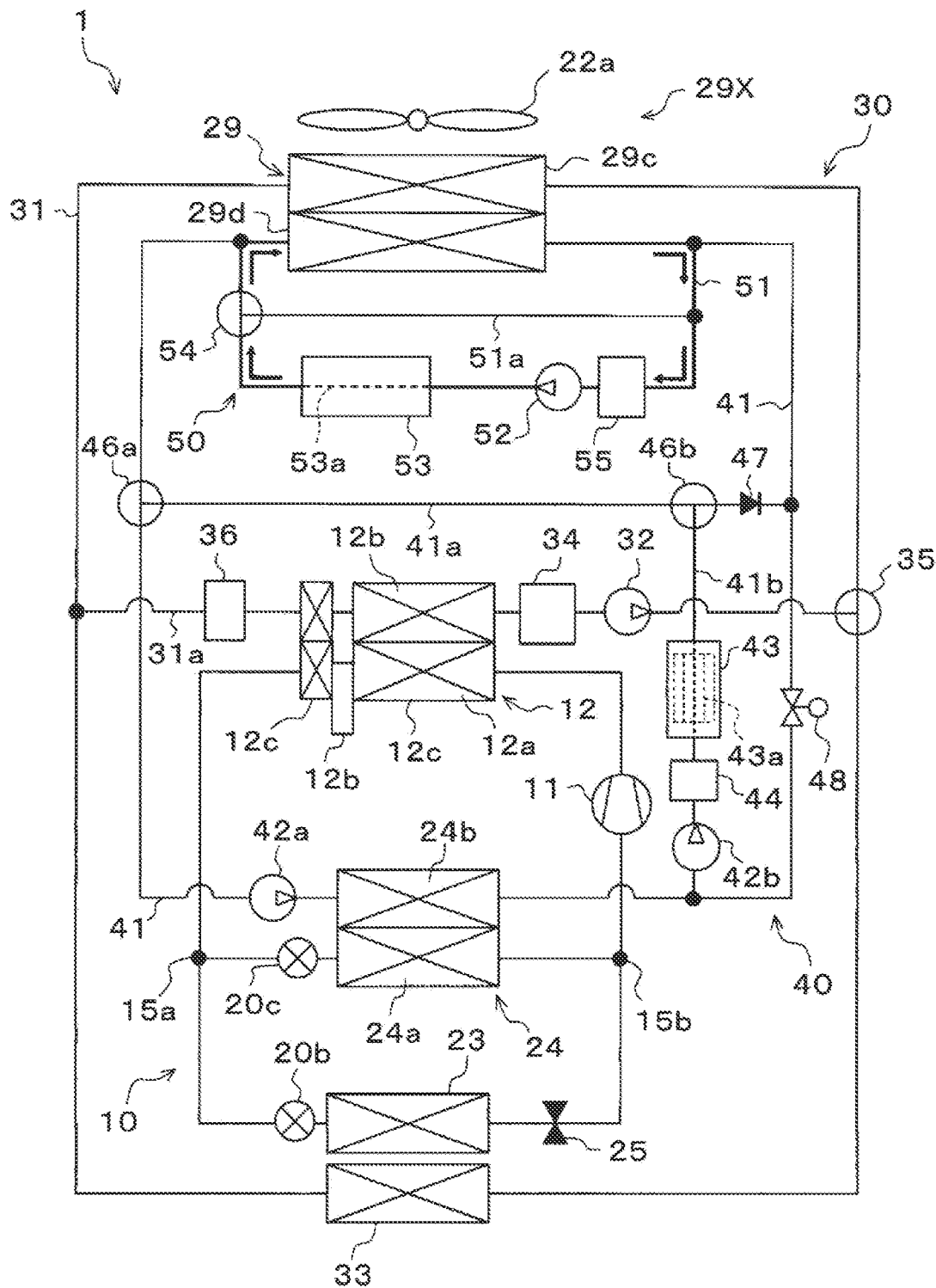
FIG. 31 is an overall configuration diagram illustrating an operation of the vehicle air conditioner according to the second embodiment in the storage heat defrosting mode.

As illustrated in FIG. 31, in the device-side circuit unit 50 in the storage heat defrosting mode, the low-temperature-side heat medium storing the waste heat of the heat generating device 53 flows into the second heat exchange unit 29d of the combined heat exchanger 29 via the heat generating device 53 and the device-side three-way valve 54. As a result, in the storage heat defrosting mode, the heat stored in the low-temperature-side heat medium of the device-side circuit unit 50 can be transferred to the combined heat exchanger 29, so that the combined heat exchanger 29 can be defrosted.

Figure 32:
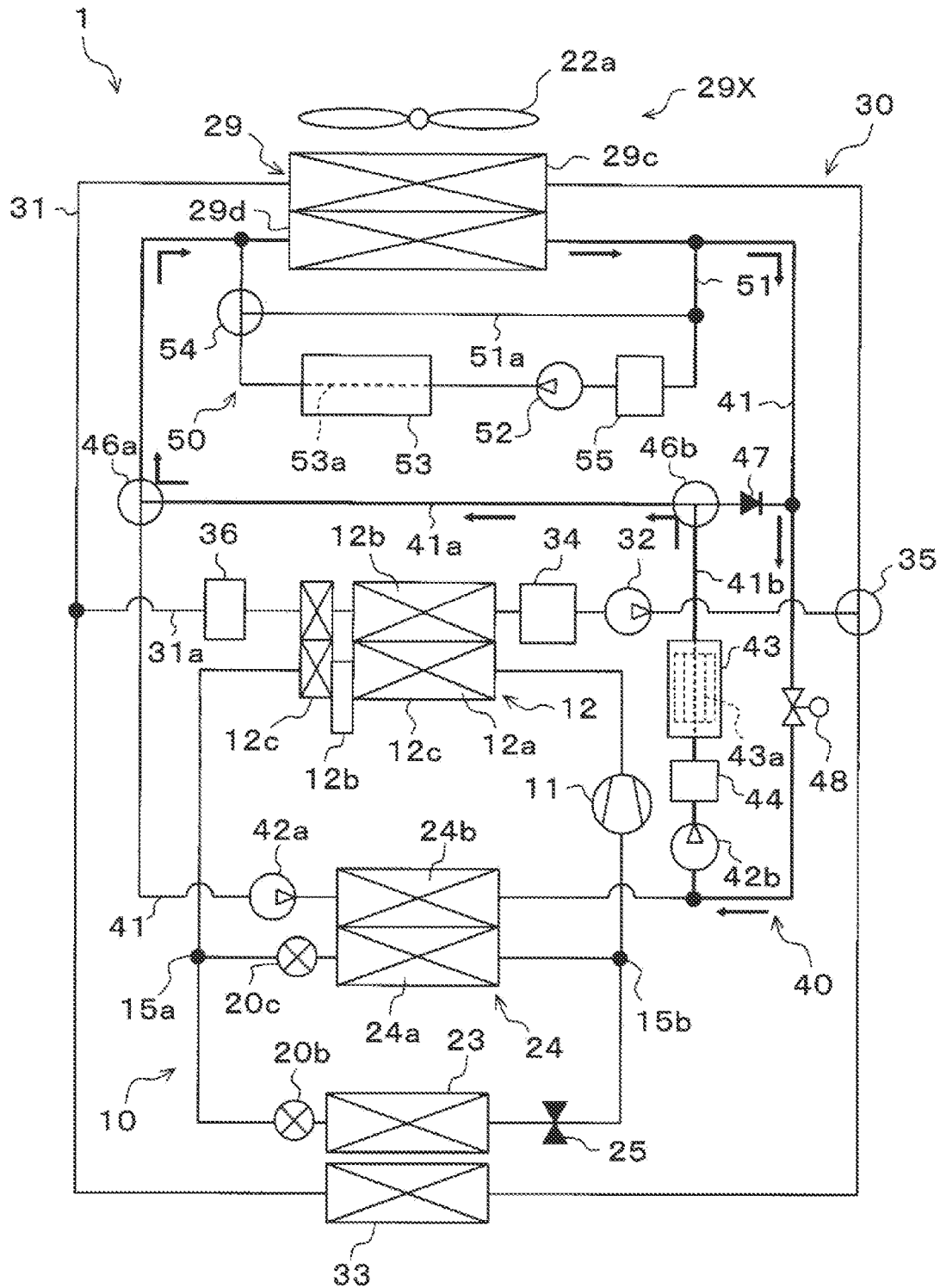
FIG. 32 is an overall configuration diagram illustrating an operation of the vehicle air conditioner according to the second embodiment in a battery-waste-heat use defrosting mode.

Next, the battery-waste-heat use defrosting mode that is the operation mode of the defrosting operation in the second embodiment will be described with reference to FIG. 32. The battery-waste-heat defrosting mode is an operation mode in which the combined heat exchanger 29 is defrosted using waste heat generated in the battery 75 without operating the refrigeration cycle device 10.

In the battery-waste-heat defrosting mode, the controller 70 stops the compressor 11, and brings the cooling expansion valve 20b and the cooling expansion valve 20c into a fully open state. Accordingly, the refrigeration cycle device 10 does not operate in the battery-waste-heat defrosting mode.

In the high-temperature-side heat medium circuit 30, the controller 70 stops the high-temperature-side pump 32. The controller 70 then operates the high-temperature-side three-way valve 35 in such a manner that the inlet and outlet port on the side of the common flow path 31a communicates with the inlet and outlet port on the side of the heater core 33, and the inlet and outlet port to the side of the first heat exchange unit 29c of the combined heat exchanger 29 is closed. Therefore, in the high-temperature-side heat medium circuit 30 in the battery-waste-heat defrosting mode, the high-temperature-side heat medium does not circulate.

In the low-temperature-side heat medium circuit 40, the controller 70 stops the first low-temperature-side pump 42a and causes the second low-temperature-side pump 42b to exhibit predetermined pumping capability. The controller 70 operates the first low-temperature-side three-way valve 46a in such a manner that the inlet and outlet port on the side of the bypass flow path 41a communicates with the inlet and outlet port on the side of the second heat exchange unit 29d of the combined heat exchanger 29, and the inlet and outlet port on the side of the first low-temperature-side pump 42a is closed.

The controller 70 operates the second low-temperature-side three-way valve 46b in such a manner that the inlet and outlet port on the side of the battery connection flow path 41b communicates with the inlet and outlet port on the side of the bypass flow path 41a, and the inlet and outlet port on the side of the low-temperature-side check valve 47 is closed. In addition, the controller 70 opens the low-temperature-side on-off valve 48.

In the device-side circuit unit 50, the controller 70 operates the device-side three-way valve 54 in such a manner that the inlet and outlet port on the side of the heat generating device 53 communicates with the inlet and outlet port on the side of the device-side bypass flow path 51a, and the inlet and outlet port on the side of the second heat exchange unit 29d of the combined heat exchanger 29 is closed. The controller 70 then stops the device-side pump 52. Therefore, in the device-side circuit unit 50 in the battery-waste-heat defrosting mode, the low-temperature-side heat medium does not circulate.

In the low-temperature-side heat medium circuit 40 in the battery-waste-heat defrosting mode, the low-temperature-side heat medium flows and circulates through the second low-temperature-side pump 42b, the electric heater 44, the battery heat exchange unit 43, the second low-temperature-side three-way valve 46b, the first low-temperature-side three-way valve 46a, the combined heat exchanger 29, and the low-temperature-side on-off valve 48 in this order.

With this circuit configuration, the controller 70 controls the operations of the various control target devices. In the battery-waste-heat defrosting mode, the low-temperature-side heat medium pumped from the second low-temperature-side pump 42b flows into the heat medium passage 43a of the battery heat exchange unit 43 via the electric heater 44. In the heat medium passage 43a of the battery heat exchange unit 43, the low-temperature-side heat medium absorbs waste heat generated in the battery 75 due to charging or the like, and is heated.

When flowing out of the heat medium passage 43a of the battery heat exchange unit 43, the low-temperature-side heat medium flows into the second heat exchange unit 29d of the combined heat exchanger 29 via the second low-temperature-side three-way valve 46b and the first low-temperature-side three-way valve 46a. As a result, the low-temperature-side heat medium can apply waste heat of the battery 75 to the combined heat exchanger 29, and the combined heat exchanger 29 can be defrosted.

When flowing out of the second heat exchange unit 29d of the combined heat exchanger 29, the low-temperature-side heat medium flows into the suction port of the second low-temperature-side pump 42b via the low-temperature-side on-off valve 48. As a result, the low-temperature-side heat medium is pumped again toward the electric heater 44.

As described above, in the battery-waste-heat defrosting mode, the waste heat of the battery 75 can be transferred to the second heat exchange unit 29d of the combined heat exchanger 29 by the low-temperature-side heat medium, and can be used for defrosting the combined heat exchanger 29.

In the battery-waste-heat defrosting mode, in a case where the temperature of the low-temperature-side heat medium flowing into the second heat exchange unit 29d of the combined heat exchanger 29 is lower than a necessary temperature, the electric heater 44 can be operated to heat the low-temperature-side heat medium. As a result, the temperature of the low-temperature-side heat medium can be raised to a temperature sufficient for defrosting the combined heat exchanger 29 (for example, within the range of 15° C. to 70° C.), and the defrosting of the combined heat exchanger 29 can be reliably performed.

Figure 33:
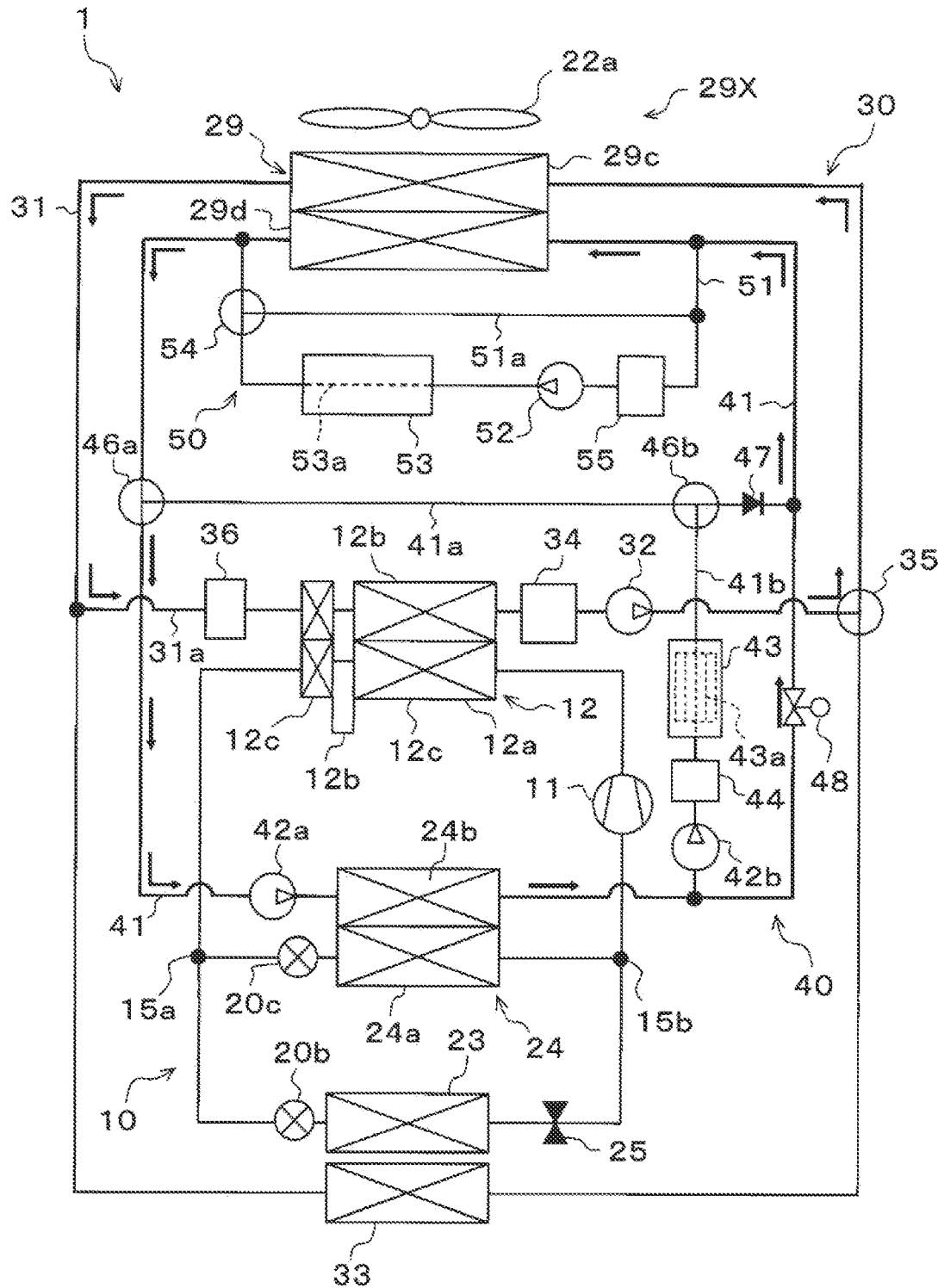
FIG. 33 is an overall configuration diagram illustrating an operation of the vehicle air conditioner according to the second embodiment in a heater use defrosting mode.

Next, the heater use defrosting mode, which is one of the operation modes of the defrosting operation according to the second embodiment, will be described with reference to FIG. 33. The heater use defrosting mode is an operation mode in which the combined heat exchanger 29 is defrosted using heat generated in the water heater 34 without operating the refrigeration cycle device 10.

In the heater use defrosting mode, the controller 70 stops the compressor 11, and brings the cooling expansion valve 20b and the cooling expansion valve 20c into a fully open state. Accordingly, the refrigeration cycle device 10 does not operate in the heater use defrosting mode.

For the high-temperature-side heat medium circuit 30, the controller 70 operates the high-temperature-side pump 32 and causes the water heater 34 to generate heat with a calorific value set in the heater use defrosting mode. The controller 70 then operates the high-temperature-side three-way valve 35 in such a manner that the inlet and outlet port on the side of the common flow path 31a communicates with the inlet and outlet port on the side of the first heat exchange unit 29c of the combined heat exchanger 29, and the inlet and outlet port on the side of the heater core 33 is closed.

In the high-temperature-side heat medium circuit 30 in the heater use defrosting mode, the high-temperature-side heat medium flows and circulates through the high-temperature-side pump 32, the high-temperature-side three-way valve 35, the combined heat exchanger 29, the high-temperature-side reserve tank 36, the water-refrigerant heat exchanger 12, the water heater 34, and the high-temperature-side pump 32 in this order.

In the low-temperature-side heat medium circuit 40, the controller 70 stops the second low-temperature-side pump 42b and causes the first low-temperature-side pump 42a to exhibit predetermined pumping capability. The controller 70 operates the first low-temperature-side three-way valve 46a in such a manner that the inlet and outlet port on the side of the second heat exchange unit 29d of the combined heat exchanger 29 communicates with the inlet and outlet port on the side of the first low-temperature-side pump 42a, and the inlet and outlet port on the side of the bypass flow path 41a is closed. In addition, the controller 70 opens the low-temperature-side on-off valve 48.

In the device-side circuit unit 50, the controller 70 operates the device-side three-way valve 54 in such a manner that the inlet and outlet port on the side of the heat generating device 53 communicates with the inlet and outlet port on the side of the device-side bypass flow path 51a, and the inlet and outlet port on the side of the second heat exchange unit 29d of the combined heat exchanger 29 is closed. The controller 70 then stops the device-side pump 52. Therefore, in the device-side circuit unit 50 in heater use defrosting mode, the low-temperature-side heat medium does not circulate.

With this circuit configuration, the controller 70 controls the operations of the various control target devices. For example, the controller 70 controls the calorific value of the water heater 34 in such a manner that the temperature of the high-temperature-side heat medium becomes a temperature sufficient for defrosting the combined heat exchanger 29.

In the heater use defrosting mode, the high-temperature-side heat medium pumped from the high-temperature-side pump 32 flows into the first heat exchange unit 29c of the combined heat exchanger 29 via the high-temperature-side three-way valve 35. As described above, in the heater use defrosting mode, the high-temperature-side heat medium is heated by the water heater 34. As a result, the heat applied by the water heater 34 is transferred to the first heat exchange unit 29c of the combined heat exchanger 29 via the high-temperature-side heat medium.

As illustrated in FIG. 27, in the combined heat exchanger 29, the first heat exchange unit 29c and the second heat exchange unit 29d are thermally connected via the heat exchange fins 29e. Therefore, the heat applied to the high-temperature-side heat medium can be transferred to the second heat exchange unit 29d via the first heat exchange unit 29c and the heat exchange fins 29e, so that the combined heat exchanger 29 can be defrosted.

The high-temperature-side heat medium flowing out of the first heat exchange unit 29c passes through the high-temperature-side reserve tank 36 and flows into the heat medium passage 12b of the water-refrigerant heat exchanger 12. In the heater use defrosting mode, since the refrigeration cycle device 10 is stopped, the high-temperature-side heat medium is not heated by heat exchange with the refrigerant.

When flowing out of the heat medium passage 12b of the water-refrigerant heat exchanger 12, the high-temperature-side heat medium flows into the water heater 34. Since the calorific value of the water heater 34 is controlled by the controller 70, the high-temperature-side heat medium flows out of the water heater 34 in a state of being heated to a temperature (for example, within the range of 15° C. to 70° C.) necessary for defrosting the combined heat exchanger 29. The high-temperature-side heat medium flowing out of the water heater 34 flows into the suction port of the high-temperature-side pump 32 and is pumped again toward the high-temperature-side three-way valve 35.

As described above, in the heater use defrosting mode, the heat applied by the water heater 34 can be transferred to the second heat exchange unit 29d of the combined heat exchanger 29 by the high-temperature-side heat medium, and can be used for defrosting the combined heat exchanger 29. Therefore, the heater use defrosting mode corresponds to an example of a heat source use mode.

In the heater use defrosting mode, the waste heat of the heat generating device 53 can be stored in the low-temperature-side heat medium of the device-side circuit unit 50. At this time, by controlling the operation of the device-side three-way valve 54, the stored waste heat of the heat generating device 53 can be used for defrosting the combined heat exchanger 29.

As another mode of the heater use defrosting mode, an operation mode using the electric heater 44 of the low-temperature-side heat medium circuit 40 can be performed. In this case, each component of the low-temperature-side heat medium circuit 40 is controlled similarly to that of the low-temperature-side heat medium circuit 40 in the battery heat use mode. As a result, the low-temperature-side heat medium flows and circulates through the second low-temperature-side pump 42b, the electric heater 44, the battery heat exchange unit 43, the second low-temperature-side three-way valve 46b, the first low-temperature-side three-way valve 46a, the combined heat exchanger 29, and the low-temperature-side on-off valve 48 in this order. In this case, even in a case where the waste heat of the battery 75 is small, the heat applied by the electric heater 44 can be used for defrosting of the combined heat exchanger 29.

In the second embodiment, the operation mode of the defrosting operation can be selectively used between the first condensation-heat defrosting mode and the second condensation-heat defrosting mode corresponding to the battery heat use mode, and the heater use defrosting mode corresponding to the heat source use mode in accordance with the heat amount in the low-temperature-side heat medium circuit 40.

Regarding the selective use of the battery heat use mode and the heat source use mode, it is determined whether or not the amount of heat in the low-temperature-side heat medium circuit 40 is larger than a reference heat amount. The reference heat amount is determined, for example, in accordance with the calorific value of the battery 75.

In a case where the calorific value of the battery 75 is large and the heat amount in the low-temperature-side heat medium circuit 40 is equal to or larger than the reference amount of heat, the first condensation-heat defrosting mode or the second condensation-heat defrosting mode, which is the battery heat use mode, is used as the operation mode of the defrosting operation. On the other hand, in a case where the calorific value of the battery 75 is small and the heat amount in the low-temperature-side heat medium circuit 40 is less than the reference heat amount, the heater use defrosting mode is used as the operation mode of the defrosting operation. As a result, the vehicle air conditioner 1 according to the second embodiment can perform the defrosting of the combined heat exchanger 29 in an appropriate operation mode in accordance with the operation condition and the surrounding environment of the vehicle air conditioner 1.

The vehicle air conditioner 1 according to the second embodiment performs the defrosting operation of the combined heat exchanger 29 in accordance with the defrosting control program illustrated in FIG. 10, as in the first embodiment That is, since the defrosting operation in the dry defrosting mode is performed also in the vehicle air conditioner 1 according to the second embodiment, residual water can be efficiently evaporated and removed from the surface of the second heat exchange unit 29d of the combined heat exchanger 29 in a short period of time, as in the embodiment described above. In the dry defrosting mode, the amount of heat input to the combined heat exchanger 29 is determined not by the refrigerant condensation temperature but by the temperature of the heat medium (the high-temperature-side heat medium or the low-temperature-side heat medium) flowing through the combined heat exchanger 29.

As described above, according to the vehicle air conditioner 1 of the second embodiment, even in a case where the vehicle air conditioner is configured as illustrated in FIGS. 26 to 33, the operational effects obtained from the configuration and operation common to those of the embodiment described above can be achieved in the same manner as the embodiment described above.

Third Embodiment

Figure 34:
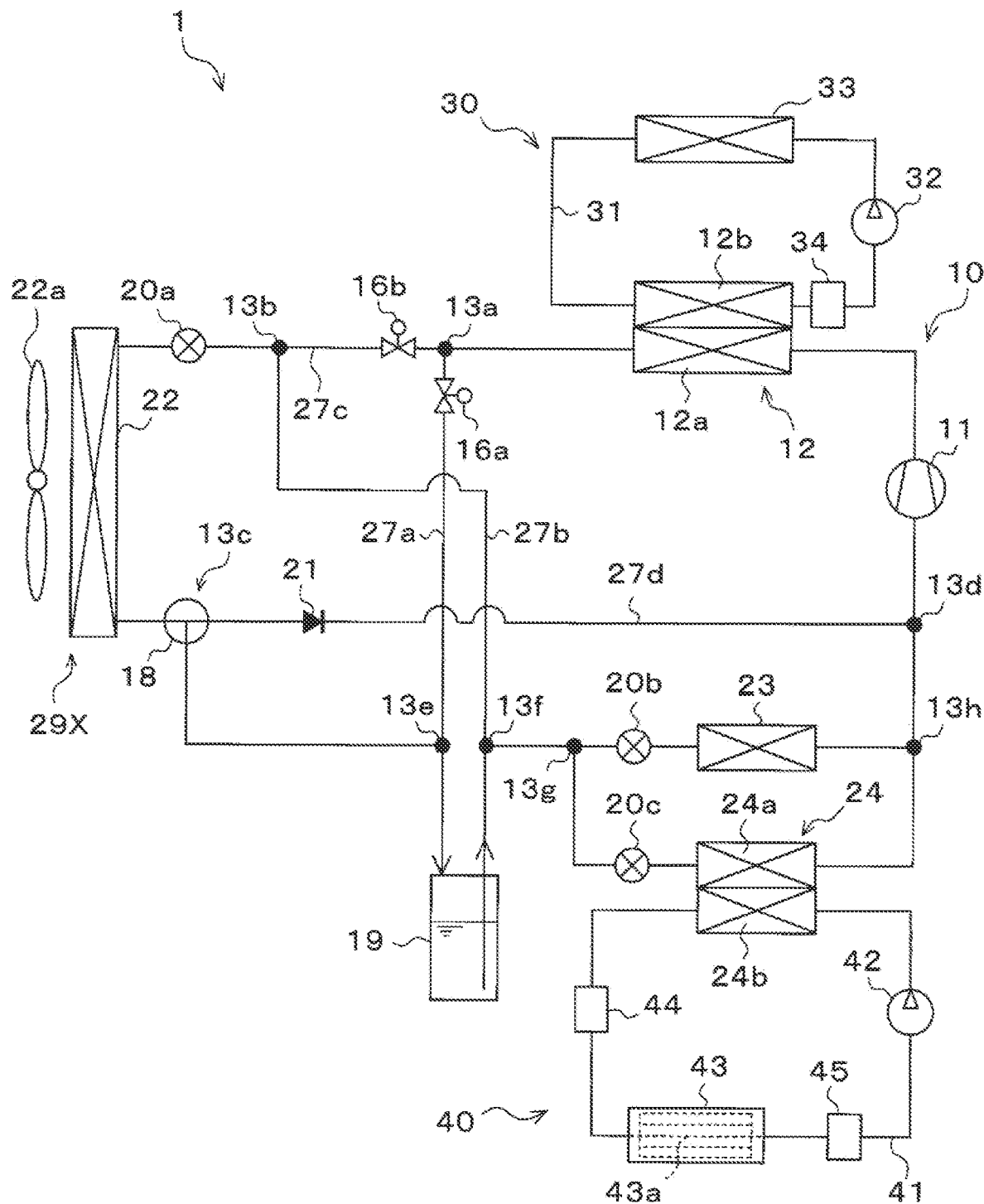
FIG. 34 is an overall configuration diagram of a vehicle air conditioner according to a third embodiment.

As illustrated in FIG. 34, the present embodiment will describe a vehicle air conditioner 1 applied to a configuration different from those of the embodiments described above. In FIG. 34, the same or equivalent parts as those of the embodiments described above are denoted by the same reference numerals.

The vehicle air conditioner 1 according to a third embodiment includes a refrigeration cycle device 10, a high-temperature-side heat medium circuit 30, a low-temperature-side heat medium circuit 40, an inside air conditioning unit 60, and a controller 70. The configurations of the high-temperature-side heat medium circuit 30, the low-temperature-side heat medium circuit 40, the inside air conditioning unit 60, and the controller 70 in the third embodiment are basically similar to those in the first embodiment. Therefore, repetitive description of these configurations will be omitted.

As illustrated in FIG. 34, the vehicle air conditioner 1 according to the third embodiment is different from the vehicle air conditioner of the first embodiment in the configuration of an outside air heat exchange unit 29X. Specifically, in the third embodiment, an outside heat exchanger 22 is used as an outside air heat exchanger instead of the combined heat exchanger 29, and the device-side heat medium circuit 50a is eliminated. The accumulator 26 is disposed in the refrigeration cycle device 10 according to the first embodiment, but a receiver 19 is used in the third embodiment.

Specifically, the configuration of the refrigeration cycle device 10 according to the third embodiment will be described with reference to FIG. 34. In the third embodiment, the refrigerant inlet port side of a water-refrigerant heat exchanger 12 is connected to the discharge port of a compressor 11. The water-refrigerant heat exchanger 12 corresponds to an example of the heating heat exchanger. The water-refrigerant heat exchanger 12 includes a refrigerant passage 12a through which the high-pressure refrigerant discharged from the compressor 11 flows and a heat medium passage 12b through which the high-temperature-side heat medium circulating in the high-temperature-side heat medium circuit 30 flows.

The inlet port side of a first three-way joint 13a having three inlet and outlet ports communicating with each other is connected to the outlet port of the refrigerant passage 12a in the water-refrigerant heat exchanger 12. As such a three-way joint, a three-way joint formed by joining a plurality of pipes or a three-way joint formed by providing a plurality of refrigerant passages in a metal block or a resin block can be used.

As described later, the refrigeration cycle device 10 further includes a second three-way joint 13b to an eighth three-way joint 13h. The basic configurations of the second three-way joint 13b to the eighth three-way joint 13h are similar to that of the first three-way joint 13a.

One inlet port of the first three-way joint 13a is connected to the inlet port side of the receiver 19 via a first on-off valve 16a and the fifth three-way joint 13e. The other outlet port of the first three-way joint 13a is connected to the inlet port side of a heating expansion valve 20a via a second on-off valve 16b and the second three-way joint 13b.

The first on-off valve 16a is an electromagnetic valve that opens and closes an inlet port side passage 27a extending from one outlet port of the first three-way joint 13a to the inlet port of the receiver 19. The opening and closing operation of the first on-off valve 16a is controlled by a control voltage output from the controller 70.

One inlet port of the fifth three-way joint 13e is connected to the outlet port side of the first on-off valve 16a in the inlet port side passage 27a. One outlet port of the fifth three-way joint 13e is connected to the inlet port side of the receiver 19 in the inlet port side passage 27a.

The receiver 19 is a liquid storage unit having a gas-liquid separation function. That is, the receiver 19 separates the refrigerant flowing out of a heat exchange unit functioning as a condenser that condenses a refrigerant in the refrigeration cycle device 10 into gas and liquid. The receiver 19 then causes a part of the separated liquid-phase refrigerant to flow to the downstream side, and stores the remaining liquid-phase refrigerant as an excess refrigerant in the cycle.

The second on-off valve 16b is an electromagnetic valve that opens and closes an outside-air side passage 27c extending from the other outlet port of the first three-way joint 13a to one inlet port of the second three-way joint 13b. The basic configuration of the second on-off valve 16b is similar to that of the first on-off valve 16a.

The refrigerant outlet port side of the receiver 19 is connected to the other inlet port of the second three-way joint 13b. The sixth three-way joint 13f is disposed in an outlet-port side passage 27b connecting the refrigerant outlet port of the receiver 19 and the other inlet port of the second three-way joint 13b.

The inlet port of the sixth three-way joint 13f is connected to the refrigerant outlet port side of the receiver 19 through the outlet-port side passage 27b. The other inlet port of the second three-way joint 13b is connected to one outlet port of the sixth three-way joint 13f through the outlet-port side passage 27b. The inlet port side of the seventh three-way joint 13g is connected to the other outlet port of the sixth three-way joint 13f.

The refrigerant inlet port side of the outside heat exchanger 22 is connected to the outlet port of the second three-way joint 13b via the heating expansion valve 20a. The heating expansion valve 20a is a decompression unit that decompresses the refrigerant flowing out of the receiver 19 and regulates the flow rate of the refrigerant flowing to the downstream side when the circuit is switched to a refrigerant circuit at least in a heating mode to be described later.

As illustrated in FIG. 34, the refrigeration cycle device 10 further includes a cooling expansion valve 20b and a cooling expansion valve 20c. The basic configurations of the cooling expansion valve 20b and the cooling expansion valve 20c are similar to that of the heating expansion valve 20a.

The outside heat exchanger 22 is a heat exchanger that exchanges heat between the refrigerant flowing out of the heating expansion valve 20a and outside air supplied from an outside air fan 22a. The outside heat exchanger 22 is disposed on the front side of a drive unit chamber. As a result, during traveling of the vehicle, traveling air can be applied to the outside heat exchanger 22. The outside heat exchanger 22 is an example of the outside air heat exchanger, and constitutes the outside air heat exchange unit 29X.

The outside heat exchanger 22 functions as a radiator that radiates heat from a high-pressure refrigerant in a cooling mode or the like. In the heating mode or the like, the outside heat exchanger 22 functions as an evaporator that evaporates the low-pressure refrigerant decompressed by the heating expansion valve 20a.

The outside air fan 22a is disposed to supply outside air to the outside heat exchanger 22. Since the outside air fan 22a can regulate the wind speed (the air volume) of the outside air with respect to the outside heat exchanger 22, the outside air fan corresponds to an example of the wind speed regulation unit.

The inlet port side of a three-way valve 18 constituting the third three-way joint 13c is connected to the refrigerant outlet port side of the outside heat exchanger 22. The three-way valve 18 is an electric three-way flow rate regulating valve that has one inlet port and two outlet ports and is capable of continuously regulating a passage area ratio of the two outlet ports. The operation of the three-way valve 18 is controlled by a control voltage output from the controller 70.

One inlet port of the fourth three-way joint 13d is connected to one outlet port of the three-way valve 18 constituting the third three-way joint 13c via a check valve 21. The inlet port side of the compressor 11 is connected to the outlet port of the fourth three-way joint 13*d*. The other inlet port side of the fifth three-way joint 13*e* is connected to the other outlet port of the three-way valve 18.

As illustrated in FIG. 34, the check valve 21 is disposed in a suction side passage 27*d* extending from one outlet port of the third three-way joint 13*c* to one inlet port of the fourth three-way joint 13*d*. The check valve 21 allows the refrigerant to flow from the refrigerant outlet port side of the outside heat exchanger 22 to the suction port side of the compressor 11 via the three-way valve 18, and prohibits the refrigerant from flowing from the suction port side of the compressor 11 to the refrigerant outlet port side of the outside heat exchanger 22.

As described above, the inlet port side of the seventh three-way joint 13*g* is connected to the other outlet port of the sixth three-way joint 13*f* disposed in the outlet-port side passage 27*b*. The inlet port side of the cooling expansion valve 20*b* is connected to one outlet port of the seventh three-way joint 13*g*. The inlet port side of the cooling expansion valve 20*c* is connected to the other outlet port of the seventh three-way joint 13*g*.

The cooling expansion valve 20*b* is a decompression unit that decompresses the refrigerant flowing out of the receiver 19 and regulates the flow rate of the refrigerant flowing to the downstream side when the circuit is switched to a refrigerant circuit at least in a cooling mode.

The refrigerant inlet port of an inside evaporator 23 is connected to the outlet port of the cooling expansion valve 20*b*. The inside evaporator 23 is disposed in a casing 61 of the inside air conditioning unit 60. The inside evaporator 23 is an evaporation unit that exchanges heat between the low-pressure refrigerant decompressed by the cooling expansion valve 20*b* and the ventilation air supplied from a blower 62 to evaporate the low-pressure refrigerant. The inside evaporator 23 corresponds to an example of the air conditioning evaporator. The inlet port of the eighth three-way joint 13*h* is connected to the refrigerant outlet port side of the inside evaporator 23.

The cooling expansion valve 20*c* is a decompression unit that decompresses the refrigerant flowing out of the receiver 19 and regulates the flow rate of the refrigerant flowing to the downstream side when the low-temperature-side heat medium is cooled by a chiller 24. The inlet port side of a refrigerant passage 24*a* in the chiller 24 is connected to the outlet port of the cooling expansion valve 20*c*.

The chiller 24 includes the refrigerant passage 24*a* through which the low-pressure refrigerant decompressed by the cooling expansion valve 20*c* flows, and a heat medium passage 24*b* through which the low-temperature-side heat medium circulating in the low-temperature-side heat medium circuit 40 flows. The chiller 24 corresponds to an example of the evaporator.

The other inlet port of the eighth three-way joint 13*h* is connected to the outlet port of the refrigerant passage 24*a* in the chiller 24. The suction port side of the compressor 11 is connected to the outlet port of the eighth three-way joint 13*h* via the fourth three-way joint 13*d*.

According to the vehicle air conditioner 1 of the third embodiment, the first condensation-heat defrosting mode, the second condensation-heat defrosting mode, and the third condensation-heat defrosting mode can be used as the operation mode of the defrosting operation. The vehicle air conditioner 1 according to the third embodiment performs the defrosting operation of the outside heat exchanger 22 in accordance with the defrosting control program illustrated in FIG. 10, as in the embodiments described above.

That is, since the defrosting operation in the dry defrosting mode is performed also in the vehicle air conditioner 1 according to the third embodiment, residual water can be efficiently evaporated and removed from the surface of the outside heat exchanger 22 in a short period of time, as in the embodiments described above. In determining the completion of the dry defrosting in the third embodiment, the amount of dry input energy includes the amount of energy input using a refrigerant during the dry defrosting.

As described above, according to the vehicle air conditioner 1 of the third embodiment, even in a case where the vehicle air conditioner is configured as a receiver cycle using the outside heat exchanger 22, the operational effects obtained from the configuration and operation common to those of the embodiments described above can be achieved in the same manner as the embodiments described above.

Fourth Embodiment

Figure 35:
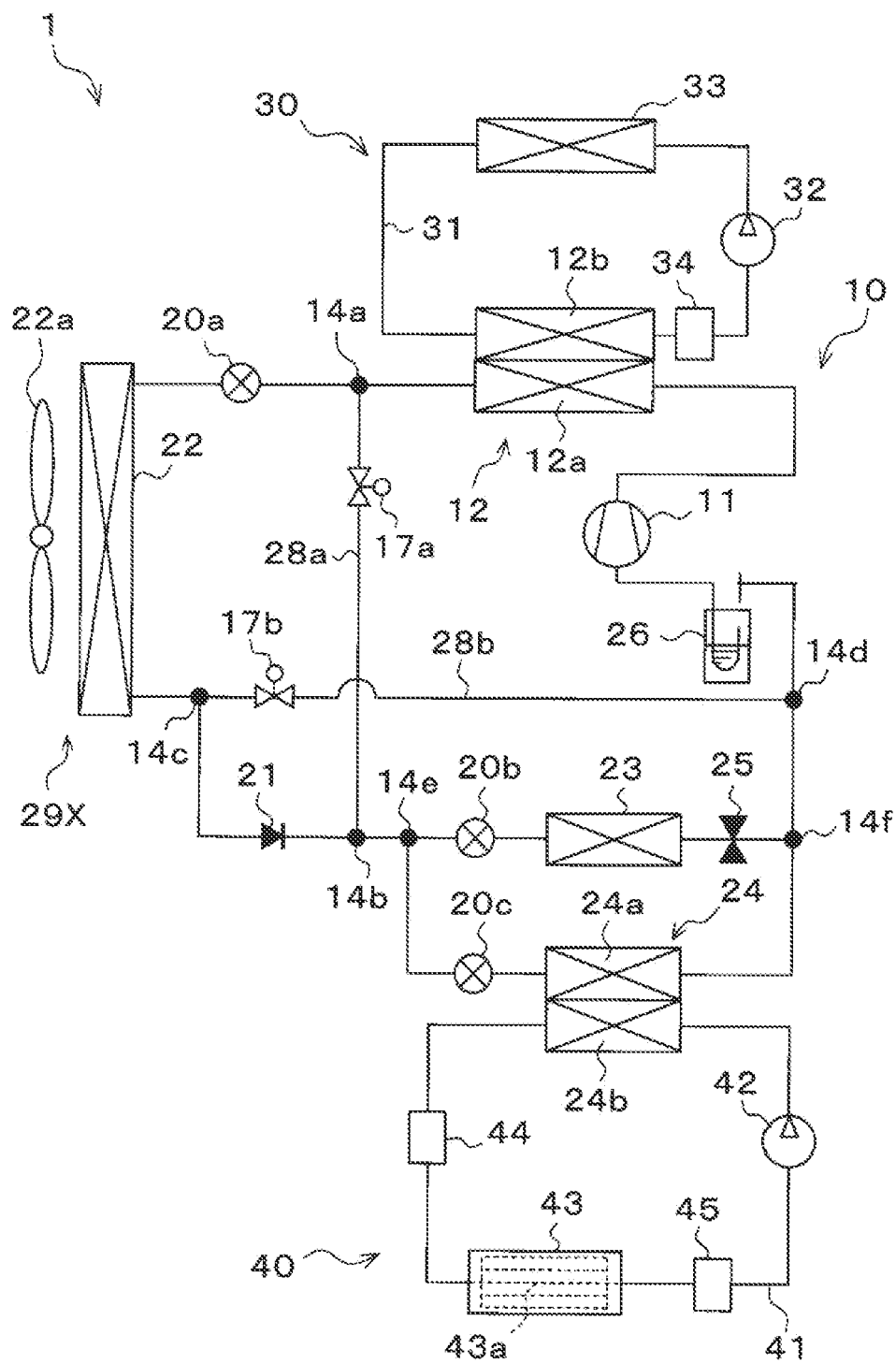
FIG. 35 is an overall configuration diagram of a vehicle air conditioner according to a fourth embodiment.

As illustrated in FIG. 35, the present embodiment will describe a vehicle air conditioner 1 applied to a configuration different from those of the embodiments described above. In FIG. 35, the same or equivalent parts as those of the embodiments described above are denoted by the same reference numerals.

The vehicle air conditioner 1 according to a fourth embodiment includes a refrigeration cycle device 10, a high-temperature-side heat medium circuit 30, a low-temperature-side heat medium circuit 40, and an inside air conditioning unit 60, and the like. Since the configurations of the high-temperature-side heat medium circuit 30, the low-temperature-side heat medium circuit 40, the inside air conditioning unit 60, and a controller 70 according to the fourth embodiment are basically similar to those in the first embodiment, the description thereof will be omitted.

As illustrated in FIG. 35, the vehicle air conditioner 1 according to the fourth embodiment has a configuration similar to that of the first embodiment except that the configuration of an outside air heat exchange unit 29X in the refrigeration cycle device 10 is different. That is, the refrigeration cycle device 10 according to the fourth embodiment is configured as an accumulator cycle using an outside heat exchanger 22 as the outside air heat exchange unit 29X.

According to the vehicle air conditioner 1 of the fourth embodiment, the first condensation-heat defrosting mode, the second condensation-heat defrosting mode, the third condensation-heat defrosting mode, and the storage heat defrosting mode can be used as the operation mode of the defrosting operation. The vehicle air conditioner 1 according to the fourth embodiment can perform the defrosting operation of the outside heat exchanger 22 in accordance with the defrosting control program illustrated in FIG. 10, as in the embodiments described above.

That is, since the defrosting operation in the dry defrosting mode is performed also in the vehicle air conditioner 1 according to the fourth embodiment, residual water can be efficiently evaporated and removed from the surface of the outside heat exchanger 22 in a short period of time, as in the embodiments described above.

As described above, according to the vehicle air conditioner 1 of the fourth embodiment, even in a case where the vehicle air conditioner is configured as an accumulator cycle using the outside heat exchanger 22, the operational effects obtained from the configuration and operation common to those of the embodiments described above can be achieved in the same manner as the embodiments described above.

The present disclosure is not limited to the embodiments described above, and can be variously modified as follows without departing from the gist of the present disclosure. The means disclosed in the individual embodiments may be appropriately combined within a feasible range.

The embodiments have described an example of using R1234yf as the refrigerant, but the present disclosure is not limited thereto. For example, R134a, R600a, R410A, R404A, R32, R407C, and the like may be used. Alternatively, a mixed refrigerant obtained by mixing a plurality of types of these refrigerants or the like may be used.

The components of the refrigeration cycle device are not limited to those disclosed in the embodiments described above. A plurality of cycle components may be integrated in such a manner that the effects described above can be exhibited.

The configuration of the heating unit is not limited to those disclosed in the embodiments described above.

The configuration of the cooling unit is not limited to those disclosed in the embodiments described above.

In the embodiments described above, the target wind speed VaO in dry defrosting is determined in such a manner that the target wind speed VaO decreases as the refrigerant condensation temperature decreases in accordance with the control characteristic diagram illustrated in FIG. 21. However, the present disclosure is not limited to this mode.

For example, as the control characteristic diagram for determining the target wind speed VaO, a control characteristic diagram in which the target wind speed VaO is determined to be low as the outside air temperature decreases within the range of 0.12 m/s to 1.2 m/s may be used.

Alternatively, as the control characteristic diagram for determining the target wind speed VaO, a control characteristic diagram in which the target wind speed VaO is determined to be low as the outside air humidity increases within the range of 0.12 m/s to 1.2 m/s may be used. By determining the target wind speed VaO in this manner, it is possible to suppress the visibility of white fog at the time of dry defrosting in relation to the outside air humidity.

In the embodiments described above, the target condensation temperature TCO in dry defrosting is determined in such a manner that the target condensation temperature TCO decreases as the outside air temperature decreases in accordance with the control characteristic diagram illustrated in FIG. 20. However, the present disclosure is not limited to this mode.

For example, as the control characteristic diagram for determining the target condensation temperature TCO, a control characteristic diagram in which the target condensation temperature TCO is determined to be low as the outside air humidity increases within the range of 15° C. to 70° C. may be used. By determining the target condensation temperature TCO in this manner, it is possible to suppress the visibility of white fog at the time of dry defrosting in relation to the outside air humidity.

In a case where dry defrosting is performed in the first condensation-heat defrosting mode and the second condensation-heat defrosting mode described above, the calorific value of the electric heater 44 in the low-temperature-side heat medium flow path 41 may be controlled. For example, in a case where the refrigerant discharge capability of the compressor 11 at the time of dry defrosting is set to a predetermined value in advance, the calorific value of the electric heater 44 is controlled in such a manner that the low-temperature-side heat medium temperature is equal to or higher than the target minimum low-temperature-side heat medium temperature. The target minimum low-temperature-side heat medium temperature means a minimum temperature at which the battery capacity of the battery 75 can be sufficiently utilized. As a result, the temperature of the battery 75 can be regulated to a temperature at which the battery 75 can be sufficiently utilized, and at the same time, the assistance of the electric heater 44 can be minimized.

In a case where the refrigerant discharge capability of the compressor 11 during dry defrosting is regulated to approach the target condensation pressure PcO, the calorific value of the electric heater 44 can be controlled as follows. Under this condition, in a case where the refrigerant discharge capability of the compressor 11 does not reach the target condensation pressure PcO even if the refrigerant discharge capacity of the compressor is maximum, the electric heater 44 may be used in an auxiliary manner so as to reach the target condensation pressure PcO.

In the embodiments described above, the melting heat of the frost and the latent heat of vaporization of the melted water is used to determine the completion of the dry defrosting, but the present disclosure not limited thereto. In determining the completion of dry defrosting, in addition to the melting heat of the frost and the latent heat of evaporation of the melted water, the sensible heat change of the frost or the sensible heat change of the water may be used.

For example, the temperature of the outside heat exchanger 22 at the start of melting-defrosting may be acquired as a physical amount approximate to the temperature of the frost to specify sensible heat required until the frost reaches the melting point. The evaporation temperature predicted in advance and the evaporation temperature specified using the outside air temperature, the outside air humidity, the wind speed, and the heating temperature may be used together. The sensible heat change of the frost and the sensible heat change of the water can be used, for example, for the purpose of estimating the amount of frost formed on the outside heat exchanger 22 and determining the completion of the dry defrosting, and the accuracy of each of the estimation and the determination can be improved.

In determining the completion of dry defrosting, the compressor 11, the water heater 34, and the like can be configured to complete the defrosting operation in a case where the amount of energy used for melting the frost and evaporating and removing the residual water reaches a predetermined reference consumption amount.

In this case, frost may remain unmelted in the outside heat exchanger 22, and thus it is desirable to store an unmelted state determination flag and use the flag for subsequent control. For example, in a case where the unmelted state determination flag is present, the defrosting operation can be performed earlier than usual.

In the embodiments described above, the outside air fan 22a supplies air to the outside heat exchanger 22 and the like at the time of dry defrosting. However, it is also assumed that the air volume of the outside air fan 22a may be greatly different from the wind speed of the outside heat exchanger 22. For example, in a case where a storm occurs, a wind speed higher than that expected from the operation of the outside air fan 22a passes through the outside heat exchanger 22. Therefore, it is predicted that the condensation temperature in the outside heat exchanger 22 does not sufficiently rise, and the amount of energy input for dry defrosting increases.

In consideration of such a case, in a case where the condensation temperature in the outside heat exchanger 22 rises to a reference value or more after a predetermined period has elapsed from the start of defrosting, dry defrosting may be completed at that time. The reference value in this case means the minimum value of the condensation temperature at which the evaporation of residual water can be expected, and is, for example, 10° C.

Also in this case, frost may remain unmelted in the outside heat exchanger 22, and thus it is desirable to store an unmelted state determination flag and use the flag for subsequent control. For example, in a case where the unmelted state determination flag is present, the defrosting operation can be performed earlier than usual.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

What is claimed is:

1. An air conditioner for a vehicle, comprising:
a compressor configured to compress and discharge a refrigerant;
a heating unit that includes a heating heat exchanger configured to condense a high-pressure refrigerant discharged from the compressor during a heating operation for heating a space to be air conditioned, and to heat ventilation air supplied to the space to be air conditioned using the high-pressure refrigerant as a heat source;
an outside air heat exchange unit that includes an outside air heat exchanger configured to absorb heat from outside air during the heating operation;
a wind speed regulation unit configured to regulate a wind speed of air supplied to the outside air heat exchanger; and
a controller including a memory and at least one processor configured to perform, as a defrosting operation of defrosting the outside air heat exchanger, a dry defrosting mode for evaporating and removing frost adhering to the outside air heat exchanger in a state where the outside air is at a low temperature, wherein
the controller includes
a melting control unit configured to perform a melting-defrosting to melt the frost adhering to the outside air heat exchanger in the dry defrosting mode,
a dry control unit configured to perform a dry defrosting in which at least one of an amount of heat in a predetermined range or a wind speed regulated in a predetermined range by the wind speed regulation unit is supplied to residual water adhering to the outside air heat exchanger due to melting of frost in the melting-defrosting to dry the residual water, and
a dry completion determination unit configured to determine whether drying of the residual water in the outside air heat exchanger is completed by the dry defrosting, and
the controller terminates the defrosting operation in the dry defrosting mode when the dry completion determination unit determines that the drying of the residual water is completed.

2. The air conditioner for a vehicle according to claim 1, wherein
the dry completion determination unit is configured
to specify an amount of input energy required until the melting-defrosting is completed,
to calculate a necessary amount of energy required until the residual water is dried by the dry defrosting using the amount of input energy, and
to determine that drying of the residual water is completed when an amount of dry input energy input for drying the residual water by the dry defrosting is equal to or larger than the necessary amount of energy.

3. The air conditioner for a vehicle according to claim 2, wherein
the dry completion determination unit specifies the amount of dry input energy by excluding an amount of heat radiation energy radiated to air from a total amount of energy input to the outside air heat exchanger in the dry defrosting, when the dry completion determination unit determines whether the amount of dry input energy is equal to or larger than the necessary amount of energy.

4. The air conditioner for a vehicle according to claim 3, wherein
the dry completion determination unit specifies the amount of radiation energy using at least one of an outside air temperature, an outside air humidity, a wind speed passing through the outside air heat exchanger, or a heating temperature at which the residual water is heated by the outside air heat exchanger.

5. The air conditioner for a vehicle according to claim 1, wherein
the dry completion determination unit determines that drying of the residual water is completed when a refrigerant pressure in the outside air heat exchanger exceeds a predetermined reference pressure in a state where refrigerant discharge capability of the compressor in the dry defrosting is constant.

6. The air conditioner for a vehicle according to claim 1, wherein
the dry completion determination unit determines that drying of the residual water is completed, when refrigerant discharge capability of the compressor is lower than predetermined reference discharge capability or in a case where the refrigerant discharge capability of the compressor decreases by a predetermined reference amount set in the dry defrosting or more, in a state where the refrigerant discharge capability of the compressor in the dry defrosting is regulated in accordance with a target condensation temperature determined by an outside air temperature.

7. The air conditioner for a vehicle according to claim 1, wherein
the dry control unit is configured to supply air regulated by the wind speed regulation unit so as to have a target wind speed set within a range of 0.12 m/s to 1.2 m/s to the outside air heat exchanger in the dry defrosting.

8. The air conditioner for a vehicle according to claim 7, wherein
the dry control unit sets the target wind speed set within a range of 0.12 m/s to 1.2 m/s to be lower as an outside air temperature is lower.

9. The air conditioner for a vehicle according to claim 7, wherein
the dry control unit sets the target wind speed set within a range of 0.12 m/s to 1.2 m/s to be lower as an outside air humidity is higher.

10. The air conditioner for a vehicle according to claim 1, wherein
in the dry defrosting, the dry control unit regulates a temperature of a refrigerant or a heat medium flowing through the outside air heat exchanger to approach a target temperature set in a range of 15° C. to 70° C., and supplies an amount of heat to the outside air heat exchanger.

11. The air conditioner for a vehicle according to claim 10, wherein the dry control unit sets the target temperature set within a range of 15° C. to 70° C. to be lower as an outside air temperature is lower.

12. The air conditioner for a vehicle according to claim 10, wherein the dry control unit sets the target temperature set within a range of 15° C. to 70° C. to be lower as an outside air humidity is higher.

13. The air conditioner for a vehicle according to claim 1, wherein
the controller further includes a melting determination unit configured to determine whether melting of frost adhering to the outside air heat exchanger is completed,
the melting control unit is configured to limit a wind speed of air supplied to the outside air heat exchanger to 0.12 m/s or less by the wind speed regulation unit when the melting-defrosting starts, and
the dry control unit is configured to regulate the wind speed to be within a range of 0.12 m/s to 1.2 m/s determined by the wind speed regulation unit in the dry defrosting, when the melting determination unit determines that melting of the frost adhering to the outside air heat exchanger is completed.

14. The air conditioner for a vehicle according to claim 1, wherein
the outside air heat exchange unit includes a heat medium circuit through which a heat medium circulates via the outside air heat exchanger,
the outside air heat exchanger includes a combined heat exchanger, in which an outside air-refrigerant heat exchange unit that causes a refrigerant to absorb heat by heat exchange with the outside air during the heating operation, and an outside air-heat medium heat exchange unit that exchanges heat between the outside air and the heat medium are thermally connected, and
an auxiliary heat source capable of regulating a temperature of the heat medium is disposed in the heat medium circuit.

15. The air conditioner for a vehicle according to claim 1, wherein
the heating unit includes a high-temperature-side heat medium circuit through which a high-temperature-side heat medium heated by the heating heat exchanger using a high-pressure refrigerant as a heat source circulates during the heating operation, and the high-temperature-side heat medium circuit is configured to connect the heating heat exchanger and a heater core that exchanges heat between the high-temperature-side heat medium and ventilation air supplied to the space to be air conditioned,
the air conditioner for a vehicle further comprising:
a heat absorption decompression valve that is disposed at a refrigerant outlet port of the heating heat exchanger and decompresses a refrigerant during the heating operation; and
a chiller that causes a low-pressure refrigerant decompressed by the heat absorption decompression valve to absorb heat and to cool a low-temperature-side heat medium circulating in a low-temperature-side heat medium circuit, wherein
a heating source for heating at least one of the high-temperature-side heat medium or the low-temperature-side heat medium is disposed in at least one of the high-temperature-side heat medium circuit or the low-temperature-side heat medium circuit, and
the outside air heat exchanger includes a combined heat exchanger in which a first heat exchange unit that exchanges heat between the outside air and the high-temperature-side heat medium and a second heat exchange unit that exchanges heat between the outside air and the low-temperature-side heat medium are thermally connected.

16. The air conditioner for a vehicle according to claim 15, wherein
the controller is configured to perform, as the defrosting operation, a heat source use mode in which heat generated in the heating source disposed in at least one of the high-temperature-side heat medium circuit or the low-temperature-side heat medium circuit is used,
in the heat source use mode, at least one of the high-temperature-side heat medium or the low-temperature-side heat medium is heated by heat generated in the heating source, and
at least one of the high-temperature-side heat medium or the low-temperature-side heat medium heated is caused to flow through the outside air heat exchanger to supply heat to the second heat exchange unit.

17. The air conditioner for a vehicle according to claim 16, wherein
the low-temperature-side heat medium circuit includes a battery heat exchange unit that exchanges heat between a battery and the low-temperature-side heat medium, and a low-temperature-side pump that circulates the low-temperature-side heat medium,
the controller is configured to perform, as the defrosting operation, a battery heat use mode in which heat generated during charging of the battery is used, and
in the battery heat use mode, heat generated in the battery during charging is absorbed by a low-pressure refrigerant in the chiller via the low-temperature-side heat medium, a refrigerant flowing out of the chiller is compressed by the compressor and heat of a refrigerant discharged from the compressor is radiated to the high-temperature-side heat medium by the heating heat exchanger, and heat of the high-temperature-side heat medium flowing out of the heating heat exchanger is supplied to the second heat exchange unit via the first heat exchange unit of the outside air heat exchanger.

18. The air conditioner for a vehicle according to claim 17, wherein
the controller includes a heat-amount determination unit configured to determine whether an amount of heat of the low-temperature-side heat medium is equal to or larger than a predetermined reference amount of heat during the defrosting operation,
the controller performs the battery heat use mode for defrosting of the outside air heat exchanger, when the heat-amount determination unit determines that the amount of heat of the low-temperature-side heat medium is equal to or larger than the reference amount of heat, and
the controller performs the heat source use mode for the defrosting of the outside air heat exchanger, when the amount of heat of the low-temperature-side heat medium is determined to be less than the reference amount of heat.

19. An air conditioner for a vehicle, comprising:
a compressor configured to compress and discharge a refrigerant;

a heating heat exchanger configured to cool a high-pressure refrigerant discharged from the compressor during a heating operation for heating a space to be air conditioned, and to heat ventilation air supplied to the space to be air conditioned using the high-pressure refrigerant as a heat source;

an outside air heat exchanger configured to absorb heat from outside air during the heating operation;

a blower configured to regulate a wind speed of air supplied to the outside air heat exchanger; and a controller including at least one processor configured to perform, as a defrosting operation of defrosting the outside air heat exchanger, a dry defrosting mode for evaporating and removing frost adhering to the outside air heat exchanger in a state where the outside air is lower than a predetermined temperature, wherein the controller is configured to perform a melting-defrosting to melt the frost adhering to the outside air heat exchanger in the dry defrosting mode, to perform a dry defrosting in which at least one of an amount of heat in a predetermined range or a wind speed regulated in a predetermined range by the wind speed regulation unit is supplied to residual water adhering to the outside air heat exchanger to dry the residual water, after the melting-defrosting, and to determine whether drying of the residual water in the outside air heat exchanger is completed by the dry defrosting, and the controller terminates the defrosting operation in the dry defrosting mode in response to a determination in which the drying of the residual water is completed.

* * * * *